United States Patent
Zhang et al.

(10) Patent No.: US 12,192,507 B2
(45) Date of Patent: Jan. 7, 2025

(54) DELTA MOTION VECTOR IN PREDICTION REFINEMENT WITH OPTICAL FLOW PROCESS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/085,979

(22) Filed: Dec. 21, 2022

(65) Prior Publication Data
US 2023/0131812 A1   Apr. 27, 2023

Related U.S. Application Data

(63) Continuation of application No. 17/392,658, filed on Aug. 3, 2021, now Pat. No. 11,570,462, which is a
(Continued)

(30) Foreign Application Priority Data

Apr. 19, 2019  (WO) ................ PCT/CN2019/083434
Jul. 16, 2019  (WO) ................ PCT/CN2019/096180

(51) Int. Cl.
*H04N 19/513*  (2014.01)
*H04N 19/132*  (2014.01)
(Continued)

(52) U.S. Cl.
CPC ......... *H04N 19/513* (2014.11); *H04N 19/132* (2014.11); *H04N 19/137* (2014.11); *H04N 19/176* (2014.11)

(58) Field of Classification Search
None
See application file for complete search history.

(56) References Cited

U.S. PATENT DOCUMENTS 10,390,029 B2   8/2019   Ye
10,448,010 B2  10/2019   Chen
(Continued)

FOREIGN PATENT DOCUMENTS

CN   102754444 A   10/2012
CN   102939753 A    2/2013
(Continued)

OTHER PUBLICATIONS

Document: JVET-N0776-v4, Chen, C., "BoG report on CE2 sub-blockbased motion prediction related contributions," Joint Video Experts Team (JVET) of ITU-T SG 16 WP 3 and ISO/IEC JTC 1/SC 29/WG 11 14th Meeting: Geneva, CH, Mar. 19-27, 2019, 13 pages.
(Continued)

*Primary Examiner* — Christopher G Findley
(74) *Attorney, Agent, or Firm* — Conley Rose, P.C.

(57) ABSTRACT

A video processing method is disclosed to include: generating one or more initial predictions for a sub-block of a current video block of the video; refining the one or more initial predictions to generate a final prediction block using a prediction refinement with optical flow (PROF) procedure by calculating motion vector differences based on variables having a bit width not exceeding a predetermined maximum bit width; and performing a conversion between the current video block and a coded representation of the video using
(Continued)

the variables having the bit width not exceeding the predetermined maximum bit width.

16 Claims, 37 Drawing Sheets

Related U.S. Application Data continuation of application No. PCT/CN2020/085666, filed on Apr. 20, 2020.

(51) Int. Cl.
 *H04N 19/137* (2014.01)
 *H04N 19/176* (2014.01)

(56) References Cited

U.S. PATENT DOCUMENTS

| | | | |
|---|---|---|---|
| 10,523,964 | B2 | 12/2019 | Chuang |
| 10,560,712 | B2 | 2/2020 | Zou |
| 10,757,417 | B2 | 8/2020 | Zhang |
| 10,778,999 | B2 | 9/2020 | Li |
| 10,819,891 | B2 | 10/2020 | Wang |
| 10,841,609 | B1 | 11/2020 | Liu |
| 10,904,565 | B2 | 1/2021 | Chuang |
| 11,356,697 | B2 | 6/2022 | Zhang |
| 11,368,711 | B2 | 6/2022 | Zhang |
| 11,516,497 | B2 | 11/2022 | Liu |
| 11,570,462 | B2* | 1/2023 | Zhang ................ H04N 19/137 |
| 11,997,303 | B2 | 5/2024 | Liu |
| 2013/0107958 | A1 | 5/2013 | Shimada |
| 2013/0259122 | A1 | 10/2013 | Sugio |
| 2015/0016550 | A1 | 1/2015 | Kim |
| 2017/0134750 | A1 | 5/2017 | Ikai |
| 2017/0332095 | A1 | 11/2017 | Zou |
| 2018/0098066 | A1 | 4/2018 | Lee |
| 2018/0103257 | A1 | 4/2018 | Zheng |
| 2018/0199057 | A1 | 7/2018 | Chuang |
| 2018/0241998 | A1 | 8/2018 | Chen |
| 2018/0262773 | A1 | 9/2018 | Chuang |
| 2018/0270500 | A1 | 9/2018 | Li |
| 2018/0278950 | A1 | 9/2018 | Chen |
| 2018/0316929 | A1 | 11/2018 | Li |
| 2018/0376166 | A1 | 12/2018 | Chuang |
| 2019/0014342 | A1 | 1/2019 | Li |
| 2019/0020895 | A1 | 1/2019 | Liu |
| 2019/0045214 | A1 | 2/2019 | Ikai |
| 2019/0045215 | A1 | 2/2019 | Chen |
| 2019/0089960 | A1 | 3/2019 | Chen |
| 2019/0104323 | A1 | 4/2019 | Baylon |
| 2019/0387250 | A1 | 12/2019 | Boyce |
| 2020/0045310 | A1 | 2/2020 | Chen |
| 2020/0084457 | A1 | 3/2020 | Abe |
| 2020/0145688 | A1 | 5/2020 | Zou |
| 2020/0213594 | A1 | 7/2020 | Liu |
| 2020/0213612 | A1 | 7/2020 | Liu |
| 2020/0221122 | A1 | 7/2020 | Ye |
| 2020/0296405 | A1* | 9/2020 | Huang ................ H04N 19/137 |
| 2020/0304805 | A1 | 9/2020 | Li |
| 2020/0304826 | A1 | 9/2020 | Li |
| 2020/0314443 | A1* | 10/2020 | Huang ................ H04N 19/70 |
| 2020/0359029 | A1 | 11/2020 | Liu |
| 2020/0382771 | A1 | 12/2020 | Liu |
| 2020/0382795 | A1 | 12/2020 | Zhang |
| 2020/0396453 | A1 | 12/2020 | Zhang |
| 2020/0396465 | A1 | 12/2020 | Zhang |
| 2020/0404255 | A1 | 12/2020 | Zhang |
| 2021/0067783 | A1 | 3/2021 | Liu |
| 2021/0092390 | A1 | 3/2021 | Chen |
| 2021/0227211 | A1 | 7/2021 | Liu |
| 2021/0266530 | A1 | 8/2021 | Liu |
| 2021/0281855 | A1 | 9/2021 | Skupin |
| 2021/0368199 | A1 | 11/2021 | Zhang |
| 2021/0368203 | A1 | 11/2021 | Zhang |
| 2021/0377558 | A1 | 12/2021 | Xiu et al. |
| 2021/0385482 | A1 | 12/2021 | Liu |
| 2022/0070490 | A1 | 3/2022 | Zhang |

FOREIGN PATENT DOCUMENTS

| | | |
|---|---|---|
| CN | 104170381 A | 11/2014 |
| CN | 104396248 A | 3/2015 |
| CN | 105409221 A | 3/2016 |
| CN | 107113424 A | 8/2017 |
| CN | 107211151 A | 9/2017 |
| CN | 107431822 A | 12/2017 |
| CN | 107710762 A | 2/2018 |
| CN | 107925772 A | 4/2018 |
| CN | 107925773 A | 4/2018 |
| CN | 108293118 A | 7/2018 |
| CN | 108432250 A | 8/2018 |
| CN | 108541375 A | 9/2018 |
| CN | 108781294 A | 11/2018 |
| CN | 108886619 A | 11/2018 |
| CN | 109076237 A | 12/2018 |
| CN | 109155855 A | 1/2019 |
| CN | 109417639 A | 3/2019 |
| CN | 109479130 A | 3/2019 |
| CN | 109496430 A | 3/2019 |
| EP | 3413563 A1 | 12/2018 |
| GB | 2580173 A | 7/2020 |
| KR | 20180128955 A | 12/2018 |
| TW | 201832557 A | 9/2018 |
| WO | 2010027457 A1 | 3/2010 |
| WO | 2015165030 A1 | 11/2015 |
| WO | 2015179898 A1 | 12/2015 |
| WO | 2016072750 A1 | 5/2016 |
| WO | 2016130801 A1 | 8/2016 |
| WO | 2017142939 A1 | 8/2017 |
| WO | 2017184970 A1 | 10/2017 |
| WO | 2017192898 A1 | 11/2017 |
| WO | 2017197146 A1 | 11/2017 |
| WO | 2018048265 A1 | 3/2018 |
| WO | 2018061563 A1 | 4/2018 |
| WO | 2018105579 A1 | 6/2018 |
| WO | 2018128417 A1 | 7/2018 |
| WO | 2018130206 A1 | 7/2018 |
| WO | 2018166357 A1 | 9/2018 |
| WO | 2018169989 A1 | 9/2018 |
| WO | 2018199468 A1 | 11/2018 |
| WO | 2018237303 A1 | 12/2018 |
| WO | 2019040075 A1 | 2/2019 |
| WO | 2020190896 A1 | 9/2020 |

OTHER PUBLICATIONS

Document: JVET-N0236-r5, Luo, J., et al., "CE2-related: Prediction refinement with optical flow for affine mode," Joint Video Experts Team (JVET) of ITU-T SG 16 WP 3 and ISO/IEC JTC 1/SC 29/WG 11 14th Meeting: Geneva, CH, Mar. 19-27, 2019, 8 pages.

Non-Final Office Action from U.S. Appl. No. 17/392,658 dated Nov. 26, 2021.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M1001, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH. Mar. 19-27, 2019, document JVET-N1001, 2019.

Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "BoG Report on CE2 Sub-Block Based Motion Prediction-Related Contributions," Joint Video Experts Team (JVET) of ITU-T

(56) References Cited

OTHER PUBLICATIONS

SG 16 WP 3 and ISO/IEC JTC 1/SC 29/WG 11, 14th Meeting, Geneva, CH, Mar. 19-27, 2019, document JVET-N0776, 2019.

Chuang et al. "CE2-Related: Phase-Variant Affine Subblock Motion Compensation," Joint Video Experts Team (JVET) of ITU-T SG 16 WP 3 and ISO/IEC JTC 1/SC 29/WG 11, 14th Meeting Geneva, CH, Mar. 19-27, 2019, document JVET-N0510, 2019.

Chujoh et al. "Non-CE9: An Improvement of BDOF," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0063, 2019.

He et al. "Unified Syntax for JVET-O0184/O0250/O0504 on DMVR and BDOF Flag," Joint Video Experts Team (JVET) of ITU-T SG 16 WP 3 and ISO/IEC JTC 1/SC 29/WG 11, 15th Meeting, Gothenburg, Se, Jul. 3-12, 2019, document JVET-O1140, 2019.

Henkel et al. "Non-CE4: Switched Half-Pel Interpolation Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0309, 2019.

Henkel et al. "CE4: Switchable Interpolaton Filter (CE4-1.1, CE4-1.2, CE4-1.3, CE4-1.4, CE4-1.5, CE4-1.6, CE4-1.7)," Joint Video Experts Team (JVET) of ITU-T SG 16 WP 3 and ISO/IEC JTC 1/SC 29/WG 11, 15th Meeting, Gothenburg, SE Jul. 3-12, 2019, document JVET-O0057, 2019.

"Information Technology—High Efficiency Coding and Media Delivery in Heterogeneous Environments—Part 2: High Efficiency Video Coding" Apr. 20, 2018, ISO/DIS 23008, 4th Edition.

Kim et al. "Non-CE3: Determination of Wide-Angle Mode Using the Size of a Coding Block," JVET-N0216, Mar. 2019.

Li et al. "Non-CE-2: Combination of Affine MV Clip and Prediction Refinement with Optical Flow," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0737, 2019.

Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0236, 2019.

Luo et al. "CE4: Prediction Refinement with Optical Flow for Affine Mode (Test 2.1)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0070, 2019.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 10-18, 2018, document No. JVET-K0248, 2018.

Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.

Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.

Xiu et al. "Simplifications on Bi-Directional Optical Flow (BDOF)," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0487, 2019.

Zhang et al. "CE2-5.5: History-Parameter-based Affine Model Inheritance," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0263, 2019.

JEM-7.0: https://jvet.hhi.fraunhofer.de/svn/svn_HMJEMSoftware/tags/ HM-16.6-JEM-7.0, Oct. 26, 2021.

Bross et al. "Versatile Video Coding (Draft 3)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L1001, 2018.

Huang et al. "CE2-Related: Affine Motion Compensation Using 2x2 Subblock," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0273, 2019.

Huang et al. "CE2-Related: Simplified Prediction Refinement for Affine Motion Compensation," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0504, 2019.

Karczewicz et al. "Geometry Tranformation-based Adaptive In-Loop Filter," 2016, IEEE Qualcomm Technologies Inc. San Diego, CA, USA.

Li et al. "Non-CE4: On Prediction Refinement with Optical Flow," Joint Video Experts Team (JVET) of ITU-T SG 16 WP 3 and ISO/IEC JTC 1/SC 29/WG 11, 15th Meeting, Gotehnburg, SE, Jul. 3-12, 2019, document JVET-O0553, 2019.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0147, 2018.

Lu et al. "CE12: Mapping Functions (Test CE12-1 and CE12-2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0427, 2019.

Seregin et al. "CE5: Summary Report on Adaptive Loop Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0025, 2019.

Taquet et al. "Non-Linear Adaptive Loop Filter," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0385, 2019.

Taquet et al. "CE5: Results of Tests CE5-3.1 to CE5-3.4 on Non-Linear Adaptive Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0242, 2019.

"Optical Flow" USPTO Library Search Query, 2020, retrieved Mar. 25, 2022.

Xiu et al. "CE9-Related: Improvements on Bi-Directional Optical Flow (BDOF)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0325, 2019.

Li et al. "CE4-Related: Alignment of BDOF Refinement Process with PROF," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0123, 2019.

Extended European Search Report from European Patent Application No. 20782029.1 dated Jul. 15, 2022 (8 pages).

Extended European Search Report from European Patent Application No. 20790449.1 dated Jun. 15, 2022 (7 pages).

Office Action from Indian Patent Application No. 202147046022 mailed Apr. 13, 2022.

Notice of Allowance from U.S. Appl. No. 17/405,374 dated Apr. 14, 2022.

International Search Report and Written Opinion from International Patent Application No. PCT/CN2020/082941 dated Jun. 30, 2020 (12 pages).

International Search Report and Written Opinion from International Patent Application No. PCT/CN2020/082976 dated Jul. 1, 2020 (11 pages).

Non Final Office Action from U.S. Appl. No. 17/392,778 dated Nov. 26, 2021.

Non Final Office Action from U.S. Appl. No. 17/405,374 dated Dec. 2, 2021.

(56) References Cited

OTHER PUBLICATIONS

International Search Report and Written Opinion from International Patent Application No. PCT/CN2020/085658 dated Jul. 20, 2020 (9 pages).
International Search Report and Written Opinion from International Patent Application No. PCT/CN2020/085662 dated Jul. 21, 2020 (9 pages).
International Search Report and Written Opinion from International Patent Application No. PCT/CN2020/085663 dated Jul. 14, 2020 (10 pages).
International Search Report and Written Opinion from International Patent Application No. PCT/CN2020/085666 dated Jul. 7, 2020 (9 pages).
International Search Report and Written Opinion from International Patent Application No. PCT/CN2020/094156 dated Sep. 2, 2020 (10 pages).
Notice of Allowance from U.S. Appl. No. 17/392,719 dated Oct. 14, 2021.
Final Office Action from U.S. Appl. No. 17/392,658 dated Mar. 16, 2022.
Document: JVET-L0266-v1, Zhang, L., et al., "CE4: History-based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Non-Final Office Action from U.S. Appl. No. 17/838,498 dated Sep. 1, 2023, 41 pages.

\* cited by examiner

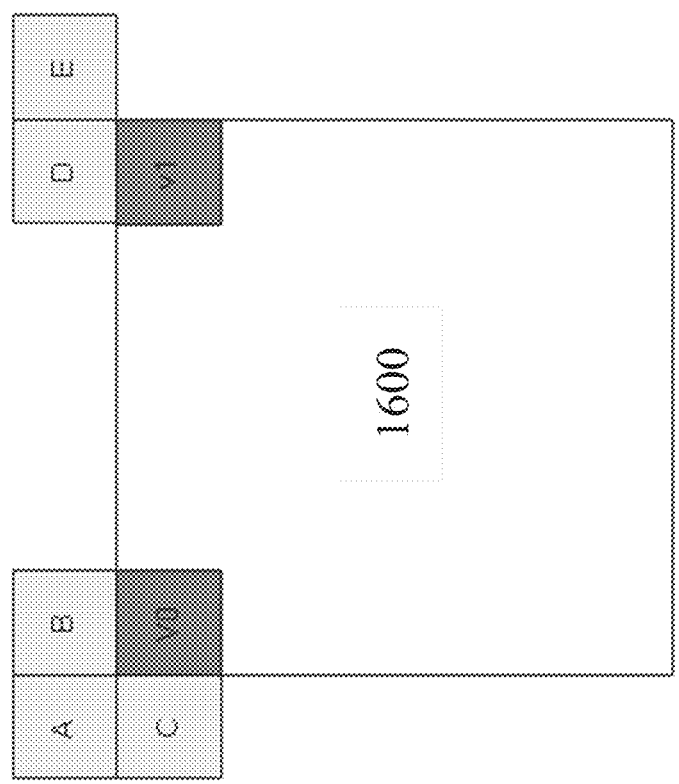

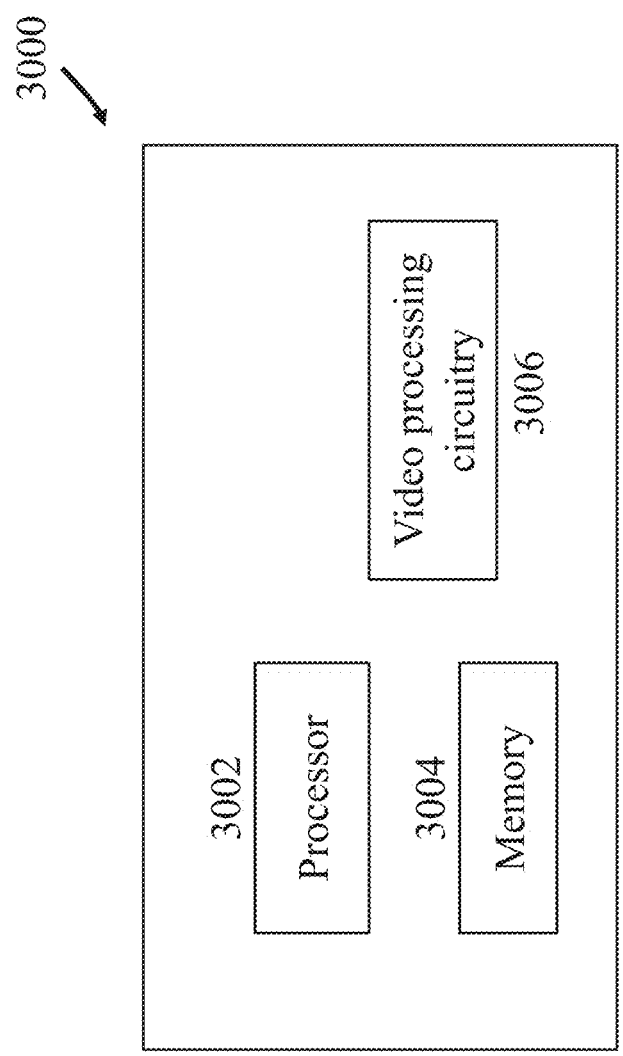

DELTA MOTION VECTOR IN PREDICTION REFINEMENT WITH OPTICAL FLOW PROCESS

CROSS REFERENCE TO RELATED APPLICATIONS

This application is a continuation of U.S. application Ser. No. 17/392,658 filed on Aug. 3, 2021, which is a continuation of International Application No. PCT/CN2020/085666 filed on Apr. 20, 2020, which claims the priority to and benefits of International Patent Application No. PCT/CN2019/083434 filed on Apr. 19, 2019, and International Patent Application No. PCT/CN2019/096180 filed on Jul. 16, 2019. The entire disclosures of the aforementioned applications are incorporated by reference as part of the disclosure of this application.

TECHNICAL FIELD

The present disclosure relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to prediction refinement with optical flow (PROF) for video processing. The described methods may be applied to both the existing video coding standards (e.g., High Efficiency Video Coding (HEVC)) and future video coding standards or video codecs.

In one representative aspect, the disclosed technology may be used to provide a method for video processing. This method includes generating one or more initial predictions for a sub-block of a current video block of the video; refining the one or more initial predictions to generate a final prediction block using a prediction refinement with optical flow (PROF) procedure by calculating motion vector differences based on variables having a bit width not exceeding a predetermined maximum bit width; and performing a conversion between the current video block and a coded representation of the video using the variables having the bit width not exceeding the predetermined maximum bit width.

In another representative aspect, the disclosed technology may be used to provide a method for video processing. This method includes generating initial prediction samples of a sub-block of a current video block of a video; generating final prediction samples by deriving a prediction refinement using an optical flow equation, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction; and performing a conversion between the current video block and a coded representation of the video using the final prediction samples, wherein a clipping operation is selectively performed on the dMvH and/or dMvV before the deriving of the prediction refinement according to a rule.

In another representative aspect, the disclosed technology may be used to provide a method for video processing. This method includes generating, for a sub-block of a current video block of a video, an initial prediction block based on a sub-block motion vector, wherein the sub-block has a height (H) and a width (W); generating a refined prediction block using an optical flow equation by calculating motion vector differences based on the height (H) or the width (W) of the sub-block, the motion vector differences representing motion vector differences between pixel motion vectors at sample positions in the sub-block and the sub-block motion vector; and performing a conversion between the current video block and a coded representation of the video using the refined prediction block.

In another representative aspect, the disclosed technology may be used to provide a method for video processing. This method includes generating, for a sub-block of a current video block of a video, initial predictions samples based on a sub-block motion vector derived from samples in the sub-block using a phase-variant affine subblock motion compensation in which filters with different phases are applied to each row and each column of the samples in the sub-block; generating a final prediction block by refining the initial prediction samples using a prediction refinement with optical flow (PROF) procedure based on an optical flow calculation; and performing a conversion between the current video block and a coded representation of the video using the final prediction block.

In another representative aspect, a method of video processing is disclosed. The method includes generating initial prediction samples of a sub-block of a current video block of a video; generating final prediction samples by refining the initial prediction samples using a prediction refinement with optical flow (PROF) procedure, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction; and performing a conversion between the current video block and the coded representation of the video using the final prediction samples, wherein the motion vector differences, dMvH and/or the dMvV, has a same precision as that of the motion vector corresponding to the initial prediction samples or the final prediction samples.

In another representative aspect, a method of video processing is disclosed. The method includes generating an initial prediction of a sub-block of a current video block for a conversion between the current video block and a coded representation of the video; deriving a prediction refinement for the initial prediction using an optical flow equation to generate a final prediction, wherein the prediction refinement is derived using a shift operation depending on a sign of the prediction refinement; and performing the conversion using the final prediction.

In another representative aspect, a method of video processing is disclosed. The method includes generating an initial prediction of a sub-block of a current video block for a conversion between the current video block and a coded representation of the video; deriving a prediction refinement for the initial prediction using an optical flow equation to generate a final prediction; performing a clipping operation on the prediction refinement based on a sample bit-depth; and performing the conversion using the final prediction.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 16 shows an example of motion vector prediction (MVP) for the AF_INTER affine motion mode.

FIGS. 30A and 30B are block diagrams of an example of a hardware platform for implementing a visual media decoding or a visual media encoding technique described in the present disclosure.

DETAILED DESCRIPTION

Figure 1:
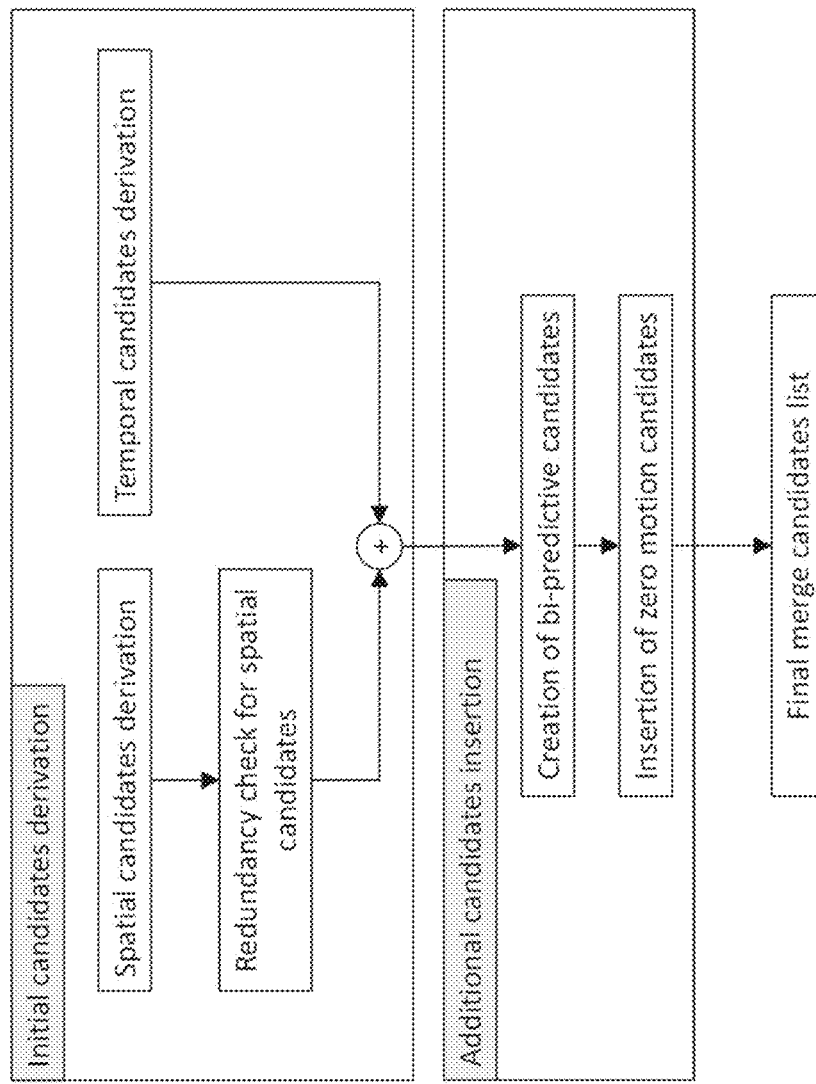
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Motion Picture Experts Group (MPEG)-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve compression performance. Section headings are used in the present disclosure to improve readability of the description and do not in any way limit the discussion or the embodiments (and/or implementations) to the respective sections only.

1. Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted prediction unit (PU) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
   Step 1.1: Spatial candidates derivation
   Step 1.2: Redundancy check for spatial candidates
   Step 1.3: Temporal candidates derivation
Step 2: Additional candidates insertion
   Step 2.1: Creation of bi-predictive candidates
   Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
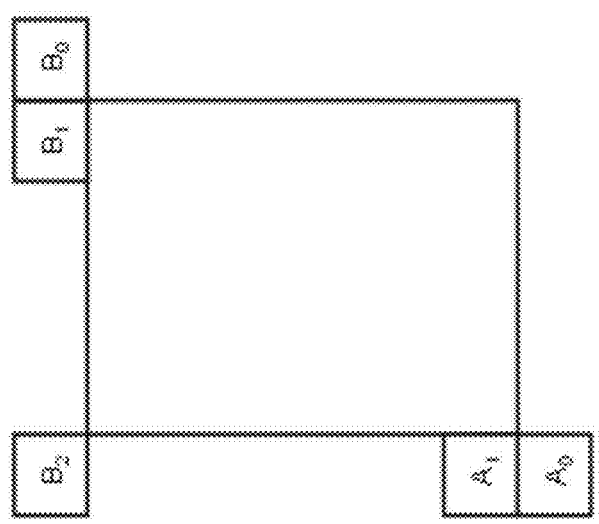
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$, and $B_2$. Position $B_2$ is considered only when any PU of position $A_1$, $B_1$, $B_0$, $A_0$, is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
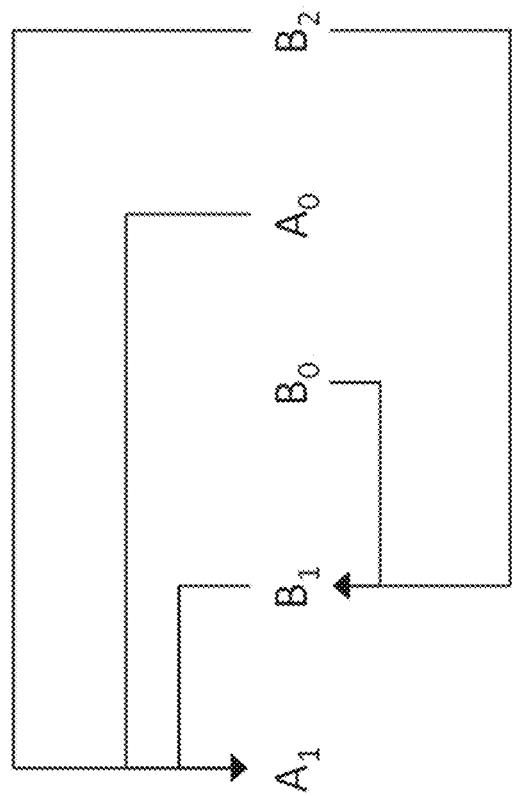
FIG. 3 shows an example of candidate pairs subject to a redundancy check of spatial merge candidates.
Figure 4B:
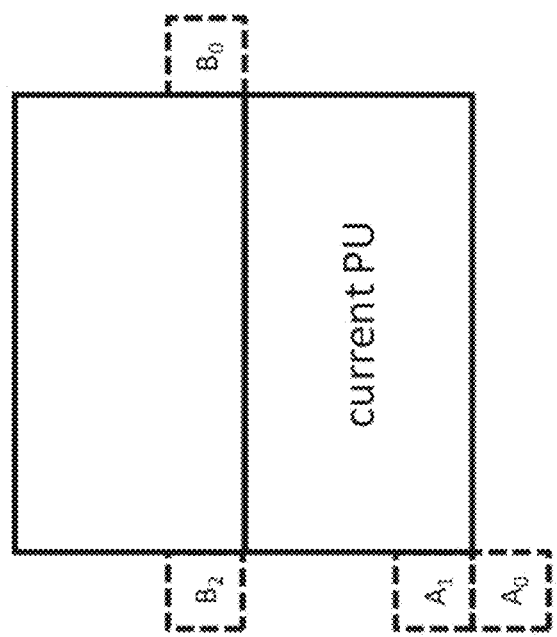
FIGS. 4A and 4B show examples of the position of a second prediction unit (PU) based on the size and shape of the current block.
Figure 4A:
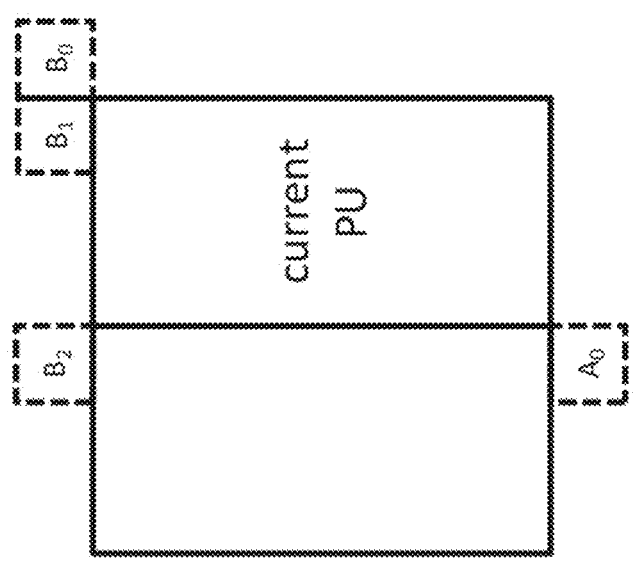

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
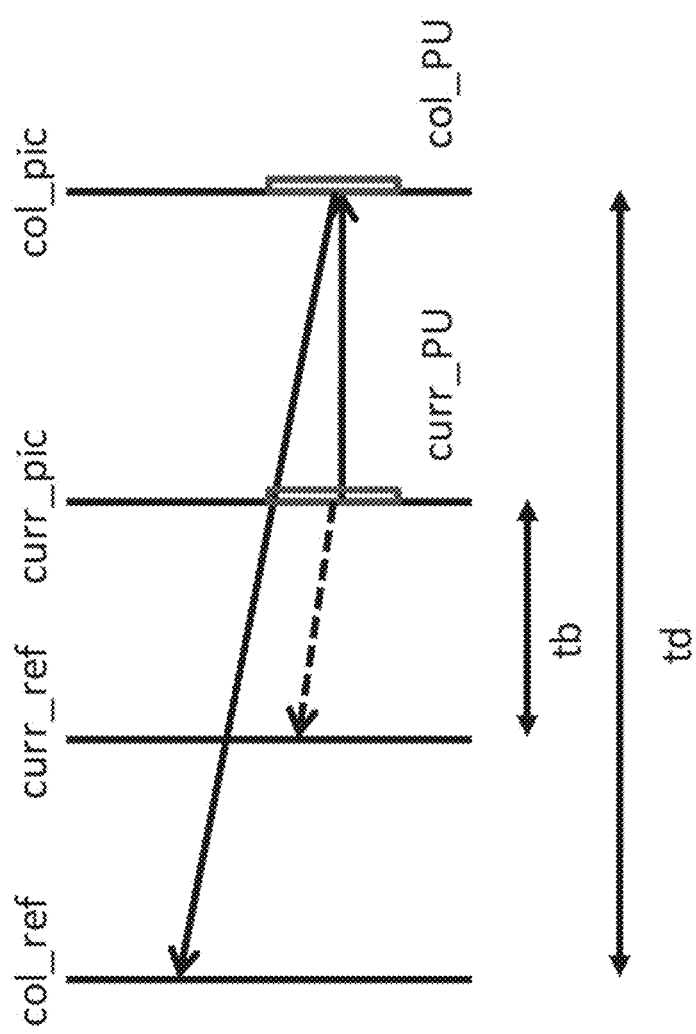
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
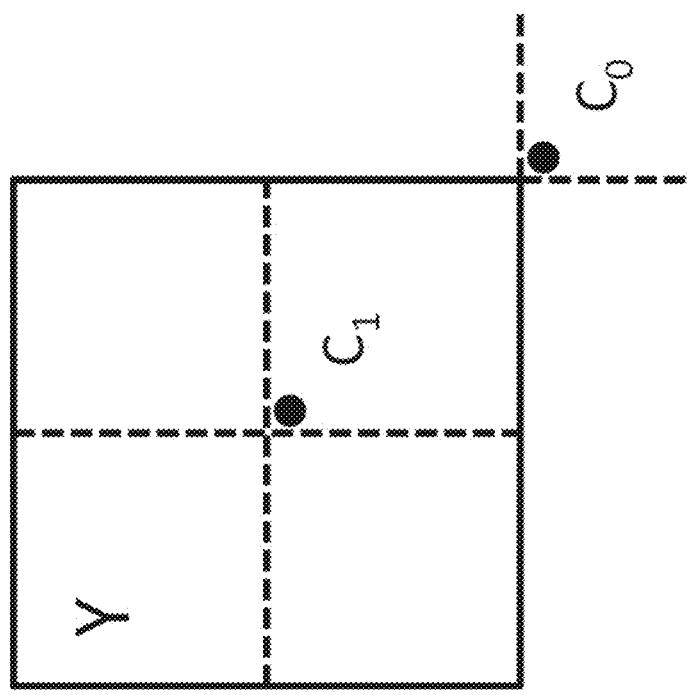
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU), position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
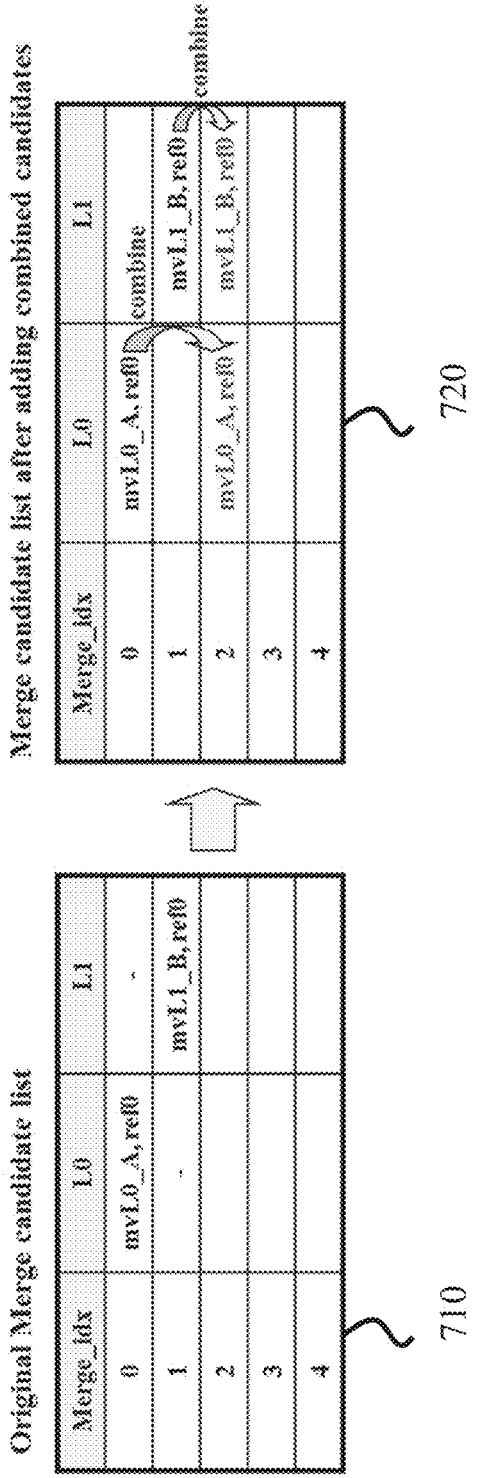
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log 2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUS, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Constructing Motion Vector Prediction Candidates

Figure 8:
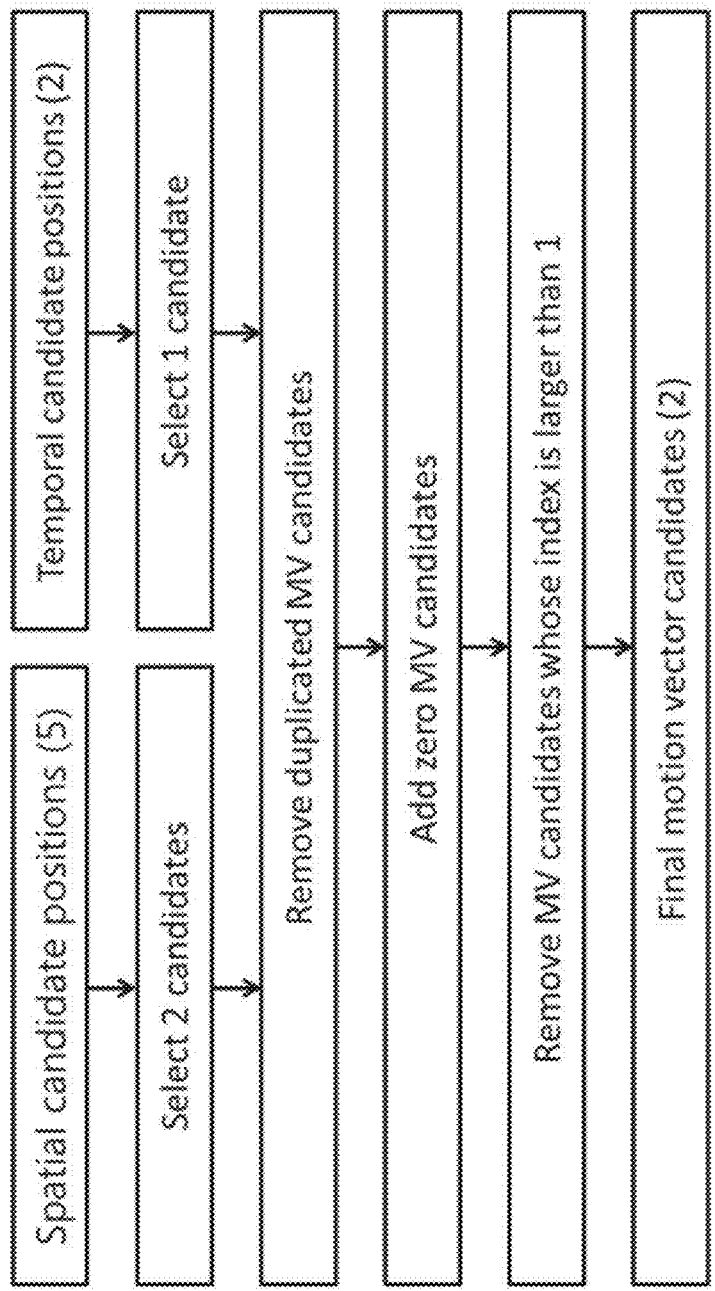
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
   (1) Same reference picture list, and same reference picture index (same POC)
   (2) Different reference picture list, but same reference picture (same POC)

Spatial scaling
   (3) Same reference picture list, but different reference picture (different POC)
   (4) Different reference picture list, and different reference picture (different POC)

The no-spatial-scaling cases are checked first followed by the cases that allow spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
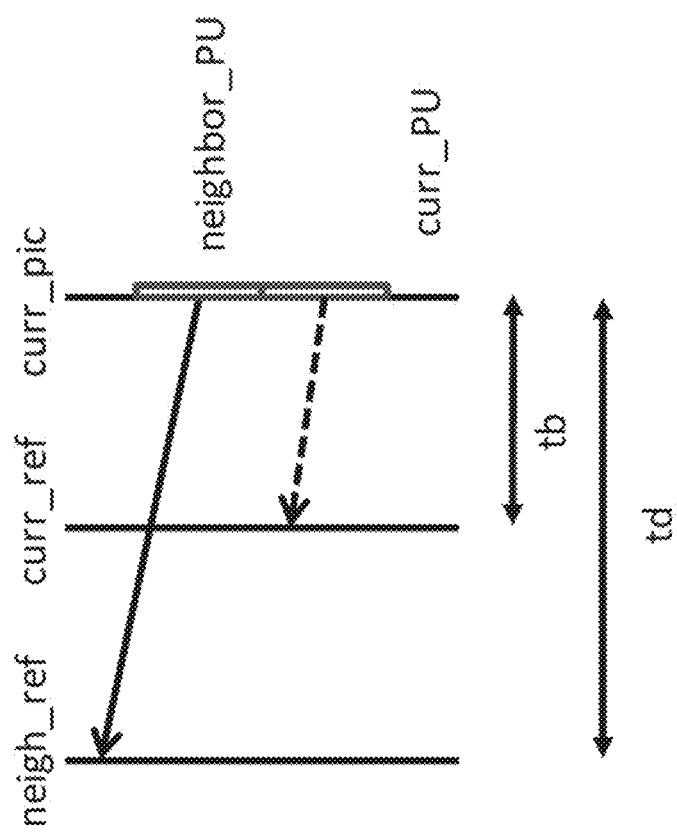
FIG. 9 shows an example of motion vector scaling for spatial motion vector candidates.

As shown in the example in FIG. 9, for the spatial scaling case, the motion vector of the neighbouring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
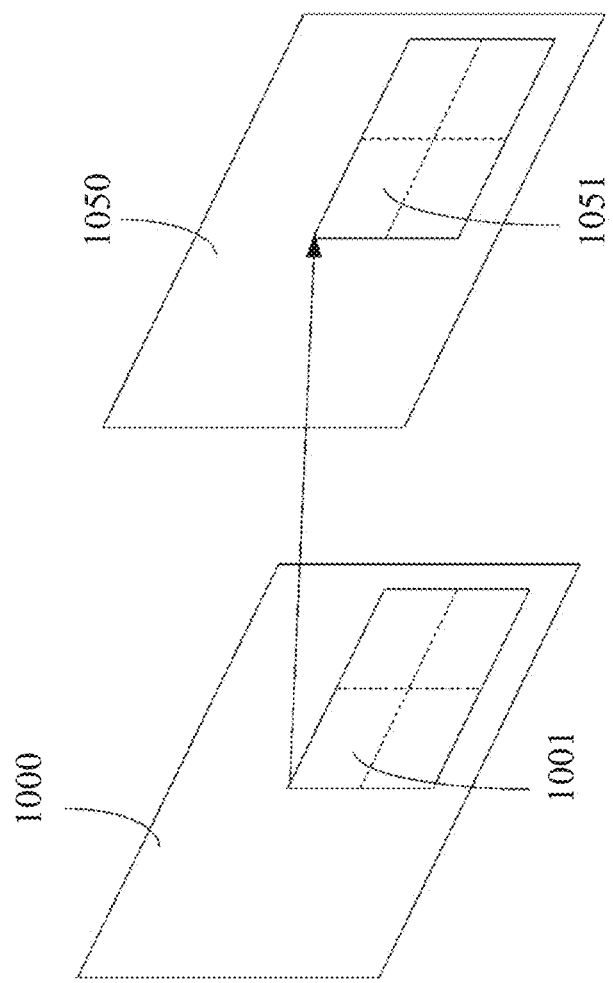
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g., the POCs of all reference pictures of the current picture are smaller than the POC of the current picture) is fulfilled and possibly uses motion vector Mvx (e.g., the motion vector corresponding to reference picture list X) to predict motion vector Mvy (e.g., with X being equal to 0 or 1 and Y being equal to 1-X) for each sub-CU.

2.1.2 Examples of Spatial-Temporal Motion Vector Prediction (STMVP)

Figure 11:
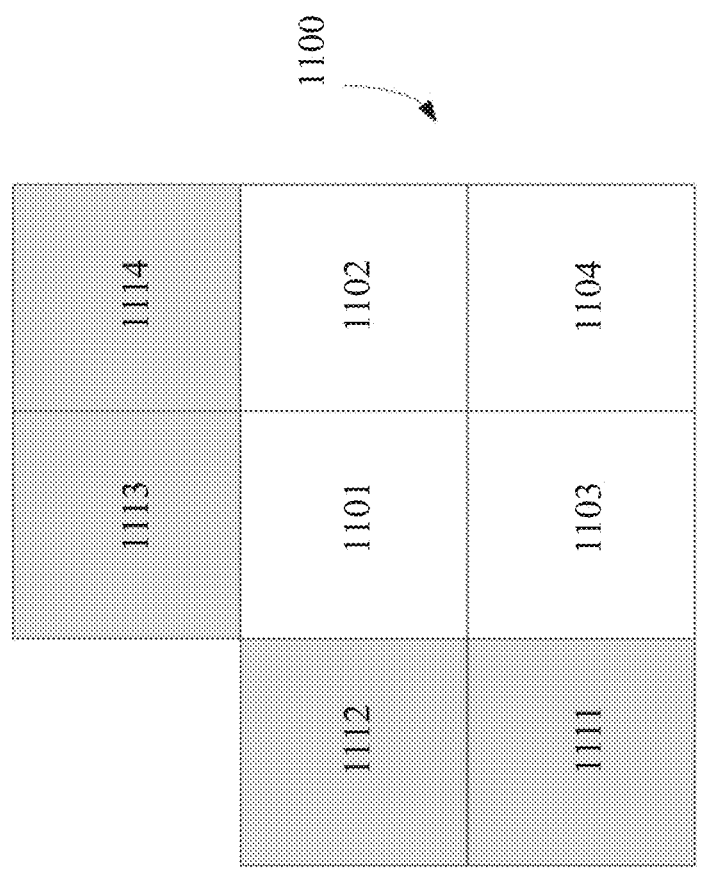
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b(1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more rate distortion (RD) checks may be needed for the two additional merge candidates. In some embodiments, e.g., JEM, all bins of the merge index are context coded by Context-based Adaptive Binary Arithmetic Coding (CABAC). In other embodiments, e.g., HEVC, only the first bin is context coded and the remaining bins are context by-pass coded.

2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3 Examples of Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.4 Examples of Overlapped Block Motion Compensation (OBMC)

In the JEM, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, an MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 12A and 12B.

Figure 12A:
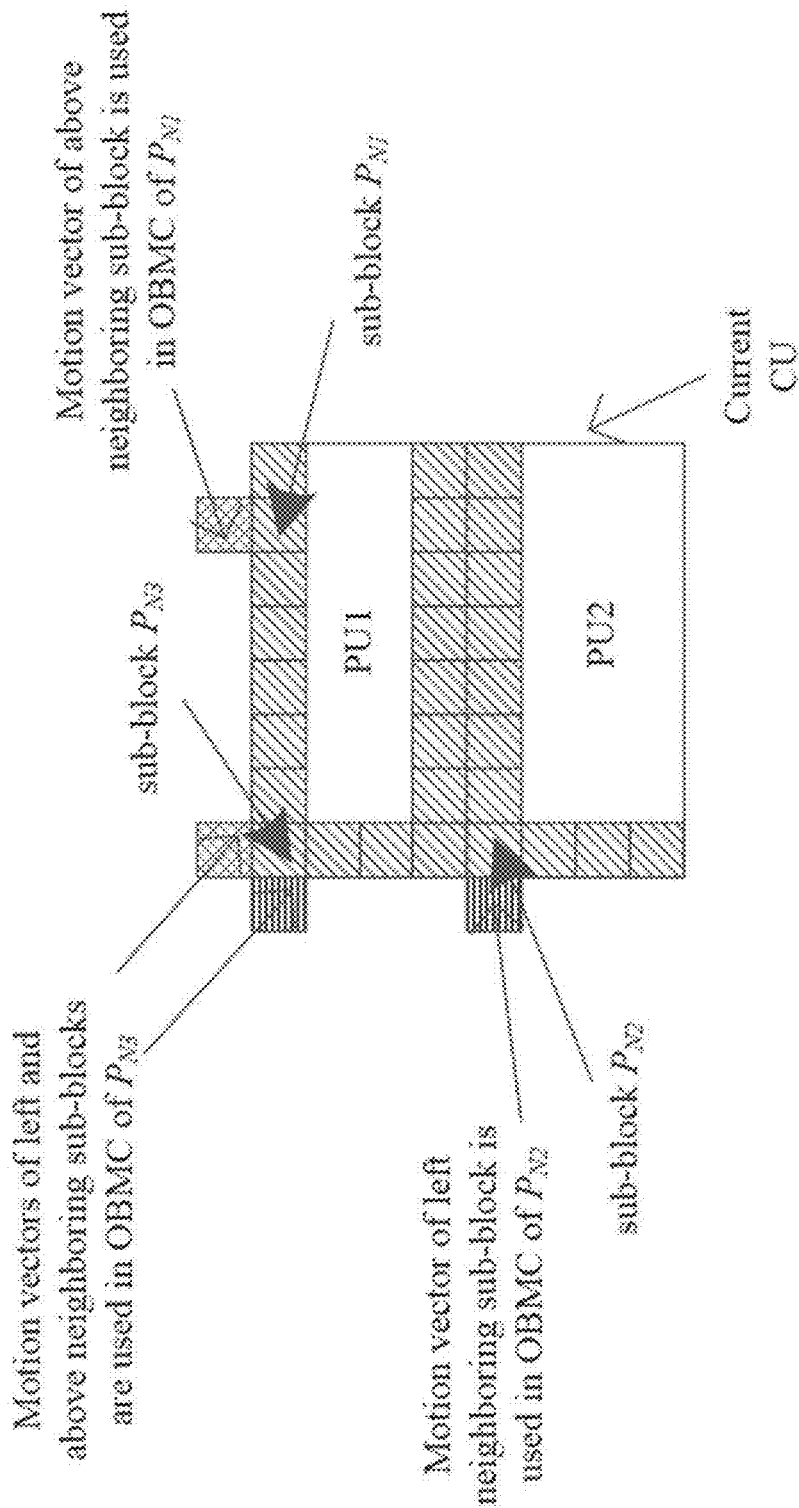
FIGS. 12A and 12B show example snapshots of sub-block when using the overlapped block motion compensation (OBMC) algorithm.
Figure 12B:
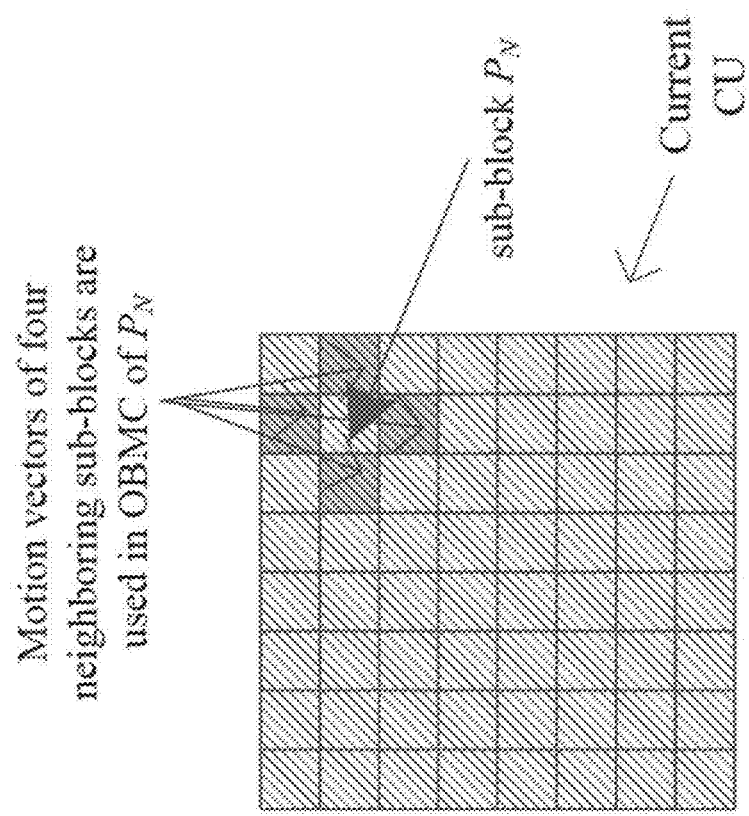

FIG. 12A shows sub-blocks at the CU/PU boundary, and the hatched sub-blocks are where OBMC applies. Similarly, FIG. 12B shows the sub-Pus in ATMVP mode.

When OBMC applies to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {1/4, 1/8, 1/16, 1/32} are used for PN and the weighting factors {3/4, 7/8, 15/16, 31/32} are used for PC. The exception are small motion compensation (MC) blocks, (i.e., when height or width of the coding block is equal to 4 or a CU is coded with sub-CU mode), for which only two rows/columns of PN are added to PC. In this case weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

2.5 Examples of Local Illumination Compensation (LIC)

LIC is based on a linear model for illumination changes, using a scaling factor a and an offset b. And it is enabled or disabled adaptively for each inter-mode coded coding unit (CU).

Figure 13:
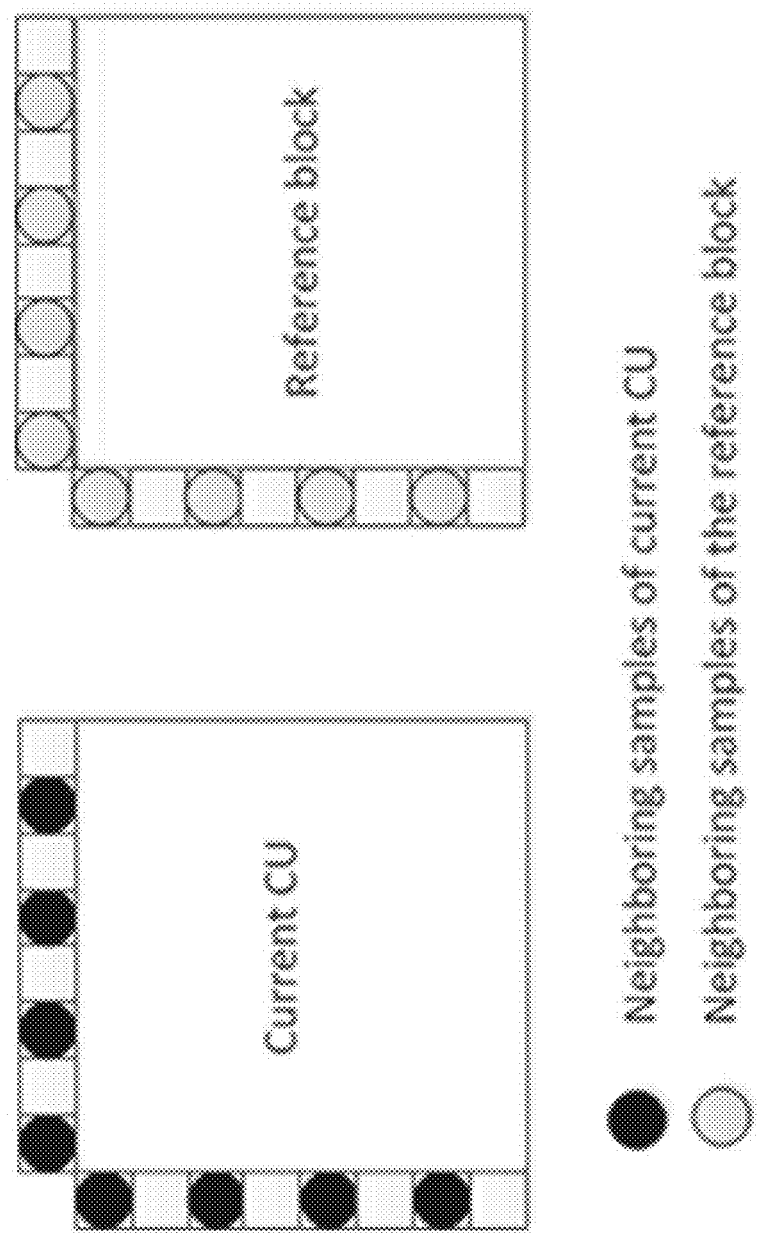
FIG. 13 shows an example of neighboring samples used to derive parameters for the local illumination compensation (LIC) algorithm.

When LIC applies for a CU, a least square error method is employed to derive the parameters a and b by using the neighboring samples of the current CU and their corresponding reference samples. FIG. 13 shows an example of neighboring samples used to derive parameters of the inverse compositional (IC) algorithm. Specifically, and as shown in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, an additional CU level RD check is needed to determine whether LIC is applied or not for a CU. When LIC is enabled for a CU, the mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM:

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.6 Examples of Affine Motion Compensation Prediction

Figure 14:
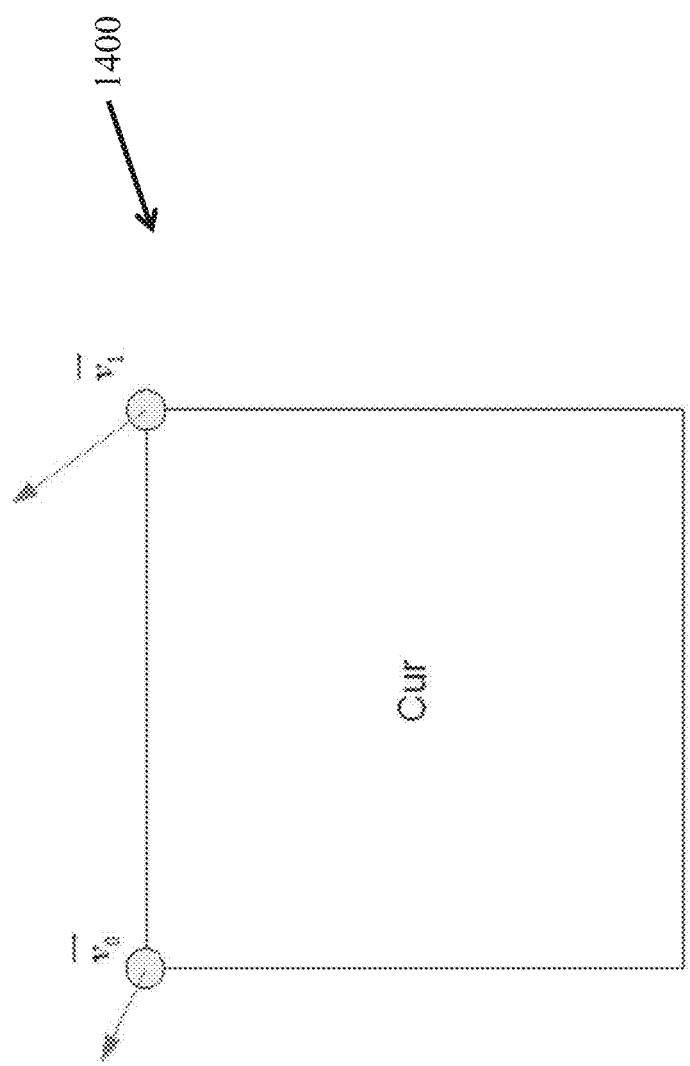
FIG. 14 shows an example of a simplified affine motion model.

In HEVC, only a translation motion model is applied for motion compensation prediction (MCP). However, the camera and objects may have many kinds of motion, e.g., zoom in/out, rotation, perspective motions, and/or other irregular motions. JEM, on the other hand, applies a simplified affine transform motion compensation prediction. FIG. 14 shows an example of an affine motion field of a block 1400 described by two control point motion vectors $v_0$ and $v_1$. The motion vector field (MVF) of the block 1400 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 14, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 15:
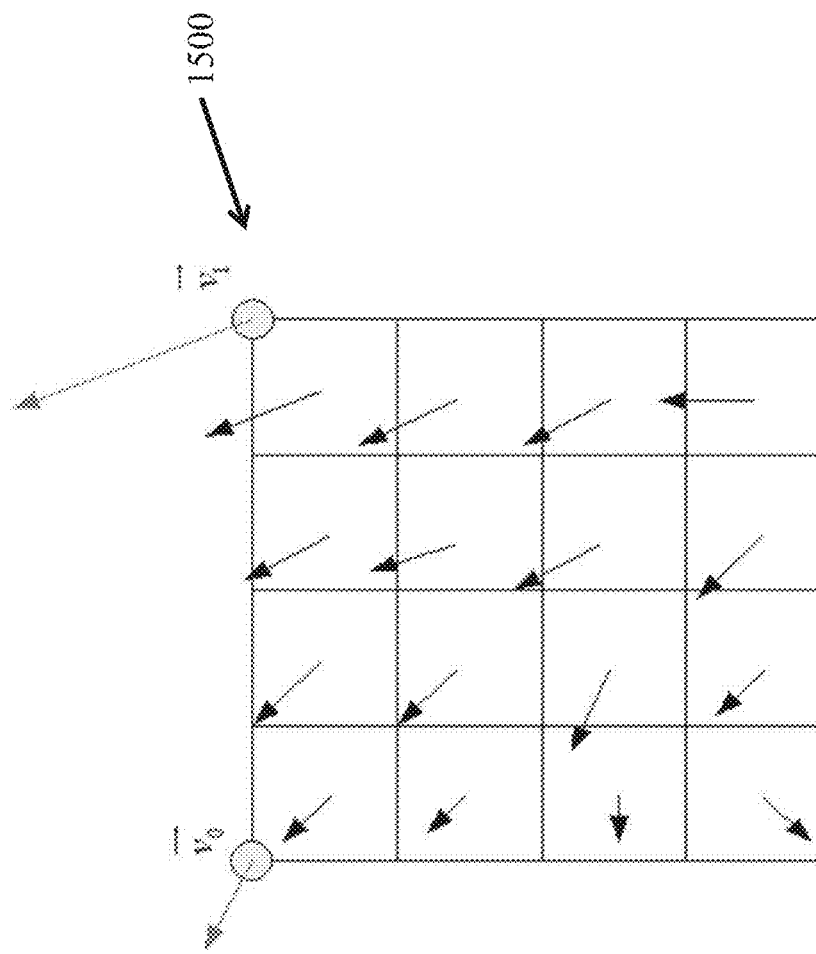
FIG. 15 shows an example of an affine motion vector field (MVF) per sub-block.

FIG. 15 shows an example of affine MVF per sub-block for a block 1500. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

2.6.1 Embodiments of the AF_INTER Mode

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_C\}, v_1=\{v_D, v_E\}\}$ is constructed using the neighboring blocks.

FIG. 16 shows an example of motion vector prediction (MVP) for a block 1600 in the AF_INTER mode. As shown in FIG. 16, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

2.6.3 Embodiments of the AF_MERGE Mode

Figure 17B:
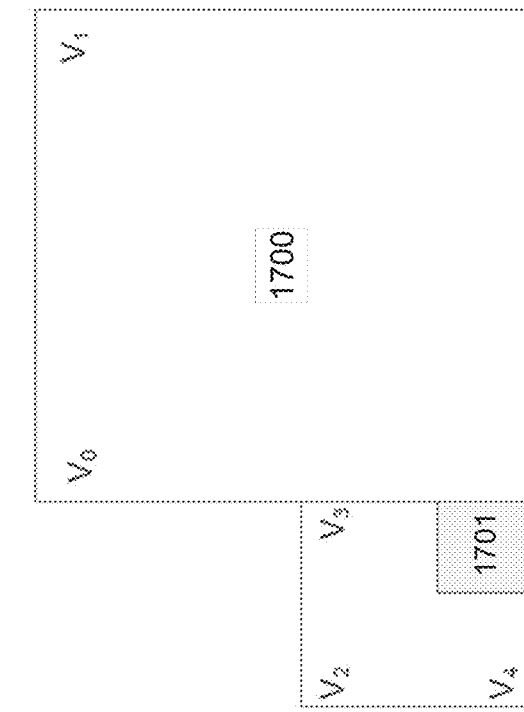
FIGS. 17A and 17B show example candidates for the AF_MERGE affine motion mode.
Figure 17A:
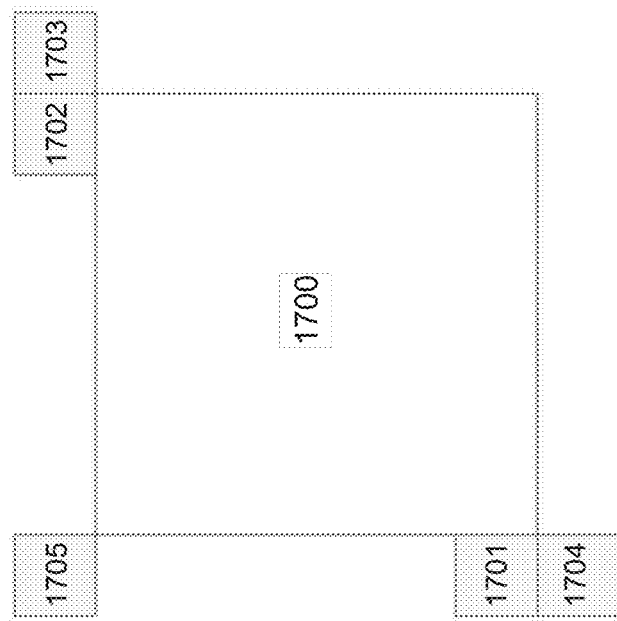

When a CU is applied in AF_MERGE mode, it gets the first block coded with an affine mode from the valid neighboring reconstructed blocks. FIG. 17A shows an example of the selection order of candidate blocks for a current CU 1700. As shown in FIG. 17A0, the selection order can be from left (1701), above (1702), above right (1703), left bottom (1704) to above left (1705) of the current CU 1700. FIG. 17B shows another example of candidate blocks for a current CU 1700 in the AF_MERGE mode. If the neighboring left bottom block 1801 is coded in affine mode, as shown in FIG. 17B, the motion vectors $v_2$, $v_3$ and $v_4$ of the top left corner, above right corner, and left bottom corner of the CU containing the sub-block 1701 are derived. The motion vector $v_0$ of the top left corner on the current CU 1700 is calculated based on $v_2$, $v_3$ and $v_4$. The motion vector $v_1$ of the above right of the current CU can be calculated accordingly.

After the CPMV of the current CU $v_0$ and $v_1$ are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

2.7 Examples of Pattern Matched Motion Vector Derivation (PMMVD)

The PMMVD mode is a special merge mode based on the Frame-Rate Up Conversion (FRUC) method. With this mode, motion information of a block is not signaled but derived at decoder side.

A FRUC flag can be signaled for a CU when its merge flag is true. When the FRUC flag is false, a merge index can be signaled and the regular merge mode is used. When the FRUC flag is true, an additional FRUC mode flag can be signaled to indicate which method (e.g., bilateral matching or template matching) is to be used to derive motion information for the block.

At the encoder side, the decision on whether using FRUC merge mode for a CU is based on RD cost selection as done for normal merge candidate. For example, multiple matching modes (e.g., bilateral matching and template matching) are checked for a CU by using RD cost selection. The one leading to the minimal cost is further compared to other CU modes. If a FRUC matching mode is the most efficient one, FRUC flag is set to true for the CU and the related matching mode is used.

Typically, motion derivation process in FRUC merge mode has two steps: a CU-level motion search is first performed, then followed by a Sub-CU level motion refinement. At CU level, an initial motion vector is derived for the whole CU based on bilateral matching or template matching. First, a list of MV candidates is generated and the candidate that leads to the minimum matching cost is selected as the starting point for further CU level refinement. Then a local search based on bilateral matching or template matching around the starting point is performed. The MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in Eq. (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad \text{Eq. (3)}$$

Figure 18:
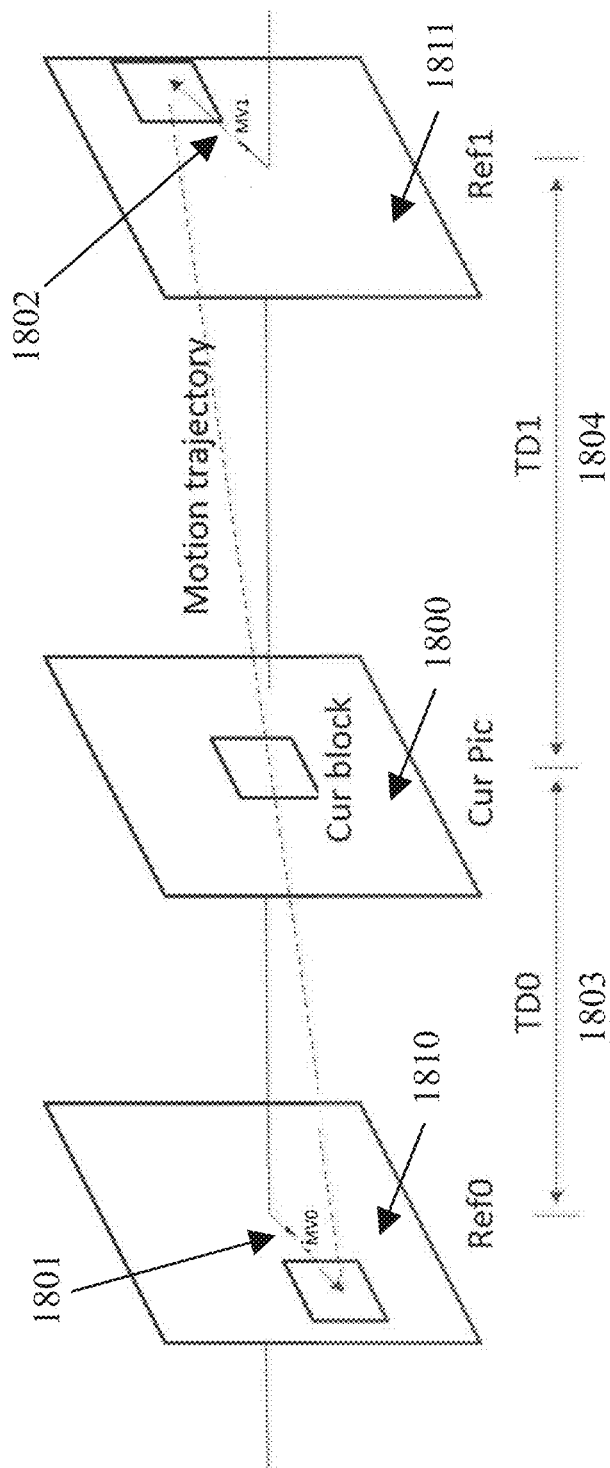
FIG. 18 shows an example of bilateral matching in pattern matched motion vector derivation (PMMVD) mode, which is a special merge mode based on the Frame-Rate Up Conversion (FRUC) algorithm.

FIG. 18 shows an example of bilateral matching used in the Frame-Rate Up Conversion (FRUC) method. The bilateral matching is used to derive motion information of the current CU by finding the closest match between two blocks along the motion trajectory of the current CU (1800) in two different reference pictures (1810, 1811). Under the assumption of continuous motion trajectory, the motion vectors MV0 (1801) and MV1 (1802) pointing to the two reference blocks are proportional to the temporal distances, e.g., TD0 (1803) and TD1 (1804), between the current picture and the two reference pictures. In some embodiments, when the current picture 1800 is temporally between the two reference pictures (1810, 1811) and the temporal distance from the current picture to the two reference pictures is the same, the bilateral matching becomes mirror based bi-directional MV.

Figure 19:
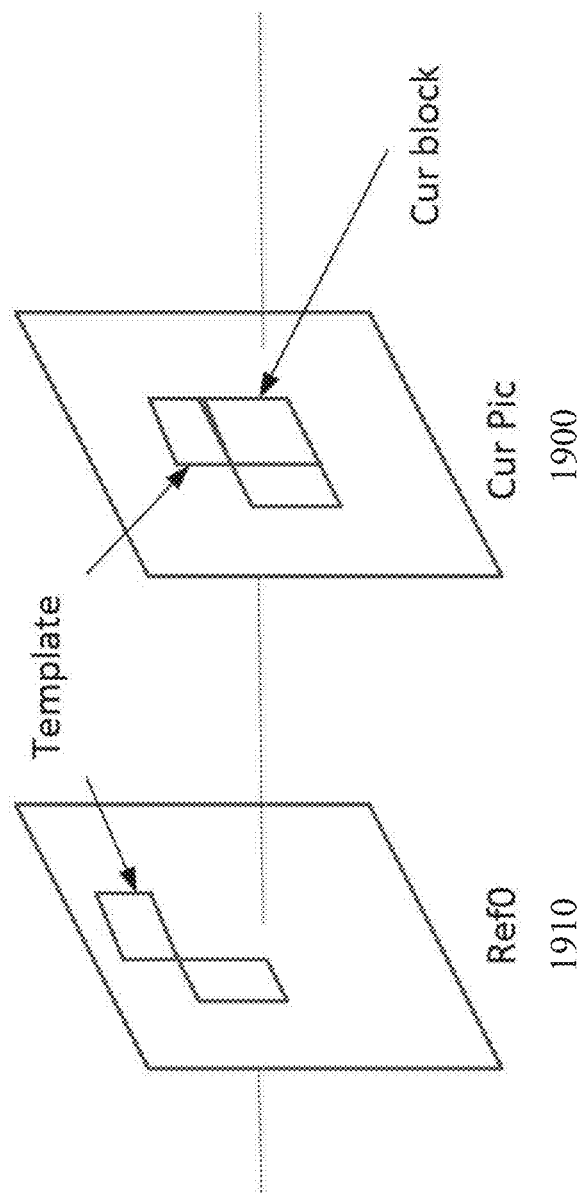
FIG. 19 shows an example of template matching in the frame rate up-conversion (FRUC) algorithm.

FIG. 19 shows an example of template matching used in the Frame-Rate Up Conversion (FRUC) method. Template matching can be used to derive motion information of the current CU 1900 by finding the closest match between a template (e.g., top and/or left neighboring blocks of the current CU) in the current picture and a block (e.g., same size to the template) in a reference picture 1910. ExCept the aforementioned FRUC merge mode, the template matching can also be applied to AMVP mode. In both JEM and HEVC, AMVP has two candidates. With the template matching method, a new candidate can be derived. If the newly derived candidate by template matching is different to the first existing AMVP candidate, it is inserted at the very beginning of the AMVP candidate list and then the list size is set to two (e.g., by removing the second existing AMVP candidate). When applied to AMVP mode, only CU level search is applied.

The MV candidate set at CU level can include the following: (1) original AMVP candidates if the current CU is in AMVP mode, (2) all merge candidates, (3) several MVs in the interpolated MV field (described later), and top and left neighboring motion vectors.

When using bilateral matching, each valid MV of a merge candidate can be used as an input to generate a MV pair with the assumption of bilateral matching. For example, one valid MV of a merge candidate is (MVa, $ref_a$) at reference list A. Then the reference picture $ref_b$ of its paired bilateral MV is found in the other reference list B so that $ref_a$ and $ref_b$ are temporally at different sides of the current picture. If such a $ref_b$ is not available in reference list B, $ref_b$ is determined as a reference which is different from $ref_a$ and its temporal distance to the current picture is the minimal one in list B. After $ref_b$ is determined, MVb is derived by scaling MVa based on the temporal distance between the current picture and $ref_a$, $ref_b$.

In some implementations, four MVs from the interpolated MV field can also be added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. In some implementations, at the CU level, 15 MVs for AMVP CUs and 13 MVs for merge CUs can be added to the candidate list.

The MV candidate set at sub-CU level includes an MV determined from a CU-level search, (2) top, left, top-left and top-right neighboring MVs, (3) scaled versions of collocated MVs from reference pictures, (4) one or more ATMVP candidates (e.g., up to four), and (5) one or more STMVP candidates (e.g., up to four). The scaled MVs from reference pictures are derived as follows. The reference pictures in both lists are traversed. The MVs at a collocated position of the sub-CU in a reference picture are scaled to the reference of the starting CU-level MV. ATMVP and STMVP candidates can be the four first ones. At the sub-CU level, one or more MVs (e.g., up to 17) are added to the candidate list.

Generation of an interpolated MV field. Before coding a frame, interpolated motion field is generated for the whole picture based on unilateral Motion Estimation (ME). Then the motion field may be used later as CU level or sub-CU level MV candidates.

Figure 20:
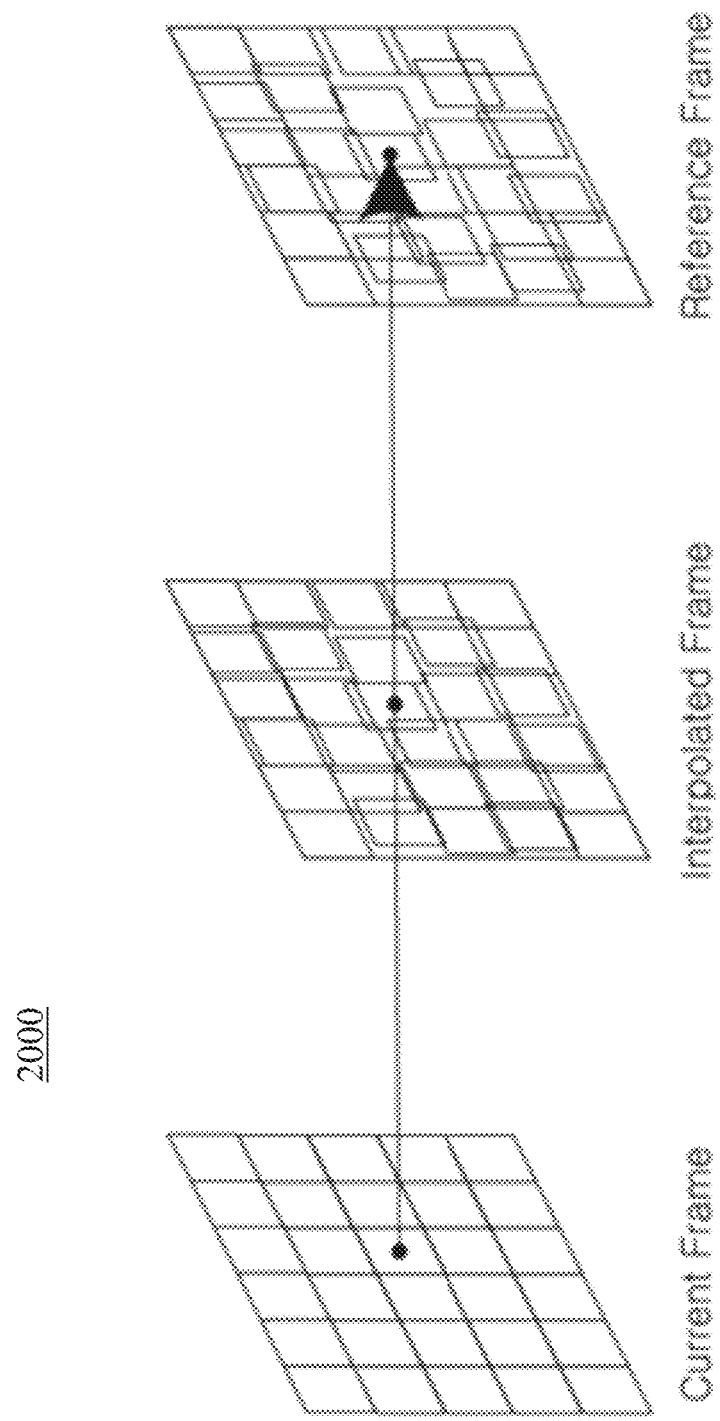
FIG. 20 shows an example of unilateral motion estimation in the FRUC algorithm.
Figure 21:
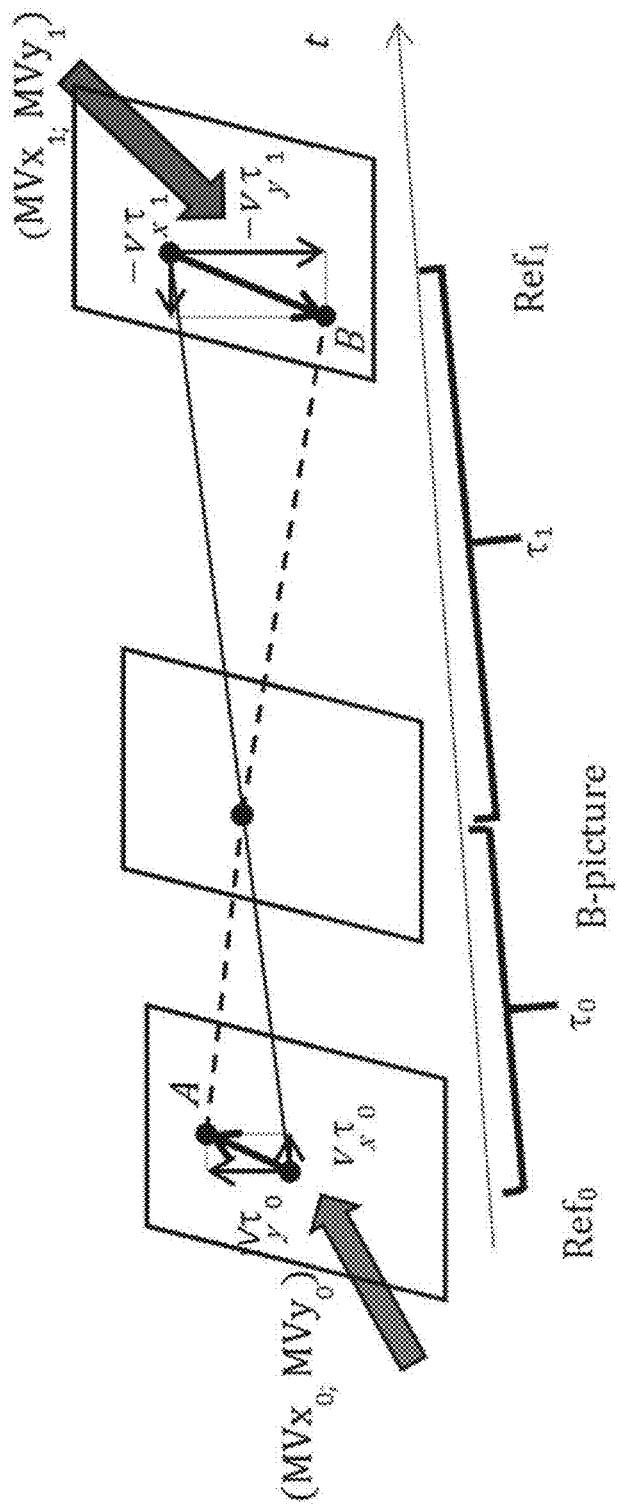
FIG. 21 shows an example of an optical flow trajectory used by the bi-directional optical flow (BIO) algorithm.

In some embodiments, the motion field of each reference pictures in both reference lists is traversed at 4×4 block level. FIG. 20 shows an example of unilateral Motion Estimation (ME) 2000 in the FRUC method. For each 4×4 block, if the motion associated to the block passing through a 4×4 block in the current picture and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

Interpolation and matching cost. When a motion vector points to a fractional sample position, motion compensated interpolation is needed. To reduce complexity, bi-linear interpolation instead of regular 8-tap HEVC interpolation can be used for both bilateral matching and template matching.

The calculation of matching cost is a bit different at different steps. When selecting the candidate from the candidate set at the CU level, the matching cost can be the absolute sum difference (SAD) of bilateral matching or template matching. After the starting MV is determined, the matching cost C of bilateral matching at sub-CU level search is calculated as follows:

$$C = SAD + w \cdot (|Mv_x - Mv_x^s| + |Mv_y - Mv_y^s|) \qquad \text{Eq. (4)}$$

Here, w is a weighting factor. In some embodiments, w can be empirically set to 4. MV and $MV^s$ indicate the current MV and the starting MV, respectively. SAD may still be used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In the bilateral matching merge mode, bi-prediction is applied because the motion information of a CU is derived based on the closest match between two blocks along the motion trajectory of the current CU in two different reference pictures. In the template matching merge mode, the encoder can choose among uni-prediction from list0, uni-prediction from list1, or bi-prediction for a CU. The selection ca be based on a template matching cost as follows:

If costBi<=factor*min (cost0, cost1)
bi-prediction is used;
Otherwise, if cost0<=cost1
uni-prediction from list0 is used;
Otherwise,
uni-prediction from list1 is used;

Here, cost0 is the SAD of list0 template matching, cost1 is the SAD of list1 template matching and costBi is the SAD of bi-prediction template matching. For example, when the value of factor is equal to 1.25, it means that the selection process is biased toward bi-prediction. The inter prediction direction selection can be applied to the CU-level template matching process.

2.8 Examples of Generalized Bi-Prediction Improvement (GBi)

Generalized Bi-prediction improvement (GBi) proposed in JVET-L0646 is adopted into VVC test model (VTM)-3.0. GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. The predictor generation formula is shown as in Equation (5).

$$P_{GBi}=(w0 \times P_{L0}+w1 \times P_{L1}+\text{RoundingOffset})>>\text{shift-Num}_{GBi} \qquad \text{Eq. (5)}$$

Herein, $P_{GBi}$ is the final predictor of GBi, $w_0$ and $w_1$ are the selected GBi weights applied to predictors ($P_{L0}$ and $P_{L1}$) of list 0 ($L_0$) and list 1 (L1), respectively. RoundingOffset$_{GBi}$ and shiftNum$_{GBi}$ are used to normalize the final predictor in GBi. The supported $w_1$ weight set is {−¼, ⅜, ½, ⅝, 5/4}, in which the five weights correspond to one equal weight pair and four unequal weight pairs. The blending gain, i.e., sum of $w_1$ and $w_0$, is fixed to 1.0. Therefore, the corresponding $w_0$ weight set is {5/4, ⅝, ½, ⅜, −¼}. The weight pair selection is at CU-level. For non-low delay pictures, the weight set size is reduced from five to three, where the w'/weight set is {⅜, ½, ⅝} and the $w_0$ weight set is {⅝, ½, ⅜}. The weight set size reduction for non-low delay pictures is applied to the BMS2.1 GBi and all the GBi tests in this contribution.

2.8.1 GBi Encoder Bug Fix

To reduce the GBi encoding time, in current encoder design, the encoder will store uni-prediction motion vectors estimated from GBi weight equal to ⅘, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to ⅘. Consequently, 4-parameter affine MVs may be overwritten by 6-parameter affine MVs after the encoding with GBi weight ⅘. The stored 6-parmater affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to ⅘, and reuse the corresponding affine MVs based on the affine model type for other GBi weights.

2.8.2 GBi Encoder Speed Up

In this existing implementation, five encoder speed-up methods are proposed to reduce the encoding time when GBi is enabled.

(1) Skipping Affine Motion Estimation for Some GBi Weights Conditionally

In BMS2.1, affine ME including 4-parameter and 6-parameter affine ME is performed for all GBi weights. We propose to skip affine ME for those unequal GBi weights (weights unequal to ⅘) conditionally. Specifically, affine ME will be performed for other GBi weights if and only if the affine mode is selected as the current best mode and it is not affine merge mode after evaluating the GBi weight of ⅘. If current picture is non-low-delay picture, the bi-prediction ME for translation model will be skipped for unequal GBi weights when affine ME is performed. If affine mode is not selected as the current best mode or if affine merge is selected as the current best mode, affine ME will be skipped for all other GBi weights.

(2) Reducing the Number of Weights for RD Cost Checking for Low-Delay Pictures in the Encoding for 1-Pel and 4-Pel MVD Precision For low-delay pictures, there are five weights for RD cost checking for all MVD precisions including ¼-pel, 1-pel and 4-pel. The encoder will check RD cost for ¼-pel MVD precision first. We propose to skip a portion of GBi weights for RD cost checking for 1-pel and 4-pel MVD precisions. We order those unequal weights according to their RD cost in ¼-pel MVD precision. Only the first two weights with the smallest RD costs, together with GBi weight ⅘, will be evaluated during the encoding in 1-pel and 4-pel MVD precisions. Therefore, three weights at most will be evaluated for 1-pel and 4-pel MVD precisions for low delay pictures.

(3) Conditionally Skipping Bi-Prediction Search when the L0 and L1 Reference Pictures are the Same For some pictures in RA, the same picture may occur in both reference picture lists (list-0 and list-1). For example, for random access coding configuration in CTC, the reference picture structure for the first group of pictures (GOP) is listed as follows.

POC: 16, TL: 0, [L0: 0̲][L1: 0̲]
POC: 8, TL: 1, [L0: 0̲ 16][L1̲: 16 0̲]
POC: 4, TL: 2, [L0: 0̲ 8̲][L1: 8̲ 16]
POC: 2, TL: 3, [L0: 0 4̲][L1: 4̲ 8]
POC: 1, TL: 4, [L0: 0 2̲][L1: 2̲ 4]
POC: 3, TL: 4, [L0: 2 0̲][L1: 4̲ 8]
POC: 6, TL: 3, [L0: 4 0][L1: 8 16]
POC: 5, TL: 4, [L0: 4 0][L1: 6 8]
POC: 7, TL: 4, [L0: 6 4][L1: 8 16]
POC: 12, TL: 2, [L0: 8 0][L1: 16 8]
POC: 10, TL: 3, [L0: 8̲ 0][L1: 1̲2 16]
POC: 9, TL: 4, [L0: 8 0][L1: 10 12]

POC: 11, TL: 4, [L0: 10 8][L1: 12 16]
POC: 14, TL: 3, [L0: 12 8][L1: 12 16]
POC: 13, TL: 4, [L0: 12 8][L1: 14 16]
POC: 15, TL: 4, [L0: 14 12][L1: 16 14]

Note that pictures 16, 8, 4, 2, 1, 12, 14 and 15 have the same reference picture(s) in both lists. For bi-prediction for these pictures, it is possible that the L0 and L1 reference pictures are the same. We propose that the encoder skips bi-prediction ME for unequal GBi weights when 1) two reference pictures in bi-prediction are the same and 2) temporal layer is greater than 1 and 3) the MVD precision is ¼-pel. For affine bi-prediction ME, this fast skipping method is only applied to 4-parameter affine ME.

(4) Skipping RD Cost Checking for Unequal GBi Weight Based on Temporal Layer and the POC distance between reference picture and current picture We propose to skip those RD cost evaluations for those unequal GBi weights when the temporal layer is equal to 4 (highest temporal layer in random access (RA)) or the POC distance between reference picture (either list-0 or list-1) and current picture is equal to 1 and coding quantization parameter (QP) is greater than 32.

(5) Changing Floating-Point Calculation to Fixed-Point Calculation for Unequal GBi Weight During ME For existing bi-prediction search, the encoder will fix the MV of one list and refine MV in another list. The target is modified before ME to reduce the computation complexity. For example, if the MV of list-1 is fixed and encoder is to refine MV of list-0, the target for list-0 MV refinement is modified with Equation (6). O is original signal and $P_1$ is the prediction signal of list-1. w is GBi weight for list-1.

$$T = ((0 << 3) - w * P_1) * (1/(8-w)) \text{Eq.} \qquad (6)$$

Herein, the term $(1/(8-w))$ is stored in floating point precision, which increases computation complexity. We propose to change Equation (6) to fixed-point as in Equation (7).

$$T = (0 * a_1 - P_1 * a_2 + \text{round}) >> N \qquad \text{Eq. (7)}$$

where $a_1$ and $a_2$ are scaling factors and they are calculated as:

$$\gamma = (1 << N)/(8-w); a_1 = \gamma << 3; a_2 = \gamma * w; \text{round} = 1 << (N-1)$$

2.8.3 CU Size Constraint for GBi

In this method, GBi is disabled for small CUs. In inter prediction mode, if bi-prediction is used and the CU area is smaller than 128 luma samples, GBi is disabled without any signaling.

2.9 Examples of Bi-Directional Optical Flow (BDOF or BIO)

2.9.1 Overview of BDOF

In BIO, motion compensation is first performed to generate the first predictions (in each prediction direction) of the current block. The first predictions are used to derive the spatial gradient, the temporal gradient and the optical flow of each sub-block or pixel within the block, which are then used to generate the second prediction, e.g., the final prediction of the sub-block or pixel. The details are described as follows.

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and denote $\partial I^{(k)}/\partial x$ and $\partial I^{(k)}/\partial y$ as the horizontal and vertical components of the $I^{(k)}$ gradient, respectively. Assuming the optical flow is valid, the motion vector field ($v_x$, $v_y$) is given by:

$$\partial I^{(k)}/\partial t + v_x \partial I^{(k)}/\partial x + v_y \partial I^{(k)}/\partial y = 0. \qquad \text{Eq. (8)}$$

Combining this optical flow equation with Hermite interpolation for the motion trajectory of each sample results in a unique third-order polynomial that matches both the function values $I^{(k)}$ and derivatives $\partial I^{(k)}/\partial x$ and $\partial I^{(k)}/\partial y$ at the ends. The value of this polynomial at t=0 is the BIO prediction:

$$\text{pred}_{BIO} = \frac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)) \qquad \text{Eq. (9)}$$

Figure 24:
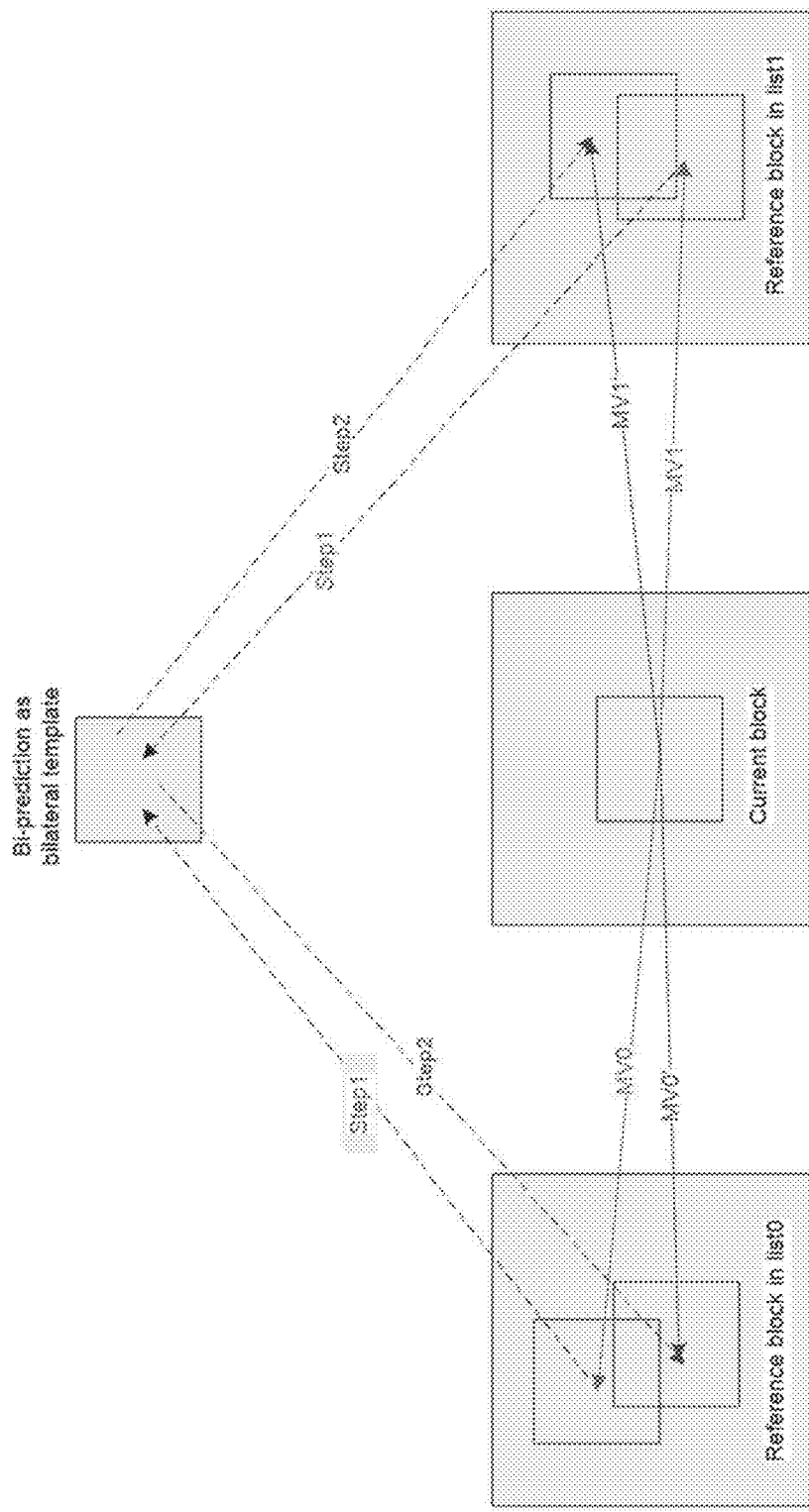
FIG. 24 shows an example of the decoder-side motion vector refinement (DMVR) algorithm based on bilateral template matching.

FIG. 24 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0 = \text{POC}(\text{current}) - \text{POC}(\text{Ref}_0)$, $\tau_1 = \text{POC}(\text{Ref}_1) - \text{POC}(\text{current})$. If both predictions come from the same time direction (either both from the past or both from the future) then the signs are different (e.g., $T_0 \cdot \tau_1 < 0$). In this case, BIO is applied if the prediction is not from the same time moment (e.g., $T_0 \neq \tau_1$). Both referenced regions have non-zero motion (e.g., $Mv_{x_0}, Mv_{y_0}, Mv_{x_1}, Mv_{y_1} \neq 0$) and the block motion vectors are proportional to the time distance (e.g., $Mv_{x_0}/Mv_{x_1} = Mv_{y_0}/Mv_{y_1} = -\tau_0/\tau_1$).

The motion vector field ($v_x$, $v_y$) is determined by minimizing the difference A between values in points A and B. FIGS. 9A-9B show an example of intersection of motion trajectory and reference frame planes. Model uses only first linear term of a local Taylor expansion for $\Delta$:

$$\Delta = (I^{(0)} - I_0^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \qquad \text{Eq. (10)}$$

All values in the above equation depend on the sample location, denoted as (i', j'). Assuming the motion is consistent in the local surrounding area, A can be minimized inside the (2M+1)×(2M+1) square window $\Omega$ centered on the currently predicted point (i, j), where M is equal to 2:

$$(v_x, v_y) = \underset{v_x, v_y}{\text{argmin}} \sum_{[i',j'] \in \Omega} \Delta^2[i', j'] \qquad \text{Eq. (11)}$$

For this optimization problem, the JEM uses a simplified approach making first a minimization in the vertical direction and then in the horizontal direction. This results in the following:

$$v_x = (s_1 + r) > m ? \text{clip3}\left(-thBIO, thBIO, -\frac{s_3}{(s_1 + r)}\right) : 0 \qquad \text{Eq. (12)}$$

$$v_y = (s_5 + r) > m ? \text{clip3}\left(-thBIO, thBIO, -\frac{s_6 - v_x s_2/2}{(s_5 + r)}\right) : 0 \qquad \text{Eq. (13)}$$

where, $$s_1 = \sum_{[i',j'] \in \Omega} (\tau_1 \partial I^{(1)}/\partial x + \tau_0 \partial I^{(0)}/\partial x)^2; \qquad \text{Eq. (14)}$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

-continued $$s_5 = \sum_{[i',j]\in\Omega} (\tau_1 \partial I^{(1)}/\partial y + \tau_0 \partial I^{(0)}/\partial y)^2;$$

$$s_6 = \sum_{[i',j]\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (12) and Eq. (13), where:

$$r = 500 \cdot 4^{d-8} \qquad \text{Eq. (15)}$$

$$m = 700 \cdot 44^{d-8} \qquad \text{Eq. (16)}$$

Here, d is bit depth of the video samples.

Figures 22A, 22B:
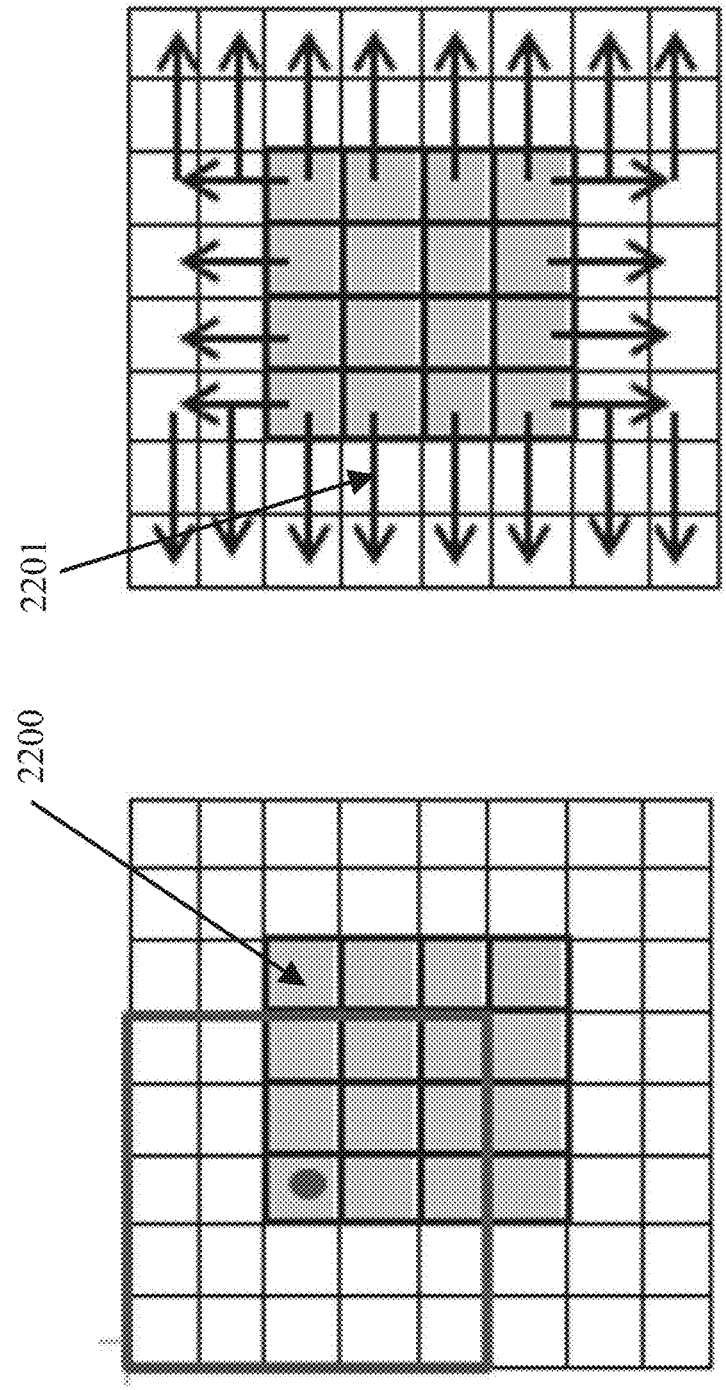
FIGS. 22A and 22B show example snapshots of using of the bi-directional optical flow (BIO) algorithm without block extensions.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated for positions inside the current block. FIG. 22A shows an example of access positions outside of a block 2200. As shown in FIG. 22A, in Eq. (12), (2M+1)×(2M+1) square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 2201, as shown in FIG. 22B.

With BIO, it is possible that the motion field can be refined for each sample. To reduce the computational complexity, a block-based design of BIO is used in the JEM. The motion refinement can be calculated based on a 4×4 block. In the block-based BIO, the values of $s_n$ in Eq. (12) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y)\in b_k} \sum_{[i',j]\in\Omega(x,y)} (\tau_1 \partial I^{(1)}/\partial x + \tau_0 \partial I^{(0)}/\partial x)^2; \qquad \text{Eq. (17)}$$

$$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (12) and Eq (13) are replaced by $((s_{n,bk})>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient $\partial I/\partial y$, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 1 shows example filters that can be used for gradients calculation of different fractional positions of block motion vector in BIO. Table 2 shows example interpolation filters that can be used for prediction signal generation in BIO.

TABLE 1

Exemplary filters for gradient calculations in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Exemplary interpolation filters for prediction signal generation in BIO

| Fractional pel position | Interpolation filter for prediction signal(BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO can be applied to all bi-predicted blocks when the two predictions are from different reference pictures. When Local Illumination Compensation (LIC) is enabled for a CU, BIO can be disabled.

In some embodiments, OBMC is applied for a block after normal MC process. To reduce the computational complexity, BIO may not be applied during the OBMC process. This means that BIO is applied in the MC process for a block when using its own MV and is not applied in the MC process when the MV of a neighboring block is used during the OBMC process.

2.9.2 Examples of BIO in VTM-3.0 as proposed in JVET-L0256

Step 1: Judge Whether BIO is Applicable (W/H are Width/Height of Current Block)

BIO is not applicable if
Current video block is affine coded or ATMVP coded
$(iPOC-iPOC_0) \times (iPOC-iPOC_1) \geq 0$
H==4 or (W==4 and H==8)
with Weighted Prediction
GBi weights are not (1,1)
BIO is not used if total SAD between the two reference blocks (denoted as $R_0$ and $R_1$) is smaller than a threshold, wherein $$SAD = \sum_{(x,y)} |R_0(x,y) - R_1(x,y)|$$

Step 2: Data Preparation

For a W×H block, (W+2)×(H+2) samples are interpolated.

The inner W×H samples are interpolated with the 8-tap interpolation filter as in normal motion compensation.

The four side outer lines of samples (black circles in FIG. 23) are interpolated with the bi-linear filter.

For each position, gradients are calculated on the two reference blocks ($R_0$ and $R_1$).

$$Gx0(x,y)=(R0(x+1,y)-R0(x-1,y))>>4$$

$$Gy0(x,y)=(R0(x,y+1)-R0(x,y-1))>>4$$

$$Gx1(x,y)=(R1(x+1,y)-R1(x-1,y))>>4$$

$$Gy1(x,y)=(R1(x,y+1)-R1(x,y-1))>>4$$

For each position, internal values are calculated as:

$$T1=(R0(x,y)>>6)-(R1(x,y)>>6), T2=(Gx0(x,y)+Gx1(x,y))>>3, T3=(Gy0(x,y)+Gy1(x,y))>>3; \text{ and}$$

$$B1(x,y)=T2*T2, B2(x,y)=T2*T3, B3(x,y)=-T1*T2, B5(x,y)=T3*T3, B6(x,y)=-T1*T3$$

Step 3: Calculate Prediction for Each Block

BIO is skipped for a 4×4 block if SAD between the two 4×4 reference blocks is smaller than a threshold.

Calculate Vx and Vy.

Calculate the final prediction for each position in the 4×4 block:

$$b(x,y)=(V_x(G_x^0(x,y)-G_x^1(x,y))+V_y(G_y^0(x,y)-G_y^1(x,y))+1)>>1$$

$$P(x,y)=(R^0(x,y)+R^1(x,y)+b(x,y)+\text{offset})>\text{shift}$$

Herein, b(x,y) is known as a correction item.

2.9.3 BIO in VTM-4.0

JVET-M0063, which proposed to round the results of calculation in BDOF depending on bit-depth was adopted into VTM-4.0.

Figure 23:
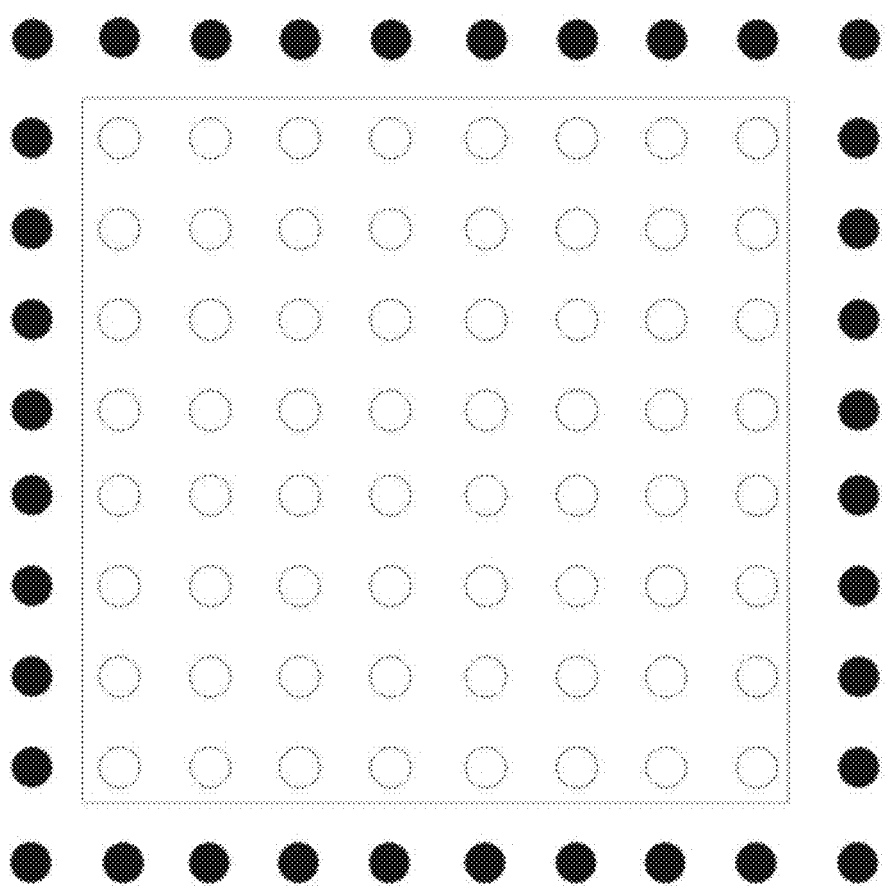
FIG. 23 shows an example of the interpolated samples used in BIO.

JVET-M0487 was adopted into VTM-4.0, which removed the bi-linear filtering and fetched the nearest integer pixel of the reference block to pad the four side outer lines of samples (black circles in FIG. 23).

The working draft related to BIO in VTM-4.0 are shown as below (from JVET-M1001)

2.9.4 Fractional Sample Interpolation Process

General

Inputs to this Process are:
- a luma location (xSb, ySb) specifying the top-left sample of the current coding subblock relative to the top-left luma sample of the current picture,
- a variable sbWidth specifying the width of the current coding subblock,
- a variable sbHeight specifying the height of the current coding subblock,
- a motion vector offset mvOffset,
- a refined motion vector refMvLX,
- the selected reference picture sample array refPicLX,
- the bidirectional optical flow flag bdofFlag,
- a variable cIdx specifying the colour component index of the current block.

Outputs of this process are:
- an (sbWidth+bdofOffset)×(sbHeight+bdofOffset) array predSamplesLX of prediction sample values.

The bidirectional optical flow boundary offset bdofOffset is derived as follows:

$$\text{bdofOffset}=\text{bdofFlag}?2:0 \quad (8\text{-}811)$$

If cIdx is equal to 0, the following applies:

Let ($xInt_L$, $yInt_L$) be a luma location given in full-sample units and ($xFrac_L$, $yFrac_L$) be an offset given in 1/16-sample units. These variables are used only in this clause for specifying fractional-sample locations inside the reference sample arrays refPicLX.

For each luma sample location ($x_L=0$ ... sbWidth−1+bdofOffset, $y_L=0$ ... sbHeight−1+bdofOffset) inside the prediction luma sample array predSamplesLX, the corresponding prediction luma sample value predSamplesLX[$x_L$][$y_L$] is derived as follows:

The variables $xInt_L$, $yInt_L$, $xFrac_L$ and $yFrac_L$ are derived as follows:

$$xInt_L=xSb+(\text{refMvLX}[0]>>4)+x_L \quad (8\text{-}812)$$

$$yInt_L=ySb+(\text{refMvLX}[1]>>4)+y_L \quad (8\text{-}813)$$

$$xFrac_L=\text{refMvLX}[0]\&15 \quad (8\text{-}814)$$

$$yFrac_L=\text{refMvLX}[1]\&15 \quad (8\text{-}815)$$

If bdofFlag is equal to TRUE and one or more of the following conditions are true, the prediction luma sample value predSamplesLX[$x_L$][$y_L$] is derived by invoking the luma integer sample fetching process as specified in clause 8.5.7.3.3 with ($xInt_L$, $yInt_L$), ($xFrac_L$, $yFrac_L$) and refPicLX as inputs:

bdofFlag is equal to TRUE.
$x_L$ is equal to 0.
$x_L$ is equal to sbWidth+1.
$y_L$ is equal to 0.
$y_L$ is equal to sbHeight+1.

Otherwise, the following applies:

The motion vector mvLX is set equal to (refMvLX−mvOffset).

The prediction luma sample value predSamplesLX[$x_L$][$y_L$] is derived by invoking the luma sample 8-tap interpolation filtering process as specified in clause 8.5.7.3.2 with ($xInt_L$, $yInt_L$), ($xFrac_L$, $yFrac_L$), refPicLX, and padVal as inputs.

Luma Integer Sample Fetching Process
Inputs to this Process are:
  a luma location in full-sample units ($xInt_L$, $yInt_L$),
  the luma reference sample array $refPicLx_L$.
  Output of this process is a predicted luma sample value predSampleLXL The variable shift is set equal to Max (2, 14-$BitDepth_Y$).
The variable picW is set equal to pic_width_in_luma_samples and the variable picH is set equal to pic_height_in_luma_samples.
The luma locations in full-sample units (xInt, yInt) are derived as follows:

$$xInt=Clip3(0,picW-1,sps\_ref\_wraparound\_enabled\_flag? \quad (8\text{-}838)$$

$$ClipH((sps\_ref\_wraparound\_offset\_minus1+1)*MinCbSizeY,picW,xInt_L)xInt_L):yInt=Clip3(0,picH-1,yInt_L) \quad (8\text{-}839)$$

The predicted luma sample value $predSampleLx_L$ is derived as follows:

$$predSampleLXL=refPicLx_L[xInt][yInt]<<shift3 \quad (8\text{-}840)$$

Bidirectional Optical Flow Prediction Process
Inputs to this Process are:
  two variables nCbW and nCbH specifying the width and the height of the current coding block,
  two (nCbW+2)×(nCbH+2) luma prediction sample arrays predSamplesL0 and predSamplesL1,
  the prediction list utilization flags predFlagL0 and predFlagL1,
  the reference indices refIdxL0 and refIdxL1,
  the bidirectional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values. Variables bitDepth, shift1, shift2, shift3, shift4, offset4, and mvRefineThres are derived as follows:
  The variable bitDepth is set equal to $BitDepth_Y$.
  The variable shift1 is set to equal to Max (2, 14-bitDepth).
  The variable shift2 is set to equal to Max (8, bitDepth-4).
  The variable shift3 is set to equal to Max (5, bitDepth-7).
  The variable shift4 is set equal to Max (3, 15-bitDepth) and the variable offset4 is set equal to 1<<(shift4-1).
  The variable mvRefineThres is set equal to Max (2, 1<<(13-bitDepth)).

For xIdx=0 . . . (nCbW>>2)−1 and yIdx=0 . . . (nCbH>>2)−1, the following applies:
  The variable xSb is set equal to (xIdx<<2)+1 and ySb is set equal to (yIdx<<2)+1.
  If bdofUtilizationFlag[xSbIdx][yIdx] is equal to FALSE, for x=xSb−1 . . . xSb+2, y=ySb−1 . . . ySb+2, the prediction sample values of the current subblock are derived as follows:

$$pbSamples[x][y]=Clip3(0,(2^{bitDepth})-1,(predSamplesL0[x+1][y+1]+offset2+predSamplesL1[x+1][y+1])>>shift2) \quad (8\text{-}852)$$

Otherwise (bdofUtilizationFlag[xSbIdx][yIdx] is equal to TRUE), the prediction sample values of the current subblock are derived as follows:
  For x=xSb−1 . . . xSb+4, y=ySb−1 . . . ySb+4, the following ordered steps apply:

1. The locations ($h_x$, $v_y$) for each of the corresponding sample locations (x, y) inside the prediction sample arrays are derived as follows:

$$h_x=Clip3(1,nCbW,x) \quad (8\text{-}853)$$

$$v_y=Clip3(1,nCbH,y) \quad (8\text{-}854)$$

2. The variables gradientHL0[x][y], gradientVL0[x][y], gradientHL1[x][y] and gradientVL1[x][y] are derived as follows:

$$gradientHL0[x][y]=(predSamplesL0[h_x+1][v_y]-predSampleL0[h_x-1][v_y])>>shift1 \quad (8\text{-}855)$$

$$gradientVL0[x][y]=(predSampleL0[h_x][v_y+1]-predSampleL0[h_x][v_y-1\ 1])>>shift1 \quad (8\text{-}856)$$

$$gradientHL1[x][y]=(predSamplesL1[h_x+1][v_y]-predSampleL1[h_x-1][v_y])>>shift1 \quad (8\text{-}857)$$

$$gradientVL1[x][y]=(predSampleL1[h_x][v_y+1]-predSampleL1[h_x][v_y-1])>>shift1 \quad (8\text{-}858)$$

3. The variables temp[x][y], tempH[x][y] and tempV[x][y] are derived as follows:

$$diff[x][y]=(predSamplesL0[h_x][v_y]>>shift2)-(predSamplesL1[h_x][v_y]>>shift2) \quad (8\text{-}859)$$

$$tempH[x][y]=(gradientHL0[x][y]+gradientHL1[x][y])>>shift3 \quad (8\text{-}860)$$

$$tempV[x][y]=(gradientVL0[x][y]+gradientVL1[x][y])>>shift3 \quad (8\text{-}861)$$

The variables sGx2, sGy2, sGxGy, sGxdI and sGydI are derived as follows:

$$sGx2=\Sigma_i\Sigma_j(tempH[xSb+i][ySb+j]*tempH[xSb+i][ySb+j]) \text{ with } i,j=-1.4 \quad (8\text{-}862)$$

$$sGy2=\Sigma_i\Sigma_j(tempV[xSb+i][ySb+j]*tempV[xSb+i][ySb+j]) \text{ with } i,j=-1.4 \quad (8\text{-}863)$$

$$sGxGy=\Sigma_i\Sigma_j(tempH[xSb+i][ySb+j]*tempV[xSb+i][ySb+j]) \text{ with } i,j-1.4 \quad (8\text{-}864)$$

$$sGxdI=\Sigma_i\Sigma_j(-tempH[xSb+i][ySb+j]*diff[xSb+i][ySb+j]) \text{ with } i,j=-1.4 \quad (8\text{-}865)$$

$$sGydI=\Sigma_i\Sigma_j(-tempV[xSb+i][ySb+j]*diff[xSb+i][ySb+j]) \text{ with } i,j=-1.4 \quad (8\text{-}866)$$

The horizontal and vertical motion offset of the current subblock are derived as:

$$v_x=sGx2>0?Clip3(-mvRefineThres,mvRefineThres,(sGxdI<<3)>>Floor(Log\ 2(sGx2))):0 \quad (8\text{-}867)$$

$$v_y=sGy2>0?Clip3(-mvRefineThres,mvRefineThres,((sGydI<<3)-((v_x*sGxGy_m)<<12+v_x*sGxGy_s)>>1)>>Floor(Log\ 2(sGx2))):0 \quad (8\text{-}868)$$

For x=xSb−1 . . . xSb+2, y=ySb−1 . . . ySb+2, the prediction sample values of the current sub-block are derived as follows:

$$bdofOffset=Round((v_x*(gradientHL1[x+1][y+1]-gradientHL0[x+1][y+1]))>>1)Round((v_y*(gradientVL1[x+1][y+1]-gradientVL0[x+1][y+1\ 1]))>>1) \quad (8\text{-}869)$$

[Ed. (JC): Round ( ) operation is defined for float input. The Round ( ) operation seems redundant here since the input is an integer value. To be confirmed by the proponent]

$$pbSamples[x][y]=Clip3(0,(2^{bitDepth})-1,(predSamplesL0[x+1][y+1]+offset4+predSamplesL1[x+1][y+1]+bdofOffset)>>shift4) \quad (8\text{-}870)$$

2.10 Examples of Decoder-Side Motion Vector Refinement (DMVR)

In a bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 24. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.11 JVET-N0236

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction I(i, j).

Step 2) The spatial gradients $g_x(i, j)$ and $g_y(i, j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 25:
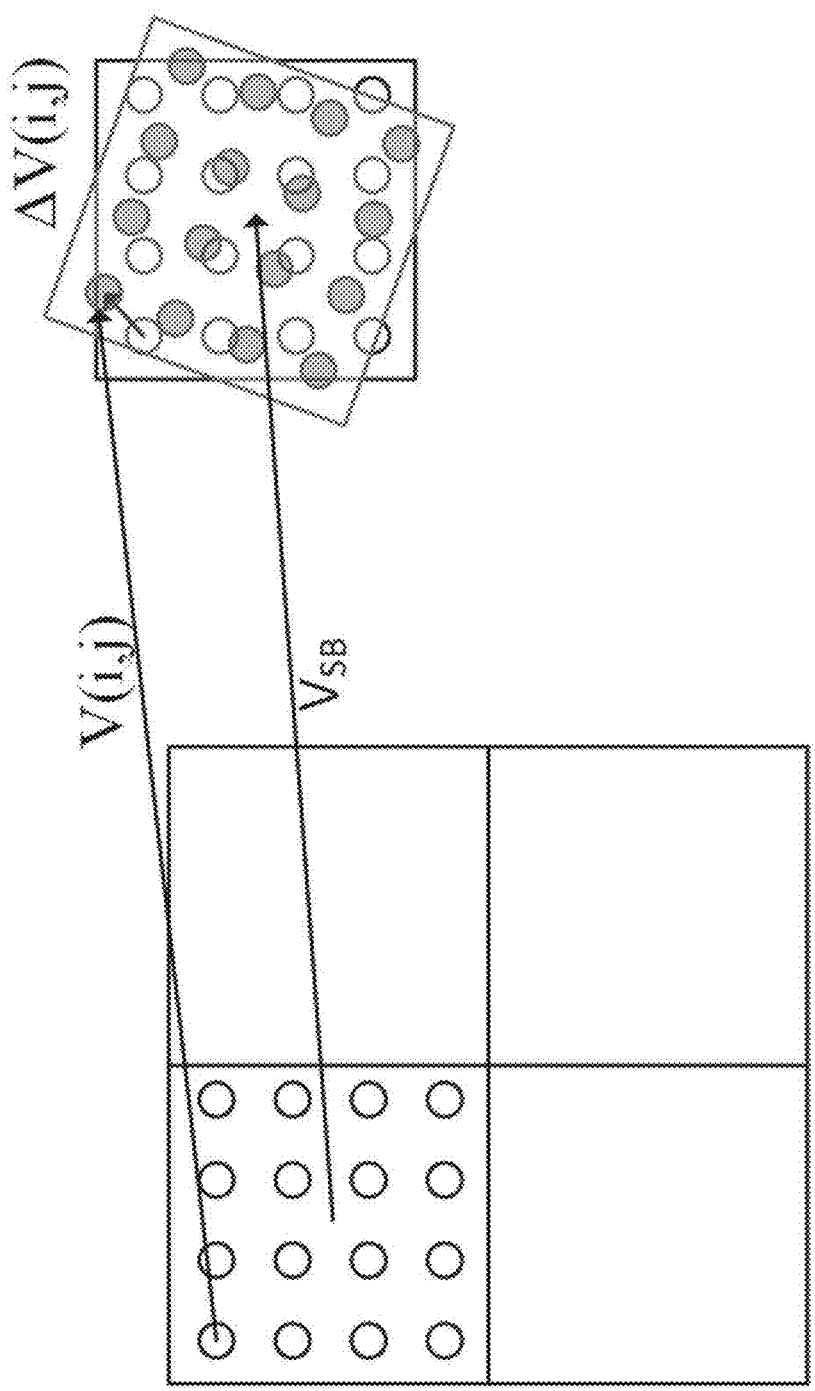
FIG. 25 shows an example of a sub-block MV video step buffer (VSB) and pixel Av(i, j).

Step 3) The luma prediction refinement (denoted ΔI) as is calculated by the optical flow equation.

$$\Delta I(i,j)=g_x(i,j)*\Delta v_x(i,j)+g_y(i,j)*\Delta v_y(i,j)$$

where the delta MV (denoted as Δv(i, j)) is the difference between pixel MV computed for sample location (i, j), denoted by v (i, j), and the sub-block MV of the sub-block to which pixel (i, j) belongs, as shown in FIG. 25.

Since the affine model parameters and the pixel location relative to the sub-block center are not changed from sub-block to sub-block, Δv(i, j) can be calculated for the first sub-block, and reused for other sub-blocks in the same CU. Let x and y be the horizontal and vertical offset from the pixel location to the center of the sub-block, Δv (x, y) can be derived by the following equation, $$\begin{cases} \Delta v_x(x, y) = c*x+d*y \\ \Delta v_y(x, y) = e*x+f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i, j). The final prediction I' is generated as the following equation.

$$I'(i,j)=I(i,j)+\Delta_1(i,j)$$

Some Details in JVET-N0236 a) How to derive the gradients for PROF

In JVET-N0263, the gradients are calculated for each sub-block (4×4 sub-block in VTM-4.0) for each reference list. For each sub-block, the nearest integer samples of the reference block are fetched to pad the four side outer lines of samples (black circles in FIG. 23).

Suppose the MV for the current sub-block is (Mvx, Mvy). Then the fractional part is calculated as (FracX, FracY)=(Mvx&15, Mvy&15). The integer part is calculated as (IntX, IntY)=(Mvx>>4, Mvy>>4). The offsets (OffsetX, OffsetY) are derived as:

OffsetX=FracX>7?1:0;

OffsetY=FracY>7?1:0;

Suppose the top-left coordinate of the current sub-block is (xCur, yCur) and the dimensions of the current sub-block is W×H.
Then (xCor0, yCor0), (xCor1, yCor1), (xCor2, yCor2) and (xCor3, yCor3) are calculated as (xCor0,yCor0)=(xCur+IntX+OffsetX−1,yCur+IntY+OffsetY−1);

(xCor1,yCor1)=(xCur+IntX+OffsetX−1,yCur+IntY+OffsetY+H);

(xCor2,yCor2)=(xCur+IntX+OffsetX−1,yCur+IntY+OffsetY);

(xCor3,yCor3)=(xCur+IntX+OffsetX+W,yCur+IntY+OffsetY);

Suppose PredSample[x][y] with x=0 .... W−1, y=0 .... H−1 stores the prediction samples for the sub-block. Then the padding samples are derived as:

PredSample[x][−1]=(Ref(xCor0+x,yCor0)<<Shift0)−Rounding,for x=−1... W;

PredSample[x][H]=(Ref(xCor1+x,yCor1)<<Shift0)−Rounding,for x=−1... W;

PredSample[−1][y]=(Ref(xCor2,yCor2+y)<<Shift0)−Rounding,for y=0... H−1;

PredSample[W][y]=(Ref(xCor3,yCor3+y)<<Shift0)−Rounding,for y=0... H−1;

where Rec represents the reference picture. Rounding is an integer, which is equal to 213 in the exemplary PROF implementation. Shift0=Max (2, (14-Bit-Depth));
PROF attempts to increase the precision of the gradients, unlike BIO in VTM-4.0, where the gradients are output with the same precision as input luma samples.
The gradients in PROF are calculated as below:

Shift1=Shift0-4.

gradientH[x][y]=(predSamples[x+1][y]−predSample[x−1][y])>>Shift1 gradientV[x][y]=(predSample[x][y+1]−predSample[x][y−1])>>Shift1

It should be noted that predSamples[x][y] keeps the precision after interpolation.
b) How to derive Δv for PROF
The derivation of Δv (denoted as dMvH [posX][posY] and dMvV [posX][posY] with posX=0 .... W−1, posY=0 .... H−1) can be described as below
Suppose the dimensions of the current block is cbWidth×cbHeight, the number of control point motion vectors is numCpMv, and the control point motion vectors are cpMvLX[cpIdx], with cpIdx=0 ... numCpMv−1 and X being 0 or 1 representing the two reference lists.
The variables log 2CbW and log 2CbH are derived as follows:

log 2CbW=Log 2(cbWidth)

log 2CbH=Log 2(cbHeight)

The variables mvScaleHor, mvScaleVer, dHorX and dVerX are derived as follows:

mvScaleHor=cpMvLX[0][0]<<7 mvScaleVer=cpMvLX[0][1]<<7 dHorX=(cpMvLX[1][0]−cpMvLX[0][0])<<(7-log 2CbW)

dVerX=(cpMvLX[1][1]−cpMvLX[0][1])<<(7-log 2CbW)

The variables dHorY and dVerY are derived as follows:
If numCpMv is equal to 3, the following applies:

dHorY=(cpMvLX[2][0]−cpMvLX[0][0])<<(7−log 2CbH)

dVerY=(cpMvLX[2][1]−cpMvLX[0][1])<<(7−log 2CbH)

Otherwise (numCpMv is equal to 2), the following applies:

dHorY=−dVerX dVerY=dHorX

The variable qHorX, qVerX, qHorY and qVerY are derived as qHorX=dHorX<<2;

qVerX=dVerX<<2;

qHorY=dHorY<<2;

qVerY=dVerY<<2;

dMvH [0][0] and dMvV [0][0] are calculated as dMvH[0][0]=((dHorX+dHorY)<<1)−((qHorX+qHorY)<<1);

dMvV[0][0]=((dVerX+dVerY)<<1)−((qVerX+qVerY)<<1);

dMvH [xPos][0] and dMvV [xPos][0] for xPos from 1 to W−1 are derived as:

dMvH[xPos][0]=dMvH[xPos−1][0]+qHorX;

dMvV[xPos][0]=dMvV[xPos−1][0]+qVerX;

For yPos from 1 to H−1, the following applies:

dMvH[xPos][yPos]=dMvH[xPos][yPos−1]+qHorY
with xPos=0 ... W−1 dMvV[xPos][yPos]=dMvV[xPos][yPos−1]+qVerY
with xPos=0 ... W−1

Finally, dMvH [xPos][yPos] and dMvV [xPos][yPos] with posX=0 ... W−1, posY=0 ... H−1 are right shifted as dMvH[xPos][yPos]=SatShift(dMvH[xPos][yPos],7+2−1);

dMvV[xPos][yPos]=SatShift(dMvV[xPos][yPos],7+2−1);

where SatShift(x, n) and Shift (x,n) is defined as $$SatShift(x, n) = \begin{cases} (x + \text{offset0}) >> n & \text{if } x \geq 0 \\ -((-x + \text{offset1}) >> n) & \text{if } x < 0 \end{cases}$$

Shift(x,n)=(x+offset0)>>n

In one example, offset0 and/or offset1 are set to (1<<n)>>1.

c) How to derive ΔI for PROF

For a position (posX, posY) inside a sub-block, its corresponding Δv(i, j) is denoted as (dMvH [posX][posY], dMvV [posX][posY]). Its corresponding gradients are denoted as (gradientH [posX][posY], gradientV [posX][posY]).

Then ΔI(posX, posY) is derived as follows.

(dMvH [posX][posY], dMvV [posX][posY]) are clipped as dMvH[posX][posY]=Clip3(−32768,32767,dMvH[posX][posY]);

dMvV[posX][posY]=Clip3(−32768,32767,dMvV[posX][posY]);

ΔI(posX,posY)=dMvH[posX][posY]×gradientH[posX][posY]+dMvV[posX][posY]×gradientV[posX][posY];

ΔI(posX,posY)=Shift(ΔI(posX,posY),1+1+4);

ΔI(posX,posY)=Clip3(−(2$^{13}$−1),2$^{13}$−1,ΔI(posX,posY));

d) How to Derive I' for PROF

If the current block is not coded as bi-prediction or weighted-prediction,

I'(posX,posY)=Shift((I(posX,posY)+ΔI(posX,posY)), Shift0),

I'(posX,posY)=ClipSample(I'(posX,posY)), where ClipSample clips a sample value to a valid output sample value.

Then I' (posX, posY) is output as the inter-prediction value.

Otherwise (the current block is coded as bi-prediction or weighted-prediction) I' (posX, posY) will be stored and used to generate the inter-prediction value according to other prediction values and/or weighting values.

2.12 JVET-N0510

In JVET-N0510, phase-variant affine subblock motion compensation (MC) is proposed. The conventional two stage horizontal-vertical interpolation is applied. However, unlike the phase-invariant block-based MC that uses the same horizontal filter for all sample rows and the same vertical filter for all sample columns, different phases of filters can be applied to different sample rows and different sample columns in the affine subblock.

To better approximate the affine motion model in an affine subblock, phase-variant MC is applied to the subblock. In the proposed method, the affine coded block is also divided into 4×4 subblocks, and a subblock MV is derived for each subblock as done in VTM4.0. The MC of each subblock is divided into two stages. The first stage is to filter an (4+L−1)×(4+L−1) reference block window with (4+L−1) rows of horizontal filtering, where the L is the filter tap length of the interpolation filer. However, different from the translational MC, in the proposed phase-variant affine subblock MC, the filter phase of each sample row is different. For each sample row, Mvx is derived as follows.

Mv$_x$=(subblockMv$_x$<<7+dMvVerX×(rowIdx−L/2−2))>>7

The filter phase of each sample row is derived from the Mvx. The subblockMvx is the x component of the MV of the derived subblock MV as done in VTM4.0. The rowIdx is the sample row index. The dMvVerX is (cuBottomLeftCPMvx−cuTopLeftCPMvx)<<(7−log 2LumacbHeight), where cuBottomLeftCPMvx is the x component of the CU bottom left control point MV, cuTopLeftCPMvx is the x component of the CU top left control point MV, and LumacbHeight is the log 2 of the height of the luma coding block (CB).

Figure 26:
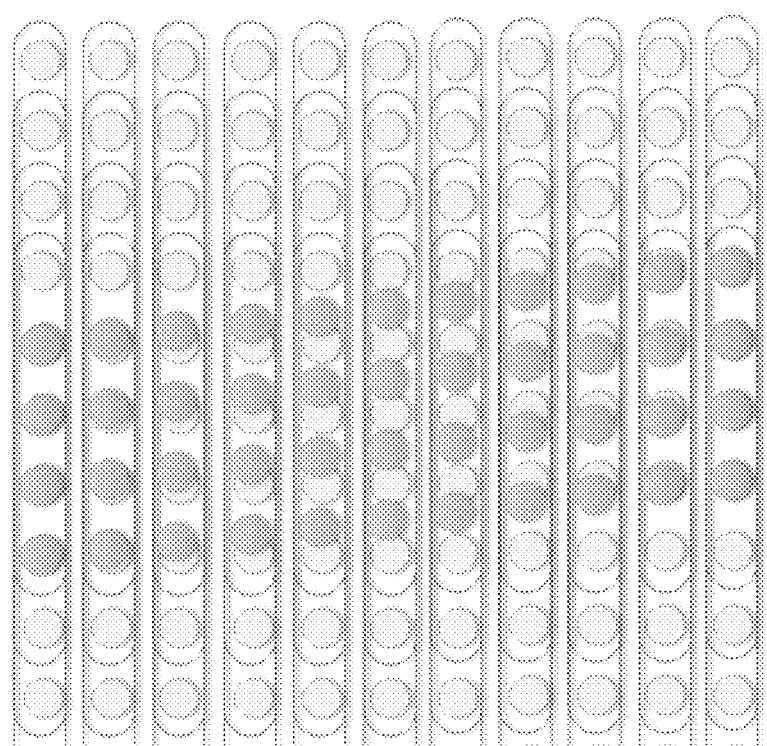
FIG. 26 shows an example of phase-variant horizontal filtering.
Figure 27:
FIG. 27 shows an example of applying one instance of 8-tap horizontal filtering.

After the horizontal filtering, a 4×(4+L−1) horizontally filtered samples are generated. FIG. 26 shows the concept of the proposed horizontal filtering. The gray points are the samples of the reference block window, and the orange points denote the horizontally filtered samples. A blue tube of 8×1 samples denotes applying one time of 8-tap horizontal filtering, as shown in FIG. 26 and FIG. 27, respectively. Each sample row needs four times of horizontal filtering. The filter phases on a sample row are the same. However, the filter phases on different rows are different. Skewed 4×11 samples are generated.

In the second stage, the 4×(4+L−1) horizontally filtered samples (orange samples in FIG. 26) are further vertically filtered. For each sample column, Mvy is derived as follows.

Mv$_y$=(subblockMv$_y$<<7+dMvHorY×(columnIdx−2))>>7  (Equation 2)

The filter phase of each sample column is derived from the Mvy. The subblockMvy is the y component of the MV of the derived subblock MV as done in VTM4.0. The columnIdx is the sample column index. The dMvHorY is (cuTopRightCPMvy−cuTopLeftCPMvy)<<(7−log 2LumacbWidth), where cuTopRightCPMvy is the y component of the CU top right control point MV, cuTopLeftCPMvy is the y component of the CU top left control point MV, and log 2LumaCb Width is the log 2 of the width of the luma CB.

Figure 28:
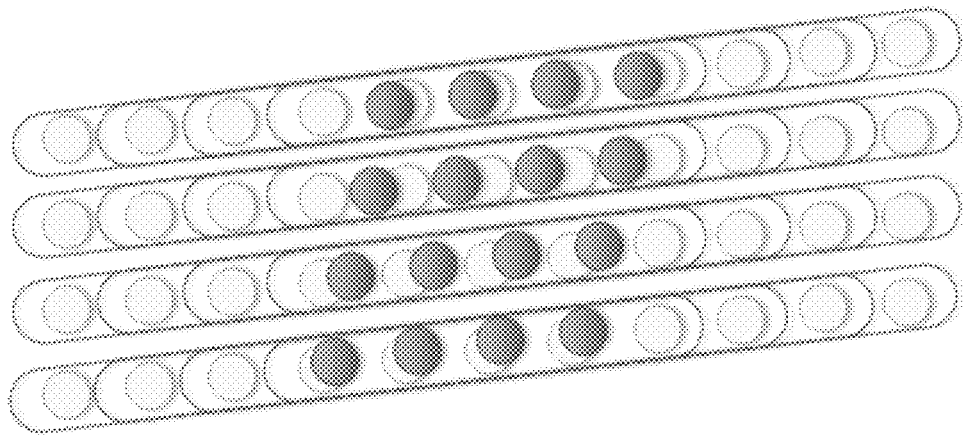
FIG. 28 shows an example of non-uniform phase vertical filtering.

After the vertical filtering, 4×4 affine subblock prediction samples are generated. FIG. 28 shows the concept of the proposed vertical filtering. The light orange points are the horizontally filtered samples from first stage. The red points are the vertically filtered samples as the final prediction samples.

In this proposal, the used interpolation filter sets are the same as those in VTM4.0. The only difference is that the horizontal filter phases on one sample row are different and the vertical filter phases on one sample column are different. As for the number of filtering operations for each affine subblock in the proposed method, it is the same as that in VTM4.0.

2.2.13. JVET-O0057: Switchable Interpolation Filter

This contribution proposes the switchable interpolation filters for half-sample (half-pel) positions as proposed in JVET-N0309. The switching of the half-pel luma interpolation filter is done depending on the motion vector accuracy. In addition to the existing quarter-pel, full-pel, and 4-pel AMVR modes, a new half-pel accuracy AMVR mode is introduced Only in case of half-pel motion vector accuracy, one alternative half-pel luma interpolation filters can be signalled. In case of skip/merge mode using a spatial merging candidate, the information which interpolation filter is applied for the half-pel position is inherited from the neighbouring block.

2.2.14 JVET-O1140

A sequence parameter set (SPS) flag sps_bdof_dmvr_slice_present_flag, which is signalled in the SPS when either of DMVR or BDOF SPS level control flags are true, is used to indicate the presence of slice_disable_bdof_dmvr_flag. If present, the slice_disable_bdof_dmvr_flag is signaled after the fractional MMVD flag in the slice header.

slice_disable_bdof_dmvr_flag equal to 1 specifies that bidirectional optical flow inter prediction and decoder motion vector refinement based inter bi-prediction are both disabled in the current slice. slice_disable_bdof_dmvr_flag equal to 0 specifies that bidirectional optical flow inter prediction or decoder motion vector refinement based inter bi-prediction may or may not be disabled in the current slice. When slice_disable_bdof_dmvr_flag is not present, the value of slice_disable_bdof_dmvr_flag is inferred to be 0.

3. Drawbacks of Existing Implementations

Some existing implementations suffer from the following drawbacks:

(1) The gradients calculation methods are not identical in BDOF and PROF.
  (a) In BDOF, the gradients are calculated for the whole block and padding is done once. In PROF, the gradients are calculated for each sub-block and padding is done N times (suppose there are N sub-blocks).
  (b) PROF requires a higher precision for gradients than BDOF.
(2) The interaction between PROF and other tools is unclear.
(3) It is unclear how to apply PROF on chroma components.
(4) The derivation process of Δv may be incorrect.
(5) PROF may be done conditionally for higher coding performance.
(6) It is unclear how to combine the methods in JVET-N0236 and JVET-N0510.
(7) The bit-width of dMvH and dMvV may be too large.

4. Example Methods for Prediction Refinement with Optical Flow (PROF)

Embodiments of the presently disclosed technology overcome the drawbacks of existing implementations, thereby providing video coding with higher coding efficiencies. The methods for prediction refinement with optical flow, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Denote reference picture of current picture from list 0 and list 1 by Ref0 and Ref1 respectively, denote $\tau_0$=POC(current)−POC(Ref0), $\tau_1$=POC(Ref1)−POC(current), and denote reference block of the current block from Ref0 and by refblk0 and refblk1 respectively. For a subblock in current block, MV of its corresponding subblock in refblk0 pointing to refblk1 is denoted by $(v_x, v_y)$. MVs of the subblock in Ref0 and are denoted by $(mvL0_x, mvL0_y)$ and $(mvL1_x, mvL1_y)$ respectively.

Shift(x, s) is defined as Shift(x, s)=(x+off) s
SignShift(x, s) is defined as $$SatShift(x, n) = \begin{cases} (x + \text{offsset0}) >> n & \text{if } x \geq 0 \\ -((-x + \text{offset1}) >> n) & \text{if } x < 0 \end{cases}$$

In an example, offset0 and/or offset1 are set to (1<<n)>>1 or (1<<(n−1)). In another example, offset0 and/or offset1 are set to 0. In yet another example, offset0=offset1= ((1<<n)>>1)−1 or ((1<<(n−1)))−1.

Clip3 (x, min, max) is defined as $$Clip3(Min, Max, x) = \begin{cases} \text{Min} & \text{if } x < \text{Min} \\ \text{Max} & \text{if } x > \text{Max} \\ x & \text{Otherwise} \end{cases}$$

Herein, Max (a, b)=a>=b?a: b, and Min (a, b)=a<=b?a:b.

In the following discussion, an operation between two motion vectors means the operation will be applied to both the two components of the motion vector. For example, MV3=MV1+MV2 is equivalent to $MV3_x$=$MV1_x$+$MV2_x$ and $MV3_y$=$MV1_y$+$MV2_y$. alternatively, the operation may be only applied to the horizontal or vertical component of the two motion vectors. The term "absolute value" of a MV ($Mv_x$, $Mv_y$) may refer to abs (Mvx), or abs ($Mv_y$), or max (abs (Mvx), abs (Mvy)) or abs (Mvx)+abs (Mvy), wherein function abs (x) returns absolute value of x, and function max (x, y) returns the larger one of x and y.

In the following discussion, the left neighboring block, left-bottom neighboring block, above neighboring block, right-above neighboring block and left-above neighboring block are denoted as block $A_1$, $A_0$, B1, B0 and B2 as shown in FIG. 2.

1. It is proposed that the gradient calculation in PROF may be done in a M×N region-level which is different from the sub-block size used for motion compensation in affine mode.
  a. In one example, the gradient calculation in PROF may be done for a M×N region which is larger than a sub-block.
  b. In one example, M and N may be some predefined number, e.g., M=N=8 or M=N=16.
  c. In one example, M and N may be some number defined depending on the width/height for sub-block size, e.g., M=N=2*Wmc wherein Wmc is the width/height for sub-block size used in motion compensation.
  d. The padding process used to derive the gradients in PROF is done in a M×N region-level.
  e. For all above examples, the definition of M and N are as follows:
    i. In one example, M=min (K0, block width) wherein K0 is an integer value.
    ii. In one example, N=min (K1, block height) wherein K0 is an integer value.
    iii. For above examples, K0=K1=16.
    iv. In one example, K0 and K1 are aligned with that used for BDOF.
  f. The gradients of a first sample in a first sub-block may be derived with a second sample in a second sub-block.
    i. In one example, the second sub-block is adjacent to the first sub-block.
    ii. In one example, the second sample is used to derive gradients of the first sample in the same way when it is in the first sub-block or in the second sub-block.
    iii. The above methods may be applied when M×N is larger than a sub-block
  g. One or multiple MVs may be derived for the padding process for each M×N region.
    i. In one example, one specific MV is derived for the padding process for a M×N region. Integer reference samples may be located with the specific MV, and then used to pad the samples out of M×N region.

Figure 31:
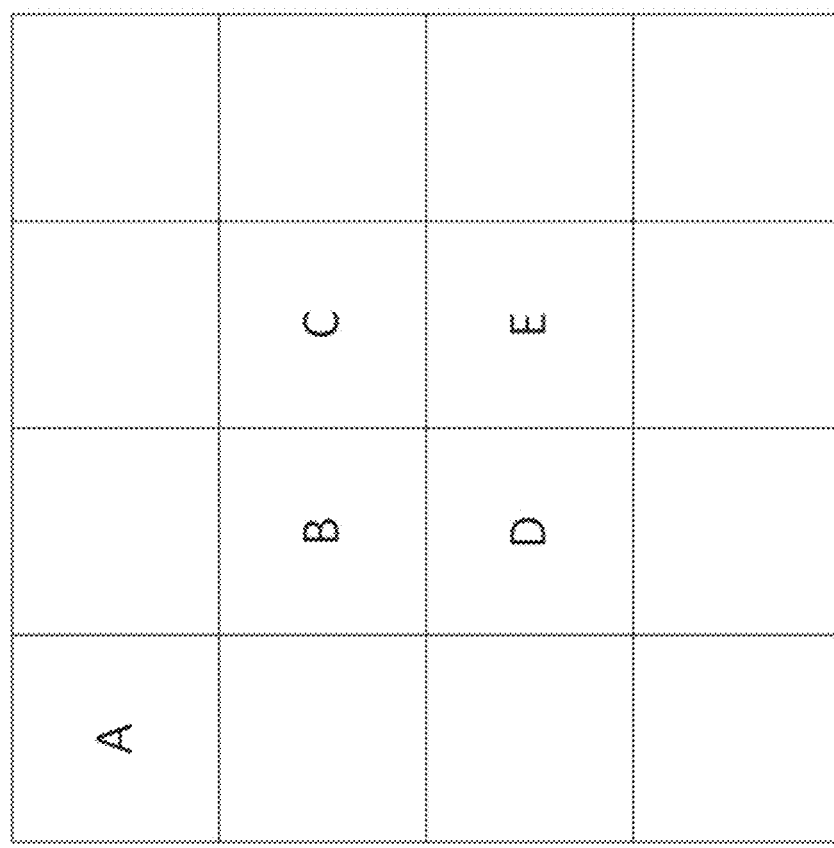
FIG. 31 shows an example of 16 4×4 sub-blocks in a 16×16 region.

(i) In one example, the specific MV may be one MV of one sub-block in the M×N region, such as the top-left corner sub-block or a center sub-block in the M×N region. FIG. 31 shows an example. MV of the sub-block $A_0$, B, C, D, or E may be selected as the specific MV.
(ii) In one example, the specific MV may be derived from the affine model toward a specific position (such as the center) of the M×N region.
(iii) In one example, the specific MV may be derived from MVs of sub-blocks in the M×N region.
   a. For example, the specific MV may be derived as the average of the MVs of all sub-blocks in the M×N region.
   b. For example, the specific MV may be derived as the average of several MVs of the center sub-blocks.
      i. For example, the specific MV may be derived as the average of several MVs of B, C, D and E in FIG. 31.
      ii. For example, the specific MV may be derived as the average of several MVs of B, and E in FIG. 31.
      iii. For example, the specific MV may be derived as the average of several MVs of C, and D in FIG. 31.
   c. For example, the specific MV may be derived as a function of multiple MVs (e.g., CPMVs or sub-blocks' MVs).
ii. In one example, multiple MVs are derived for the padding process for a M×N region. Integer reference samples may be located with the one of the multiple MVs, and then used to pad the samples out of M×N region.
   (i) In one example, when padding a first sample adjacent to a first sub-block of the M×N region, a first MV of the first sub-block may be used to locate the Integer reference sample(s), which is (are) used to pad the first sample.
iii. The above methods are applied when M×N is larger than a sub-block, and the padding process used to derive the gradients in PROF is done for each M×N region.
2. The gradient calculation in PROF/BIO may be done in a M×N region-level and M/N may be adaptively changed.
   a. In one example, M and N may depend on the dimensions W×H of the current block.
      i. For example, the region may be the whole current block, i.e. M=W and N=H.
      ii. For example, M=W/T1 and N=H/T2, where T1 and T2 are integers, e.g., T1=T2=2.
      iii. In one example, M and/or N may be signaled from the encoder to the decoder, such as in video parameter set (VPS)/dependency parameter set (DPS)/SPS/PPS/adaptation parameter set (APS)/slice header/tile group header/tile/CTU/CU.
         (i) Alternatively, M and/or N may be specified in the profiles/levels/tiers of a video coding standard.
      iv. In one example, M=Min (W, T1) and N=Min (H, T2). For example, T1=T2=16.
         (i) In one example, T1 and/or T2 may be signaled from the encoder to the decoder, such as in VPS/DPS/SPS/PPS/APS/slice header/tile group header/tile/CTU/CU.
         (ii) Alternatively, T1 and/or T2 may be specified in the profiles/levels/tiers of a video coding standard.
3. For above methods, the followings may further apply:
   a. In one example, M is at least equal to Mmin and N is at least equal to Nmin, e.g., Mmin=Nmin=8.
   b. In one example, the padding process is done once for each M×N region to get a padded (M+dM)×(N+dN) region, e.g., dM=dN=2.
      i. In one example, the samples inside the region (such as the white circles in FIG. 23) may be derived from motion compensation with interpolation filtering.
         (i) In one example, the samples inside the region may be derived from motion compensation for several sub-blocks in the region.
      ii. In one example, four side outer lines of samples (such as the black circles in FIG. 23) may be padded.
         (i) In one example, a sample to be padded may copy the intensity of the nearest integer sample in the reference block.
         (ii) In one example, a sample to be padded may copy the intensity of the nearest sample in the region that is not padded.
4. For each region that the gradient calculation in PROF/BIO is applied, instead of calculating the gradient values for each sample, it is proposed to calculate gradients based on partial of samples.
   a. In one example, gradients associated with samples at given coordinates may be used in PROF/BIO, e.g., at (2x, y) or (x, 2y) or (2x+1, 2y+1) or (2x, 2y) wherein (m, n) is the coordinate relative to the top-left sample in the current block.
   b. In one example, samples may be firstly modified (e.g., downsampled) and modified samples may be used to derive gradients.
5. It is proposed that the precision of gradient values calculated in BDOF and PROF may be the same.
   a. In one example, the sample difference may be shifted with the same value.
      i. In one example, the horizontal and vertical gradients (denoted by gradientH, gradient V, respectively) may be calculated in the following way:

gradient$H[x][y]$=(predSamples$[x+1][y]$−predSample$[x−1][y]$)>>Shift0 gradient$V[x][y]$=(predSample$[x][y+1]$−predSample$[x][y−1]$)>>Shift1

Alternatively, gradient$H[x][y]$=Shift((predSamples$[x+1][y]$−predSample$[x−1][y]$),Shift0)

gradient$V[x][y]$=Shift((predSample$[x][y+1]$−predSample$[x][y−1]$),Shift1)

Alternatively, gradient$H[x][y]$=SatShift((predSamples$[x+1][y]$−predSample$[x−1][y]$),Shift0)

gradient$V[x][y]$=SatShift((predSample$[x][y+1]$−predSample$[x][y−1]$),Shift1)

ii. In one example, the horizontal and/or vertical gradients (denoted by gradientH, gradientV, respectively) may be calculated in the following way:

gradient$H[x][y]$=(predSamples$[x][y]$*2predSamples$[x+1][y]$−predSample$[x−1][y]$)>>Shift0 gradientV[x][y]=(predSamples[x][y]*2predSample[x][y+1]−predSample[x][y−1])>>Shift1

Alternatively, gradientH[x][y]=Shift((predSamples[x][y]*2−predSamples[x+1][y]−predSample[x−1][y]),Shift0)

gradientV[x][y]=Shift((predSamples[x][y]*2−predSample[x][y+1]−predSample[x][y−1]),Shift1)

Alternatively, gradientH[x][y]=SatShift((predSamples[x][y]*2−predSamples[x+1][y]−predSample[x−1][y]),Shift0)

gradientV[x][y]=SatShift((predSamples[x][y]*2−predSample[x][y+1]−predSample[x][y−1]),Shift1)

iii. In one example, Shift0 and/or Shift1 may be set to Max (2, (14-BitDepth)) wherein BitDepth is the bit depth of reconstructed sample/input sample.

6. The following methods to pad the outer lines of samples (denoted as padding samples, such as the black circles in FIG. 23) may be applied to PROF, or to BIO, or to both PROF and BIO.
 a. The padding samples may be padded with the same method for PROF and/or BIO. The "same method" may be any padding method disclosed below.
 b. In one example, the padding samples may be derived (e.g., copied) from integer samples in the reference picture for PROF and/or BIO.
  i. In one example, the integer sample used to derive a padding sample may be located by the position of the padding sample, adding an MV, which may be rounded to an integer MV in the addition operation.
   (i) In one example, the MV (MvX, MvY) may be rounded to the flooring integer MV (IntX, IntY). For example, IntX=MvX>>P, IntY=MvY>>P, where P is the MV precision.
   (ii) In one example, the MV (MvX, MvY) may be rounded to the nearest integer MV (IntX, IntY). For example, set FracX=MvX & ((1<<P)−1), FracY=MvY & ((1<<P)−1), OffX=(FracX>=(1<<(P−1)))?1:0, OffY=(FracY>=(1<<(P−1)))?1:0, where P is the MV precision, then IntX=(MvX>>P)+OffX, IntY=(MvY>>P)+OffY. HalfFrac may be equal to 1<<(P−1), in other examples, it may be equal to (1<<(P−1))−1 or (1<<(P−1))+1.
   (iii) In one example, the MV (MvX, MvY) may be rounded to the integer MV (IntX, IntY) as IntX=SatShift (MvX, P), IntY=SatShift (MvY, P) where P is the MV precision.
   (iv) In the above bullets, the MV precision P may depend on the color format and/or color components.
    a. For example, the MV precision for blue-difference chroma (Cb)/red-difference chroma (Cr) components may be equal to the MV precision for the luma component plus K with the 4:2:0 color format. E.g., K may be equal to 1.
   (v) How to perform padding may be signaled from the encoder to the decoder, such as in VPS/DPS/SPS/PPS/APS/slice header/tile group header/tile/CTU/CU.
    a. Alternatively, how to perform padding may be specified in the profiles/levels/tiers of a video coding standard.
   (vi) How to perform padding may depend on block dimensions.

7. It is proposed that when PROF is applied, the coding tool X cannot be applied.
 a. Alternatively, when coding tool X is applied, the PROF cannot be applied.
 b. In one example, if coding tool X cannot be applied, the syntax element(s) to indicate coding tool X may not be signaled.
 c. In one example, coding tool X may be Generalized Bi prediction (GBi).
  i. For example, when GbiIdx is not equal to 0, PROF is not applied.
  ii. Alternatively, when PROF is applied, GbiIdx must be 0.
  iii. Alternatively, when PROF is applied, Gbildx is not signaled and inferred to be 0.
  iv. Alternatively, when PROF is applied, GBi is not applied no matter Gbildx is equal to 0 or not.
 d. In one example, coding tool X may be local illumination compensation.
 e. In one example, coding tool X may be Multiple Transform Set (MTS).
  i. For example, when PROF is applied, only a default transform can be applied.
   (i) For example, when PROF is applied, syntax elements related MTS is not applied.
 f. In one example, coding tool X may be weighted prediction.
  i. For example, when unequal weights and/or unequal offsets due to weighted prediction are applied to one block, PROF is not applied.

8. It is proposed that how to apply PROF may depend on the color format and/or usage of separate plane coding.
 a. In one example, PROF cannot be applied on chroma components if the color format is 4:0:0.
 b. In one example, PROF may be applied on chroma components if the color format is 4:4:4.
 c. In one example, PROF may be applied on chroma components if the color format is unequal to 4:0:0.
 d. In one example, how to derive delta MV (e.g., $\Delta v$ in Section 2.11) may depend on the color format.

9. It is proposed that how to apply PROF may depend on the color component.
 a. In one example, gradients may be calculated independently for each color component.
  i. Alternatively, gradients calculated for a first color component may be used by a second color component.
  ii. Alternatively, gradients may be calculated twice, one for the luma/main color component, and the other for two chroma/dependent color components.
 b. In one example, delta MV (e.g., $\Delta v$ in Section 2.11) may be calculated independently for each color component.
  i. Alternatively, delta MV calculated for a first color component may be used by a second color component.
 c. In one example, prediction refinement (e.g., $\Delta I$ in Section 2.11) may be calculated independently for each color component.
  i. Alternatively, prediction refinement (e.g., $\Delta I$ in Section 2.11) calculated for a first color component may be used by a second color component.
 d. In one example, the precision of gradients in PROF may depend on the color component.

e. In one example, the precision of delta MV (e.g., $\Delta v$ in Section 2.11) in PROF may depend on the color component.
f. In one example, whether and how to conduct the clipping operations in PROF may depend on the color component.
g. In one example, whether and how to conduct the shifting operations in PROF may depend on the color component.
h. In one example, PROF may be applied to luma component only.
i. In one example, PROF may be applied to different color components at different sub-block size.
   i. Alternatively, PROF may be applied to different color components at same sub-block size.
j. In one example, PROF may be applied to chroma components at M*N sub-block size.
   i. For example, M and N are set equal to 4.
k. The above methods (bullet h-j) may further depend on the color format (e.g., 4:2:0 or 4:4:4).

10. It is proposed that the derivation of delta MV (e.g., $\Delta v$ in Section 2.11) may depend on the width and/or height of the sub-block.
a. In one example dMvH [0][0] and dMvV [0][0] are calculated as $q$HorX=$d$HorX*P0;

$q$VerX=$d$VerX*P0;

$q$HorY=$d$HorY*P0;

$q$VerY=$d$VerY*P0;

$d$MvH[0][0]=((iDMvHorX+iDMvVerX)*P1)−(quadHorX*(blockWidth>>1)+quadVerX*(blockHeight*P1));

$d$MvV[0][0]=((iDMvHorY+iDMvVerY)*P1)−(quadHorY*(blockWidth>>1)+quadVerY*(blockHeight*P1));

where block Width and blockHeight represent the width and height of sub-block, respectively. P0 and P1 are two numbers controlling the precision.
   i. For example, P0=4 and P1=2 then dMvH [0][0] and dMvV [0][0] are calculated as:

$q$HorX=$d$HorX<<2;

$q$VerX=$d$VerX<<2;

$q$HorY=$d$HorY<<2;

$q$VerY=$d$VerY<<2;

$d$MvH[0][0]=((iDMvHorX+iDMvVerX)<<1)−(quadHorX*(block Width>>1)+quadVerX*(blockHeight>>1));

$d$MvV[0][0]=((iDMvHorY+iDMvVerY)<<1)−(quadHorY*(block Width>>1)+quadVerY*(blockHeight>>1));

11. It is proposed that for affine coded blocks, PROF may be done conditionally instead of always being applied.
a. In one example, whether and how to conduct PROF may depend on the dimensions W×H of the current block.
   i. For example, PROF may not be applied if W<=T1 and/or H<=T2, e.g., T1=T2=16;
   ii. For example, PROF may not be applied if W<T1 and/or H<T2, e.g., T1=T2=16;
   iii. For example, PROF may not be applied if W>=T1 and/or H>=T2, e.g., T1=T2-64;
   iv. For example, PROF may not be applied if W>T1 and/or H>T2, e.g., T1=T2-64;
   v. For example, PROF may not be applied if W*H>T1 e.g., T1=64*64;
   vi. For example, PROF may not be applied if W*H>=T1 e.g., T1=64*64;
   vii. For example, PROF may not be applied if W*H<T1 e.g., T1=16*16;
   viii. For example, PROF may not be applied if W*H<=T1 e.g., T1=16*16;
   ix. For example, PROF may not be applied if min (W, H)>=T1 e.g., T1=64;
   x. For example, PROF may not be applied if min (W, H)>T1 e.g., T1=64;
   xi. For example, PROF may not be applied if max (W, H)<=T1 e.g., T1=16;
   xii. For example, PROF may not be applied if max (W, H)<T1 e.g., T1=16;
b. In one example, whether and/or how to conduct PROF may depend on control point motion vectors.
c. In one example, whether and/or how to conduct PROF may depend on the affine parameters and/or the number of affine parameters.
   i. For the 4-parameter affine model, where $$\begin{cases} mv^h(x, y) = ax - by + mv_0^h \\ mv^v(x, y) = bx + ay + mv_0^v \end{cases},$$

whether and how to conduct PROF may depend on parameters a and b.
   ii. For the 4-parameter affine model, where $$\begin{cases} mv^h(x, y) = ax + by + mv_0^h \\ mv^v(x, y) = cx + dy + mv_0^v \end{cases},$$

whether and how to conduct PROF may depend on parameters a, b, c and d.
   iii. In one example, PROF may not be applied if the maximum affine parameter is smaller (or not larger) than a threshold.
      (i) Alternatively, PROF may not be applied if all (such as four or six) affine parameters are smaller (or not larger) than a threshold.
      (ii) Alternatively, PROF may not be applied if at least one affine parameter is smaller (or not larger) than a threshold.
   iv. In one example, PROF may not be applied if the maximum value of the absolute values of affine parameter is smaller (or not larger) than a threshold.
      (i) Alternatively, PROF may not be applied if the absolute values of all the affine parameters are smaller (or not larger) than a threshold.
      (ii) Alternatively, PROF can only be applied if at least one of the absolute values of all the affine parameters is larger (or not smaller) than a threshold.
   v. In one example, PROF may not be applied if the minimum affine parameter is larger (or not smaller) than a threshold.

(i) Alternatively, PROF may not be applied if all (such as four or six) affine parameters are larger (or not smaller) than a threshold.
(ii) Alternatively, PROF may not be applied if at least one affine parameter is larger (or not smaller) than a threshold.
vi. In one example, PROF may not be applied if the minimum value of the absolute values of affine parameter is larger (or not smaller) than a threshold.
(i) Alternatively, PROF may not be applied if the absolute values of all affine parameters are larger (or not smaller) than a threshold.
(ii) Alternatively, PROF can only be applied if at least one of the absolute values of the affine parameters is smaller (or not larger) than a threshold.
vii. In one example, PROF may not be applied if the maximum value of the "absolute value" of the delta MV as disclosed in JVET-N0236 is smaller (or not larger) than a threshold.
(i) Alternatively, PROF may not be applied if the "absolute value" of all the delta MVs are smaller (or not larger) than a threshold.
(ii) Alternatively, PROF can only be applied if at least one of the "absolute value" of delta MV is larger (or not smaller) than a threshold.
viii. In one example, PROF may not be applied if the minimum value of the "absolute value" of the delta MV is larger (or not smaller) than a threshold.
(i) Alternatively, PROF may not be applied if the "absolute value" of all the delta MVs are larger (or not smaller) than a threshold.
(ii) Alternatively, PROF can only be applied if at least one of the "absolute value" of delta MV is larger (or not smaller) than a threshold.
ix. In one example, PROF may be applied to certain positions.
(i) For example, PROF may be applied to a position if "absolute value" of its corresponding delta MV is smaller (or not larger) than a threshold.
(ii) For example, PROF may be applied to a position if "absolute value" of its corresponding delta MV is larger (or not smaller) than a threshold.
x. In one example, the affine parameters may be represented as integers dHorX, dVerX, dHorY and dVerY with specific precisions as described in JVET-M1001.
xi. In one example, the threshold may depend on the bit-depth.
(i) In one example, the threshold may be derived as 1<<BitDepth.
(ii) Alternatively, furthermore, the threshold may depend on whether bi-prediction or uni-prediction is applied.
a. For example, the threshold may be derived as (1<<BitDepth)+(Bi-prediction?1:0).

xii. In one example, whether and/or how to apply the disclosed methods in bullet 11 may depend on the reference picture structure.
(i) For example, if all reference pictures of the current picture are preceding the current picture in the display order, i.e. POCs of all the reference pictures are smaller than the POC of the current picture, one or multiple of the disclosed methods may not be applied.
(ii) Alternatively, whether and/or how to apply the disclosed methods in bullet 11 may depend on slice/picture type (such as I-slice or B-slice).
(iii) Alternatively, whether and/or how to apply the disclosed methods in bullet 11 may depend on the temporal layer.
xiii. In bullet 11, the coding method "PROF" may be replaced by other coding methods to enhance affine prediction coding, such as interweaved prediction as disclosed in JVET-N0216 or phase-variant affine subblock motion compensation.
12. It is proposed that the phase-variant affine subblock motion compensation, such as proposed in JVET-N0510, may be firstly applied to get the prediction value, followed by PROF.
13. It is proposed that the bit width of any variables used to derive dMvH [x][y] and/or dMvV [x][y] for any valid x and y cannot exceed a specific number, such as 32.
a. In one example, dMvH [x][y] and/or dMvV [x][y] are clipped before being used to derive other dMvH [t][z] and/or dMvV [t][z], where (t, z) is not equal to (x, y).
b. In one example, dMvH [x][y] and/or dMvV [x][y] are right shifted before being used to derive other dMvH [t][z] and/or dMvV [t][z], where (t, z) is not equal to (x, y).
14. It is proposed that dMvH and/or dMvV may have the same precision as stored motion vectors.
a. For example, $dMvH[xPos][yPos]=\text{SatShift}(dMvH[xPos][yPos],7+M)$;

$dMvV[xPos][yPos]=\text{SatShift}(dMvV[xPos][yPos],7+M)$;

where M is the additional precision to derive dMvH and/or hMvV, e.g., M=2.
15. It is proposed that the clipping on dMvH and/or dMvV before being used to derive the prediction refinement ΔI may depend on the precision of dMvH and/or dMvV.
a. For example $dMvH[posX][posY]=\text{Clip3}(-2^{K-1},2^{K-1}-1,dMvH[posX][posY])$;

$dMvV[posX][posY]=\text{Clip3}(-2^{K-1},2^{K-1}-1,dMvV[posX][posY])$;

where K depends on the precision of dMvH and/or dMvV.
b. Alternatively, dMvH [x][y] and/or dMvV [x][y] are not clipped before being used to derive the prediction refinement.
16. It is proposed that the right shift on the prediction refinement ΔI(posX, posY) may depend on the sign of ΔI(posX, posY).
a. For example, ΔI(posX, posY)=SatShift (ΔI(posX, posY), N), where N is an integer.
17. It is proposed that the clipping on the prediction refinement ΔI(posX, posY) may depend on the sample bit-depth.
a. For example ΔI(posX, posY)=Clip3 $(-(2^{3+BitDepth}-1), 2^{3+BitDepth}-1, \Delta I(posX, posY))$;
18. Whether and/or how to conduct deblocking is performed on subblock boundaries within an affine mode block (e.g., inner subblock boundaries) may depend on whether interweaved prediction as disclosed in JVET-N0216 or/and PROF or/and phase-variant affine sub-block motion compensation is applied to the block or not.
   a. In one example, deblocking may be disabled when interweaved prediction or/and PROF or/and phase-variant affine subblock motion compensation is applied to the block.
      i. Alternatively, deblocking filter may be weaker on sub-block boundaries where interweaved prediction or/and PROF or/and phase-variant affine sub-block motion compensation is applied to the block. For example, boundary strength may be set smaller on such boundaries.
   b. In one example, deblocking may be enabled when interweaved prediction or/and PROF or/and phase-variant affine subblock motion compensation is not applied to the block.
19. Switchable interpolation filter may be applied on an affine coded block.
   a. Switchable interpolation filter may be applied on an affine coded block when a specific MV precision is applied, such as ½-pel or ¼-pel.
20. In one example, BDOF is not applied when switchable interpolation filter is used for a block.
   a. In one example, BDOF is not applied for a block with a specific MV resolution such as ½-pel.
   b. In one example, BDOF is not applied for a block choosing a specific interpolation filter.
21. In one example, PROF is not applied when switchable interpolation filter is used for a block.
   a. In one example, PROF is not applied for a block with a specific MV resolution such as ½-pel.
   b. In one example, PROF is not applied for a block choosing a specific interpolation filter.
22. It is proposed that Δv(i, j) for a sub-block in PROF is calculated only when PROF is applied for that sub-block.
23. It is proposed that a first syntax element (such as a flag named slice_disable_bdof_prof_dmvr_flag) is signaled at slice or picture level (such as in the slice header) to control the usage of BDOF, PROF and DMVR in a slice.
   a. When the first syntax element is not signaled, it is inferred that BDOF, PROF and DMVR are not all turned off in the slice.
   b. In one example, the first syntax element is signaled only when at least one of BDOF, PROF and DMVR is enabled at sequence level (e.g., the corresponding SPS controlling flag is equal to 1).
   c. Alternatively, a second syntax element is signaled at sequence level (such as sps_bdof_dmvr_prof_slice_present_flag in SPS) to indicate whether the first syntax element should be signaled.
      i. In one example, a second syntax element is signaled only when at least one of BDOF, PROF and DMVR is enabled at sequence level.
      ii. In one example, when the second syntax element is not signaled, it is inferred that first syntax element is not signaled.
   d. In one example, when the first syntax element indicates that BDOF, PROF and DMVR are all off (e.g., slice_disable_bdof_prof_dmvr_flag is equal to 1), none of BDOF, PROF and DMVR can be applied in the current slice (picture).
24. It is proposed that a first syntax element (such as a flag named slice_disable_prof_bdof_flag) is signaled at slice or picture level (such as in the slice header) to control the usage of BDOF and PROF in a slice.
   a. When the first syntax element is not signaled, it is inferred that BDOF and PROF are not both turned off in the slice.
   b. In one example, the first syntax element is signaled only when at least one of BDOF and PROF is enabled at sequence level (e.g., the corresponding SPS controlling flag is equal to 1).
   c. Alternatively, a second syntax element is signaled at sequence level (such as sps_bdof_prof_slice_present_flag in SPS) to indicate whether the first syntax element should be signaled.
      i. In one example, a second syntax element is signaled only when at least one of BDOF and PROF is enabled at sequence level.
      ii. In one example, when the second syntax element is not signaled, it is inferred that first syntax element is not signaled.
   d. In one example, when the first syntax element indicates that BDOF and PROF are both off (e.g., slice_disable_bdof_prof_flag is equal to 1), none of BDOF and PROF can be applied in the current slice (picture).

5 Embodiments 5.1 Working draft for 16×16 padding changed from the working draft (WD) provided by JVET-O0070.
The working draft is based on JVET-N1001.
The changes proposed is in underline, while the double brackets are placed before and after the text deleted.
8.5.1 General Decoding Process for Coding Units Coded in Inter Prediction Mode
Inputs to this process are:
   a luma location (xCb, yCb) specifying the top-left sample of the current coding block relative to the top-left luma sample of the current picture,
   a variable cbWidth specifying the width of the current coding block in luma samples,
   a variable cbHeight specifying the height of the current coding block in luma samples,
   a variable treeType specifying whether a single or a dual tree is used and if a dual tree is used, it specifies whether the current tree corresponds to the luma or chroma components.
Output of this process is a modified reconstructed picture before in-loop filtering.
The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.
The decoding process for coding units coded in inter prediction mode consists of the following ordered steps:
   1. The variable dmvrFlag is set equal to 0.
   2. The motion vector components and reference indices of the current coding unit are derived as follows:
      If MergeTriangleFlag[xCb][yCb], inter_affine_flag[xCb][yCb] and merge_subblock_flag[xCb][yCb] are all equal to 0, the following applies:
         The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mvL0 [0][0] and mvL1[0][0], the reference indices refIdxL0 and refIdxL1 and the prediction list utilization flags predFlagL0[0][0] and predFlagL1[0][0], and the bi-prediction weight index bcwIdx as outputs.

When all of the following conditions are true, dmvrFlag is set equal to 1:
sps_dmvr_enabled_flag is equal to 1
general_merge_flag[xCb][yCb] is equal to 1
both predFlagL0[0][0] and predFlagL1[0][0] are equal to 1
mmvd_merge_flag[xCb][yCb] is equal to 0
DiffPicOrderCnt (currPic, RefPicList[0][refIdxL0]) is equal to DiffPicOrderCnt (RefPicList[1][refIdxL1], currPic)
BcwIdx[xCb][yCb] is equal to 0
Both luma_weight_l0_flag[refIdxL0] and luma_weight_l1_flag[refIdxL1] are equal to 0
cbWidth is greater than or equal to 8
cbHeight is greater than or equal to 8
cbHeight*cbWidth is greater than or equal to 128

If dmvrFlag is equal to 1, the following applies:
For X being 0 and 1, the reference picture consisting of an ordered two-dimensional array refPicLx$_L$ of luma samples and two ordered two-dimensional arrays refPicLx$_{Cb}$ and refPicLx$_{Cr}$ of chroma samples is derived by invoking the process specified in clause 8.5.6.2 with X and refIdxLX as inputs.

The number of luma coding subblocks in horizontal direction numSbX and in vertical direction numSbY, the subblock width sbWidth and the subblock height sbHeight are derived as follows:

$$numSbX=(cbWidth>16)?(cbWidth>>4):1 \quad (8\text{-}240)$$

$$numSbY=(cbHeight>16)?(cbHeight>>4):1 \quad (8\text{-}241)$$

$$sbWidth=(cbWidth>16)?16:cbWidth \quad (8\text{-}242)$$

$$sbHeight=(cbHeight>16)?16:cbHeight \quad (8\text{-}243)$$

For xSbIdx=0 ... numSbX−1 and ySbIdx=0 ... numSbY−1, the following applies:
The luma motion vectors mvLX[xSbIdx][ySbIdx] and the prediction list utilization flags predFlagLX[xSbIdx][ySbIdx] with X equal to 0 and 1, and the luma location (xSb[xSbIdx][ySbIdx], ySb[xSbIdx][ySbIdx]) specifying the top-left sample of the coding subblock relative to the top-left luma sample of the current picture are derived as follows:

$$mvLX[xSbIdx][ySbIdx]=mvLX[0][0] \quad (8\text{-}244)$$

$$predFlagLX[xSbIdx][ySbIdx]=predFlagLX[0][0] \quad (8\text{-}245)$$

$$xSb[xSbIdx][ySbIdx]=xCb+xSbIdx*sbWidth \quad (8\text{-}246)$$

$$ySb[xSbIdx][ySbIdx]=yCb+ySbIdx*sbHeight \quad (8\text{-}247)$$

The decoder side motion vector refinement process specified in clause 8.5.3.1 is invoked with xSb[xSbIdx][ySbIdx], ySb[xSbIdx][ySbIdx], sbWidth, sbHeight, the motion vectors mvLX[xSbIdx][ySbIdx] and the reference picture array refPicLx$_L$ as inputs and delta motion vectors dMvLX[xSbIdx][ySbIdx] as outputs with X equal to 0 and 1.

The derivation process for chroma motion vectors in clause 8.5.2.13 is invoked with mvLX[xSbIdx][ySbIdx] and refIdxLX as inputs, and mvCLX[xSbIdx][ySbIdx] as outputs with X equal to 0 and 1.

Otherwise (dmvrFlag is equal to 0), the following applies:
When treeType is equal to SINGLE_TREE and predFlagLX[0][0], with X being 0 or 1, is equal to 1, the derivation process for chroma motion vectors in clause 8.5.2.13 is invoked with mvLX[0][0] and refIdxLX as inputs, and mvCLX[0][0] as output.
The number of luma coding subblocks in horizontal direction numSbX and in vertical direction numSbY are both set equal to 1.

Otherwise, if MergeTriangleFlag[xCb][yCb] is equal to 1, inter_affine_flag[xCb][yCb] and merge_subblock_flag[xCb][yCb] are both equal to 0, the derivation process for triangle motion vector components and reference indices as specified in clause 8.5.4.1 is invoked with the luma coding block location (xCb, yCb), the luma coding block width cbWidth and the luma coding block height cbHeight as inputs, and the luma motion vectors mvA and mvB, the chroma motion vectors mvCA and mvCB, the reference indices refIdxA and refIdxB and the prediction list flags predListFlagA and predListFlagB as outputs.

Otherwise (inter_affine_flag[xCb][yCb] or merge_subblock_flag[xCb][yCb] is equal to 1), the derivation process for subblock motion vector components and reference indices as specified in clause 8.5.5.1 is invoked with the luma coding block location (xCb, yCb), the luma coding block width cbWidth, the luma coding block height cbHeight as inputs, and the reference indices refIdxL0 and refIdxL1, the number of luma coding subblocks in horizontal direction numSbX and in vertical direction numSbY, the prediction list utilization flags predFlagLX[xSbIdx][ySbIdx], the luma motion vector array mvLX[xSbIdx][ySbIdx], and the chroma motion vector array mvCLX[xSbIdx][ySbIdx] with xSbIdx=0 ... (cbWidth>>2)−1, and ySbIdx=0 ... (cbHeight>>2)−1, and with X being 0 or 1, the bi-prediction weight index bcwIdx, and motion vector difference array diffMv as outputs.

3. The arrays of luma and chroma motion vectors after decoder side motion vector refinement, refMvLX[xSbIdx][ySbIdx] and refMvCLX[xSbIdx][ySbIdx], with X being 0 and 1, are derived as follows for xSbIdx=0 ... numSbX−1, ySbIdx=0 ... numSbY−1:
If dmvrFlag is equal to 1, the derivation process for chroma motion vectors in clause 8.5.2.13 is invoked with refMvLX[xSbIdx][ySbIdx] and refIdxLX as inputs, and refMvCLX[xSbIdx][ySbIdx] as output and the input refMvLX[xSbIdx][ySbIdx] is derived as follows;

$$refMvLX[xSbIdx][ySbIdx]=mvLX[xSbIdx][ySbIdx]+dMvLX[xSbIdx][ySbIdx] \quad (8\text{-}248)$$

$$refMvLX[xSbIdx][ySbIdx][0]=Clip3(-2^{17},2^{17}-1, refMvLX[xSbIdx][ySbIdx][0]) \quad (8\text{-}249)$$

$$refMvLX[xSbIdx][ySbIdx][1]=Clip3(-2^{17},2^{17}-1, refMvLX[xSbIdx][ySbIdx][1]) \quad (8\text{-}250)$$

Otherwise (dmvrFlag is equal to 0), the following applies:

refMvLX[xSbIdx][ySbIdx]=mvLX[xSbIdx][ySbIdx] (8-251)

refMvCLX[xSbIdx][ySbIdx]=mvCLX[xSbIdx][ySbIdx] (8-252)

NOTE—The array refMvLX is stored in MvDmvrLX and used in the derivation process for collocated motion vectors in clause 8.5.2.12. The array of non-refine luma motion vectors MvLX is used in the spatial motion vector prediction and deblocking boundary strength derivation processes.

4. The prediction samples of the current coding unit are derived as follows:

If MergeTriangleFlag[xCb][yCb] is equal to 0, the prediction samples of the current coding unit are derived as follows:

The decoding process for inter blocks as specified in clause 8.5.6.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL0[xSbIdx][ySbIdx] and mvL1[xSbIdx][ySbIdx], and the refined luma motion vectors refMvL0[xSbIdx][ySbIdx] and refMvL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the bi-prediction weight index bcwIdx, the variable cIdx set equal to 0, and motion vector difference array diffMy as inputs, and the inter prediction samples (predSamples) that are an (cbWidth)×(cbHeight) array predSamples of prediction luma samples as outputs.

The decoding process for inter blocks as specified in clause 8.5.6.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvCL0[xSbIdx][ySbIdx] and mvCL1[xSbIdx][ySbIdx], and the refined chroma motion vectors refMvCL0[xSbIdx][ySbIdx] and refMvCL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the bi-prediction weight index bcwIdx, the variable cdx set equal to 1, and motion vector difference array diffMy as inputs, and the inter prediction samples (predSamples) that are an (cbWidth/2)×(cbHeight/2) array predSamples$_{Cb}$ of prediction chroma samples for the chroma components Cb as outputs.

The decoding process for inter blocks as specified in clause 8.5.6.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvCL0[xSbIdx][ySbIdx] and mvCL1[xSbIdx][ySbIdx], and the refined chroma motion vectors refMvCL0[xSbIdx][ySbIdx] and refMvCL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the bi-prediction weight index bcwIdx, the variable cIdx set equal to 2, and motion vector difference array diffMv as inputs, and the inter prediction samples (predSamples) that are an (cbWidth/2)×(cbHeight/2) array predSamples$_{Cr}$ of prediction chroma samples for the chroma components Cr as outputs.

Otherwise (MergeTriangleFlag[xCb][yCb] is equal to 1), the decoding process for triangular inter blocks as specified in clause 8.5.7.1 is invoked with the luma coding block location (xCb, yCb), the luma coding block width cbWidth and the luma coding block height cbHeight, the luma motion vectors mvA and mvB, the chroma motion vectors mvCA and mvCB, the reference indices refIdxA and refIdxB, and the prediction list flags predListFlagA and predListFlagB as inputs, and the inter prediction samples (predSamples) that are an (cbWidth)×(cbHeight) array predSamples of prediction luma samples and two (cbWidth/2)×(cbHeight/2) arrays predSamples$_{Cb}$ and predSamples$_{Cr}$ of prediction chroma samples, one for each of the chroma components Cb and Cr, as outputs.

5. The variables NumSbX [xCb][yCb] and NumSbY [xCb][yCb] are set equal to numSbX and numSbY, respectively.

6. The residual samples of the current coding unit are derived as follows:

The decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdx set equal to 0 as inputs, and the array resSamples$_L$ as output.

The decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdx set equal to 1 as inputs, and the array resSamples$_{Cb}$ as output.

The decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdx set equal to 2 as inputs, and the array resSamples$_{Cr}$ as output.

7. The reconstructed samples of the current coding unit are derived as follows:

The picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples, and the (cbWidth)×(cbHeight) array resSamples set equal to resSamples$_L$ as inputs, and the output is a modified reconstructed picture before in-loop filtering.

The picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

The picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamplesCr and the (cbWidth/2)×(cbHeight/2) array resSamples set equal to resSamplesCr as inputs, and the output is a modified reconstructed picture before in-loop filtering.

8.5.5 Derivation Process for Subblock Motion Vector Components and Reference Indices 8.5.5.1 General Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the reference indices refIdxL0 and refIdxL1,
  the number of luma coding subblocks in horizontal direction numSbX and in vertical direction numSbY,
  the prediction list utilization flag arrays predFlagL0[xSbIdx][ySbIdx] and predFlagL1[xSbIdx][ySbIdx] with xSbIdx=0 . . . numSbX−1, ySbIdx=0 . . . numSbX−1,
  the luma subblock motion vector arrays in 1/16 fractional-sample accuracy mvL0[xSbIdx][ySbIdx] and mvL1[xSbIdx][ySbIdx] with xSbIdx=0 . . . numSbX−1, ySbIdx=0 . . . numSbY−1,
  the chroma subblock motion vector arrays in 1/32 fractional-sample accuracy mvCL0[xSbIdx][ySbIdx] and mvCL1[xSbIdx][ySbIdx] with xSbIdx=0 . . . numSbX−1, ySbIdx=0 . . . numSbY−1,
  the bi-prediction weight index bcwIdx.

The Motion Vector Difference Array diffMv.

For the derivation of the variables mvL0[xSbIdx][ySbIdx], mvL1[xSbIdx][ySbIdx], mvCL0[xSbIdx][ySbIdx] and mvCL1[xSbIdx][ySbIdx], refIdxL0, refIdxL1, numSbX, numSbY, predFlagL0[xSbIdx][ySbIdx] and predFlagL1[xSbIdx][ySbIdx], the following applies:

If merge_subblock_flag[xCb][yCb] is equal to 1, the derivation process for motion vectors and reference indices in subblock merge mode as specified in 8.5.5.2 is invoked with the luma coding block location (xCb, yCb), the luma coding block width cbWidth and the luma coding block height cbHeight as inputs, the number of luma coding subblocks in horizontal direction numSbX and in vertical direction numSbY, the reference indices refIdxL0, refIdxL1, the prediction list utilization flag arrays predFlagL0[xSbIdx][ySbIdx] and predFlagL1[xSbIdx][ySbIdx], the luma subblock motion vector arrays mvL0[xSbIdx][ySbIdx] and mvL0[xSbIdx][ySbIdx], and the chroma subblock motion vector arrays mvCL0[xSbIdx][ySbIdx] and mvCL1[xSbIdx][ySbIdx], with xSbIdx=0 . . . numSbX−1, ySbIdx=0 . . . numSbY−1, and the bi-prediction weight index bcwIdx as outputs.

Otherwise (merge_subblock_flag[xCb][yCb] is equal to 0), for X being replaced by either 0 or 1 in the variables predFlagLX, cpMvLX, MvdCpLX, and refIdxLX, in PRED_LX, and in the syntax element ref_idx_IX, the following ordered steps apply:

For the derivation of the number of control point motion vectors numCpMv, the control point motion vectors cpMvLX[cpIdx] with cpIdx ranging from 0 to numCpMv−1, refIdxLX, predFlagLX[0][0], the following applies:

1. The number of control point motion vectors numCpMv is set equal to MotionModelIdc[xCb][yCb]+1.

2. The variables refIdxLX and predFlagLX are derived as follows:

If inter_pred_idc[xCb][yCb] is equal to PRED_LX or PRED_BI, refIdxLX=ref_idx_1$X$[$x$Cb][$y$Cb]  (8-457)

predFlagLX[0][0]=1  (8-458)

Otherwise, the variables refIdxLX and predFlagLX are specified by:

refIdxLX=−1  (8-459)

predFlagLX[0][0]=0  (8-460)

3. The variable mvdCpLX[cpIdx] with cpIdx ranging from 0 to numCpMv−1, is derived as follows:

mvdCpLX[cpIdx][0]=MvdCpLX[$x$Cb][$y$Cb][cpIdx][0]  (8-461)

mvdCpLX[cpIdx][1]=MvdCpLX[$x$Cb][$y$Cb][cpIdx][1]  (8-462)

4. When predFlagLX[0][0] is equal to 1, the derivation process for luma affine control point motion vector predictors as specified in clause 8.5.5.7 is invoked with the luma coding block location (xCb, yCb), and the variables cbWidth, cbHeight, refIdxLX, and the number of control point motion vectors numCpMv as inputs, and the output being mvpCpLX[cpIdx] with cpIdx ranging from 0 to numCpMv−1.

5. When predFlagLX[0][0] is equal to 1, the luma motion vectors cpMvLX[cpIdx] with cpIdx ranging from 0 to NumCpMv−1, are derived as follows:

$u$LX[cpIdx][0]=(mvpCpLX[cpIdx][0]+mvdCpLX [cpIdx][0]+$2^{18}$)%$2^{18}$  (8-463))

cpMvLX[cpIdx][0]=($u$LX[cpIdx][0]>=$2^{17}$)?($u$LX [cpIdx][0]−$2^{18}$:$u$LX[cpIdx][0]  (8-464)

$u$LX[cpIdx][1]=(mvpCpLX[cpIdx][1]+mvdCpLX [cpIdx][1]+$2^{18}$)%$2^{18}$  (8-465)

cpMvLX[cpIdx][1]=($u$LX[cpIdx][1]>=$2^{17}$)?($u$LX [cpIdx][1]−$2^{18}$:$u$LX[cpIdx][1]  (8-466)

The variables numSbX and numSbY are derived as follows:

numSb$X$=(cbWidth>>2)  (8-467)

numSb$Y$=(cbHeight>>2)  (8-468)

For xSbIdx=0 . . . numSbX−1, ySbIdx=0 . . . numSbY−1, the following applies:

predFlagLX[xSbIdx][ySbIdx]=predFlagLX[0][0]  (8-469)

When predFlagLX[0][0] is equal to 1, the derivation process for motion vector arrays from affine control point motion vectors as specified in subclause 8.5.5.9 is invoked with the luma coding block location (xCb, yCb), the luma coding block width cbWidth, the luma prediction block height cbHeight, the number of control point motion vectors numCpMv, the control point motion vectors cpMvLX[cpIdx] with cpIdx being 0 . . . 2, the reference index refIdxLX and the number of luma coding subblocks in horizontal direction numSbX and in vertical direction numSbY as inputs, the luma motion vector array mvLX[xSbIdx][ySbIdx], the chroma motion vector array mvCLX[xSbIdx][ySbIdx] with xSbIdx=0 . . . numSbX−1, ySbIdx=0 . . . numSbY−1, and motion vector difference array diffMy as outputs.

The bi-prediction weight index bcwIdx is set equal to bcw_idx[xCb][yCb].

8.5.5.9 Derivation Process for Motion Vector Arrays from Affine Control Point Motion Vectors
Inputs to this process are:
 a luma location (xCb, yCb) of the top-left sample of the current luma coding block relative to the top-left luma sample of the current picture,
 two variables cbWidth and cbHeight specifying the width and the height of the luma coding block,
 the number of control point motion vectors numCpMv, the control point motion vectors cpMvLX[cpIdx], with cpIdx=0 . . . numCpMv−1 and X being 0 or 1,
 the reference index refIdxLX and X being 0 or 1,
 the number of luma coding subblocks in horizontal direction numSbX and in vertical direction numSbY.
Outputs of this Process are:
 the luma subblock motion vector array mvLX[xSbIdx][ySbIdx] xSbIdx=0 . . . numSbX−1, ySbIdx=0 . . . numSbY−1 and X being 0 or 1, with
 the chroma subblock motion vector array mvCLX[xSbIdx][ySbIdx] with xSbIdx=0 . . . numSbX−1, ySbIdx=0 . . . numSbY−1 and X being 0 or 1.

The Motion Vector Difference Array diffMv.
 The following assignments are made for x=xCb . . . xCb+Cb Width−1 and y=yCb . . . yCb+cbHeight−1:

CpMvLX[$x$][$y$][0]=cpMvLX[0]  (8-666)

CpMvLX[$x$][$y$][1]=cpMvLX[1](8-667)

CpMvLX[$x$][$y$][2]=cpMvLX[2](8-668)

The variables log 2CbW and log 2CbH are derived as follows:

log 2Cb$W$=Log 2(cbWidth)(8-669)

log 2Cb$H$=Log 2(cbHeight)  (8-670)

The variables mvScaleHor, mvScaleVer, dHorX and dVerX are derived as follows:

mvScaleHor=cpMvLX[0][0]<<7  (8-671)

mvScaleVer=cpMvLX[0][1]<<7  (8-672)

$d$Hor$X$=(cpMvLX[1][0]−cpMvLX[0][0])<<(7−log 2Cb$W$)  (8-673)

$d$Ver$X$=(cpMvLX[1][1]−cpMvLX[0][1])<<(7−log 2Cb$W$)  (8-674)

The variables dHorY and dVerY are derived as follows:
 If numCpMv is equal to 3, the following applies:

$d$Hor$Y$=(cpMvLX[2][0]cpMvLX[0][0])<<(7−log 2Cb$H$)  (8-675)

$d$Ver$Y$=(cpMvLX[2][1]−cpMvLX[0][1])<<(7−log 2Cb$H$)  (8-676)

Otherwise (numCpMv is equal to 2), the following applies:

$d$Hor$Y$=−$d$Ver$X$  (8-677)

$d$Ver$Y$=$d$Hor$X$  (8-678)

The variables sbWidth and sbHeight are derived as follows:

sbWidth=cbWidth/numSb$X$  (8-xxx)

sbHeight=cbHeight/numSb$Y$  (8-xxx)

The variable fallbackModeTriggered is set equal to 1 and modified as follows:
 The variables bxWX$_4$, bxHX$_4$, bxWX$_h$, bxHX$_h$, bxWX$_v$ and bxHX$_v$ are derived as follows:

max$W_4$=Max(0,Max(4*(2048+$d$Hor$X$),Max(4*$d$Hor$Y$, 4*(2048+$d$Hor$X$)+4*$d$Hor$Y$)))  (8-679)

min$W_4$=Min(0,Min(4*(2048+$d$Hor$X$),Min(4*$d$Hor$Y$, 4*(2048+$d$Hor$X$)+4*$d$Hor$Y$)))  (8-680)

max$H_4$=Max(0,Max(4*$d$Ver$X$,Max(4*(2048+$d$Ver$Y$), 4*$d$Ver$X$+4*(2048+$d$Ver$Y$))))  (8-681)

min$H_4$=Min(0,Min(4*$d$Ver$X$,Min(4*(2048+$d$Ver$Y$), 4*$d$Ver$X$+4*(2048+$d$Ver$Y$))))  (8-682)

bxWX$_4$=((max$W_4$−min$W_4$)>>11)+9  (8-683)

bxHX$_4$=((max$H_4$−min$H_4$)>>11)+9  (8-684)

bxWX$_4$=((Max(0,4*(2048+$d$Hor$X$))−Min(0,4*(2048+ $d$Hor$X$)))>>11)+9  (8-685)

bxHX$_h$=((Max(0,4*$d$Ver$X$)−Min(0,4*$d$Ver$X$))>>11)+9  (8-686)

bx$_v$=((Max(0,4*$d$Hor$Y$)−Min(0,4*$d$Hor$Y$))>>11)+9  (8-687)

bxHX$_v$=((Max(0,4*(2048+$d$Ver$Y$))−Min(0,4*(2048+ $d$Ver$Y$)))>>11)+9  (8-688)

If inter_pred_idc[xCb][yCb] is equal to PRED_BI and bxWX$_4$*bxHX$_4$ is less than or equal to 225, fallbackModeTriggered is set equal to 0.

Otherwise, if both bxWX$_h$*bxHX$_h$ is less than or equal to 165 and bxWX$_v$*bxHX$_v$ is less than or equal to 165, fallbackModeTriggered is set equal to 0.

For xSbIdx=0 . . . numSbX−1 and ySbIdx=0 . . . numSbY−1, the following applies:

The variables xPosCb and yPosCb are derived as follows

If fallbackModeTriggered is equal to 1, the following applies:

$$xPosCb = (cbWidth \gg 1) \quad (8\text{-}689)$$

$$yPosCb = (cbHeight \gg 1) \quad (8\text{-}690)$$

Otherwise (fallbackModeTriggered is equal to 0), the following applies:

$$xPosCb = 2 + (xSbIdx \ll 2) \quad (8\text{-}691)$$

$$yPosCb = 2 + (ySbIdx \ll 2) \quad (8\text{-}692)$$

The luma motion vector mvLX[xSbIdx][ySbIdx] is derived as follows:

$$mvLX[xSbIdx][ySbIdx][0] = (mvScaleHor + dHorX*xPosCb + dHorY*yPosCb) \quad (8\text{-}693)$$

$$mvLX[xSbIdx][ySbIdx][1] = (mvScaleVer + dVerX*xPosCb + dVerY*yPosCb) \quad (8\text{-}694)$$

The rounding process for motion vectors as specified in clause 8.5.2.14 is invoked with mvX set equal to mvLX[xSbIdx][ySbIdx], rightShift set equal to 7, and leftShift set equal to 0 as inputs and the rounded mvLX[xSbIdx][ySbIdx] as output.

The motion vectors mvLX[xSbIdx][ySbIdx] are clipped as follows:

$$mvLX[xSbIdx][ySbIdx][0] = Clip3(-2^{17}, 2^{17}-1, mvLX[xSbIdx][ySbIdx][0]) \quad (8\text{-}695)$$

$$mvLX[xSbIdx][ySbIdx][1] = Clip3(-2^{17}, 2^{17}-1, mvLX[xSbIdx][ySbIdx][1]) \quad (8\text{-}696)$$

For xSbIdx=0 . . . numSbX−1 and ySbIdx=0 . . . numSbY−1, the following applies:

The average luma motion vector mvAvgLX is derived as follows:

$$mvAvgLX = mvLX[(xSbIdx \gg 1 \ll 1)][(ySbIdx \gg 1 \ll 1)] + mvLX[(xSbIdx \gg 1 \ll 1) + 1][(ySbIdx \gg 1 \ll 1) + 1] \quad (8\text{-}697)$$

$$mvAvgLX[0] = (mvAvgLX[0] + 1 - (mvAvgLX[0] \ge 0)) \gg 1 \quad (8\text{-}698)$$

$$mvAvgLX[1] = (mvAvgLX[1] + 1 - (mvAvgLX[1] \ge 0)) \gg 1 \quad (8\text{-}699)$$

The derivation process for chroma motion vectors in clause 8.5.2.13 is invoked with mvAvgLX and refIdxLX as inputs, and the chroma motion vector mvCLX[xSbIdx][ySbIdx] as output.

This way four 2×2 chroma subblocks (4×4 chroma block) share the same motion vector which is derived from the average of two 4×4 luma subblock motion vectors. In the decoding process motion compensation is still performed on 2×2 chroma blocks which is however a motion compensation on a chroma 4×4 block because all chroma MVs inside a 4×4 chroma block are the same. Affine chroma MC is performed on 4×4 chroma blocks.

The motion vector difference array diffMv is derived as follows:

If fallbackModeTriggered is equal to 0, the following applies:

The variable shift 1 is set to equal to Max (6, bitDepth−6).

The variable dmvLimit is set to equal to 1 << shift 1.

The variable posOffsetX and posOffsetY is derrived as follows:

$$posOffsetX = 6*dHorX + 6*dVerX$$

$$posOffsetY = 6*dHorY + 6*dVerY$$

For x=0 . . . sbWidth−1 and y=0 . . . sbHeight−1, the following applies:

The following applies:

$$diffMv[x][y][0] = x*(dHorX \ll 2) + y*(dVerX \ll 2) - posOffsetX$$

$$diffMv[x][y][1] = x*(dHorY \ll 2) + y*(dVerY \ll 2) - posOffsetY$$

For i=0 . . . 1, the following applies:

The rounding process for motion vectors as specified in clause 8.5.2.14 is invoked with mvX set equal to diffMv[x][y][i], rightShift set equal to 7, and leftShift set equal to 0 as inputs and the rounded diffMv as output.

diffMv[x][y][i] is clipped as followings:

$$diffMv[x][y][i] = Clip3(-dmvLimit, dmvLimit-1, diffMv[x][y][i])$$

Otherwise (fallbackModeTriggered is equal to 1), for x=0 . . . sbWidth−1 and y=0 . . . sbHeight−1, the following applies:

$$diffMv[x][y][0] = 0$$

$$diffMv[x][y][1] = 0$$

8.5.6 Decoding Process for Inter Blocks 8.5.6.1 General

This process is invoked when decoding a coding unit coded in inter prediction mode.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mvL0[xSbIdx][ySbIdx] and mvL1[xSbIdx][ySbIdx] with xSbIdx=0 . . . numSbX−1, and ySbIdx=0 . . . numSbY−1, the refined motion vectors refMvL0[xSbIdx][ySbIdx] and refMvL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx] with xSbIdx=0 . . . numSbX−1, and ySbIdx=0 . . . numSbY−1, the bi-prediction weight index bcwIdx, a variable cIdx specifying the colour component index of the current block.

a Motion Vector Difference Array diffMv.

Outputs of this Process are:

an array predSamples of prediction samples.

Let predSamplesL0$_L$, predSamplesL1$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$ and predSamplesL1$_{Cr}$, predSamplesIntra$_{Cb}$, and predSamplesIntra$_{Cr}$ be (cbWidth/2)×(cbHeight/2) arrays of predicted chroma sample values.

The variable currPic specifies the current picture and the variable bdofFlag is derived as follows:
If all of the following conditions are true, bdofFlag is set equal to TRUE.
sps_bdof_enabled_flag is equal to 1.
predFlagL0[xSbIdx][ySbIdx] and predFlagL1[xSbIdx][ySbIdx] are both equal to 1.
DiffPicOrderCnt (currPic, RefPicList[0][refIdxL0]) *DiffPicOrderCnt (currPic, RefPicList[1][refIdxL1]) is less than 0.
MotionModelIdc[xCb][yCb] is equal to 0.
merge_subblock_flag[xCb][yCb] is equal to 0.
sym_mvd_flag[xCb][yCb] is equal to 0.
BcwIdx[xCb][yCb] is equal to 0.
luma_weight_l0_flag[refIdxL0] and luma_weight_l1_flag[refIdxL1] are both equal to 0.
cbHeight is greater than or equal to 8
cIdx is equal to 0.
Otherwise, bdofFlag is set equal to FALSE.

If numSbY is equal to 1 and numSbX is equal to 1 the following applies:
When bdofFlag is equal to TRUE, the variables numSbY, numSbX are modified as follows:

numSb$X$=(cbWidth>16)?(cbWidth>>4):1        (8-700)

numSb$Y$=(cbHeight>16)?(cbHeight>>4):1        (8-701)

For X=0 . . . 1, xSbIdx=0 . . . numSbX−1 and ySbIdx=0 . . . numSbY−1, the following applies:
predFlagLX[xSbIdx][ySbIdx] is set equal to predFlagLX[0][0].
refMvLX[xSbIdx][ySbIdx] is set equal to refMvLX[0][0].
mvLX[xSbIdx][ySbIdx] is set equal to mvLX[0][0].

The width and the height of the current coding sublock sbWidth, sbHeight in luma samples are derived as follows:

sbWidth=cbWidth/numSb$X$        (8-702)

sbHeight=cbHeight/numSb$Y$        (8-703)

If inter_affine_flag[xCb][yCb] is equal to 1, cIdx is equal to 1 and profFlag is equal to TRUE, the following applies:
For each coding subblock at subblock index (xSbIdx, ySbIdx) with xSbIdx-0 . . . numSbX−1, and ySbIdx=0 . . . numSbY−1, the following applies:
The luma location (xSb, ySb) specifying the top-left sample of the current coding subblock relative to the top-left luma sample of the current picture is derived as follows:

($x$Sb,$y$Sb)=($x$Cb+$x$SbIdx*sbWidth,$y$Cb+$y$SbIdx*sbHeight)        (8-704)

For X being each of 0 and 1, when predFlagLX[xSbIdx][ySbIdx] is equal to 1, the following applies:
The reference picture consisting of an ordered two-dimensional array refPicLx$_L$ of luma samples and two ordered two-dimensional arrays refPicLx$_{Cb}$ and refPicLx$_{Cr}$ of chroma samples is derived by invoking the process specified in clause 8.5.6.2 with X and refIdxLX as inputs.
The array paddedSamplesX [xSbIdx][ySbIdx] is derived by invoking the fractional sample interpolation process specified in clause 8.5.6.3 with the luma location (xSb, ySb), the coding subblock width sbWidth, the coding subblock height sbHeight in luma samples, the luma motion vector offset (0, 0), the refined luma motion vector refMvLX[xSbIdx][xSbIdx], the reference array refPicLx$_L$, bdofFlag, and cIdx as inputs.
notPaddedSamplesX [x+xSb][y+ySb] is set equal to predSamplesLx$_L$[x+1][y+1] with x=0, . . . sbWidth−1, y=0 . . . , sbHeight−1

For each coding subblock at subblock index (xSbIdx, ySbIdx) with xSbIdx=0 . . . numSbX−1, and ySbIdx=0 . . . numSbY−1, the following applies:
The luma location (xSb, ySb) specifying the top-left sample of the current coding subblock relative to the top-left luma sample of the current picture is derived as follows:

($x$Sb,$y$Sb)=($x$Cb+$x$SbIdx*sbWidth,$y$Cb+$y$SbIdx*sbHeight)        (8-704)

For X being each of 0 and 1, when predFlagLX[xSbIdx][ySbIdx] is equal to 1, the following applies:
The reference picture consisting of an ordered two-dimensional array refPicLx$_L$ of luma samples and two ordered two-dimensional arrays refPicLx$_{Cb}$ and refPicLx$_{Cr}$ of chroma samples is derived by invoking the process specified in clause 8.5.6.2 with X and refIdxLX as inputs.
The motion vector offset mvOffset is set equal to refMvLX[$x$SbIdx][$x$SbIdx]−mvLX[$x$SbIdx][$y$SbIdx].

When one or more of the following conditions is true, mvOffset[0] is set equal to 0:
xSb is not equal to xCb and mvOffset[0] is less than 0
(xSb+sbWidth) is not equal to (xCb+cbWidth) and mvOffset[0] is greater than 0
When one or more of the following conditions is true, mvOffset[1] is set equal to 0:
ySb is not equal to yCb and mvOffset[1] is less than 0
(ySb+sbHeight) is not equal to (yCb+cbHeight) and mvOffset[1] is greater than 0
If cIdx is equal to 0, the following applies:
If inter_affine_flag[xSb][ySb] is equal to 1, prediction refinement with optical flow process specified in clause 8.5.6.7 is invoked with sbWidth, sbHeight, predSamplesLx$_L$ and motion vector difference array diffMv as inputs and refined predSamplesLx$_L$ as outputs.
Otherwise, the array predSamplesLx$_L$ is derived by invoking the fractional sample interpolation process specified in clause 8.5.6.3 with the coding subblock width sbWidth, the coding subblock height sbHeight, the coding block width Cb Width, the coding block height cbHeight in luma samples, the luma location (xSb, ySb), the sample array paddedSamplesX [xSbIdx][ySbIdx], the sample array notPadded-SamplesX, the luma motion vector offset mvOffset, the refined luma motion vector refMvLX[xSbIdx][xSbIdx], the reference array refPicLx$_L$, bdofFlag, and cIdx as inputs.

Otherwise if cIdx is equal to 1, the following applies:
The array predSamplesLx$_{Cb}$ is derived by invoking the fractional sample interpolation process specified in clause 8.5.6.3 with the luma location (xSb, ySb), the coding subblock width sbWidth/2, the coding subblock height sbHeight/2, the chroma motion vector offset mvOffset, the refined chroma motion vector refMvLX[xSbIdx][xSbIdx], the reference array refPicLx$_{Cb}$, bdofFlag, and cIdx as inputs.

Otherwise (cIdx is equal to 2), the following applies:
The array predSamplesLx$_{Cr}$ is derived by invoking the fractional sample interpolation process specified in clause 8.5.6.3 with the luma location (xSb, ySb), the coding subblock width sbWidth/2, the coding subblock height sbHeight/2, the chroma motion vector offset mvOffset, the refined chroma motion vector refMvLX[xSbIdx][xSbIdx], the reference array refPicLx$_{Cr}$, bdofFlag, and cIdx as inputs.

If bdofFlag is equal to TRUE, the following applies:
The variable shift is set equal to Max (2, 14-Bit-Depth$_Y$).
The variables sbDiffThres, bdofBlkDiffThres, and sbSumDiff are derived as follows:

sbDiffThres=(1<<(BitDepth$_Y$−8+shift))*sbWidth*sbHeight   (8-705)

bdofBlkDiffThres=1<<(BitDepth$_Y$−3+shift)   (8-706)

sbSumDiff=0   (8-707)

For xIdx=0 . . . (sbWidth>>2)−1 and yIdx=0 . . . (sbHeight>>2)−1, the variables bdofBlkSumDiff and the bidirectional optical flow utilization flag bdofUtilizationFlag[xIdx][yIdx] are derived as follows:

bdofBlkSumDiff=$\Sigma_{i=0}^{3}\Sigma_{j=0}^{3}$Abs(predSamplesL0$_L$[(xIdx<<2)+1+i][(yIdx<<2)+1+j]−predSamplesL1$_L$[(xIdx<<2)+1+i][(yIdx<<2)+1+j])   (8-708)

bdofUtilizationFlag[xIdx][yIdx]=bdofBlkSumDiff>=bdofBlkDiffThres   (8-709)

sbSumDiff+=bdofBlkSumDiff   (8-710)

The variable sbBdofFlag is derived as follows:
If sbSumDiff is less than sbDiffThres, sbBdofFlag is set equal to FALSE.
Otherwise, sbBdofFlag set equal to TRUE.

The array predSamples of prediction samples is derived as follows:
If cIdx is equal to 0, the prediction samples inside the current luma coding subblock, predSamples[x$_L$+xSb][y$_L$+ySb] with XL=0 . . . sbWidth−1 and y$_L$=0 . . . sbHeight−1, are derived as follows:

If sbBdofFlag is equal to TRUE, the bidirectional optical flow sample prediction process as specified in clause 8.5.6.4 is invoked with nCbW set equal to the luma coding subblock width sbWidth, nCbH set equal to the luma coding subblock height sbHeight and the sample arrays predSamplesL0L and predSamplesL1$_L$, and the variables predFlagL0[xSbIdx][ySbIdx], predFlagL1[xSbIdx][ySbIdx], refIdxL0, refIdxL1 and bdofUtilizationFlag[xIdx][yIdx] with xIdx=0 . . . (sbWidth>>2)−1, yIdx=0 . . . (sbHeight>>2)−1 as inputs, and predSamples[x$_L$+xSb][y$_L$+ySb] as outputs.

Otherwise (sbBdofFlag is equal to FALSE), the weighted sample prediction process as specified in clause 8.5.6.5 is invoked with the luma coding subblock width sbWidth, the luma coding subblock height sbHeight and the sample arrays predSamplesL0L and predSamplesL1$_L$, and the variables predFlagL0[xSbIdx][ySbIdx], predFlagL1[xSbIdx][ySbIdx], refIdxL0, refIdxL1, bcwIdx, and cIdx as inputs, and predSamples[x$_L$+xSb][y$_L$+ySb] as outputs.

Otherwise, if cIdx is equal to 1, the prediction samples inside the current chroma component Cb coding subblock, predSamples[x$_C$+xSb/2][y$_C$+ySb/2] with x$_C$=0 . . . sbWidth/2−1 and y$_C$=0 . . . sbHeight/2−1, are derived by invoking the weighted sample prediction process specified in clause 8.5.6.5 with nCbW set equal to sbWidth/2, nCbH set equal to sbHeight/2, the sample arrays predSamplesL0$_{Cb}$ and predSamplesL1$_{Cb}$, and the variables predFlagL0[xSbIdx][ySbIdx], predFlagL1[xSbIdx][ySbIdx], refIdxL0, refIdxL1, bcwIdx, and cIdx as inputs.

Otherwise (cIdx is equal to 2), the prediction samples inside the current chroma component Cr coding subblock, predSamples[xC+xSb/2][y$_C$+ySb/2] with x$_C$=0 . . . sbWidth/2−1 and y$_C$=0 . . . sbHeight/2−1, are derived by invoking the weighted sample prediction process specified in clause 8.5.6.5 with nCbW set equal to sbWidth/2, nCbH set equal to sbHeight/2, the sample arrays predSamplesL0$_{Cr}$ and predSamplesL1$_{Cb}$, and the variables predFlagL0[xSbIdx][ySbIdx], predFlagL1[xSbIdx][ySbIdx], refIdxL0, refIdxL1, bcwIdx, and cIdx as inputs.

When cIdx is equal to 0, the following assignments are made for x=0 . . . sbWidth−1 and y=0 . . . sbHeight−1:

MvL0[xSb+x][ySb+y]=mvL0[xSbIdx][ySbIdx]   (8-711)

MvL1[xSb+x][ySb+y]=mvL1[xSbIdx][ySbIdx]   (8-712)

MvDmvrL0[xSb+x][ySb+y]=refMvL0[xSbIdx][ySbIdx]   (8-713)

MvDmvrL1[xSb+x][ySb+y]=refMvL1[xSbIdx][ySbIdx]   (8-714)

RefIdxL0[xSb+x][ySb+y]=refIdxL0   (8-715)

RefIdxL1[xSb+x][ySb+y]=refIdxL1   (8-716)

PredFlagL0[xSb+x][ySb+y]=predFlagL0[xSbIdx][ySbIdx]   (8-717)

PredFlagL1[xSb+x][ySb+y]=predFlagL1[xSbIdx][yS-
bIdx] (8-718)

BcwIdx[xSb+x][ySb+y]=bcwIdx (8-719)

When ciip_flag[xCb][yCb] is equal to 1, the array predSamples of prediction samples is modified as follows:
If cIdx is equal to 0, the following applies:
   The general intra sample prediction process as specified in clause 8.4.5.2.5 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntraL.
   The weighted sample prediction process for combined merge and intra prediction as specified in clause 8.5.6.6 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntraL, respectively, the intra prediction mode predModeIntra set equal to IntraPredModeY[xCb][yCb], and the colour component index cIdx as inputs, and the output is assigned to the (cbWidth)×(cbHeight) array predSamples.
Otherwise, if cIdx is equal to 1, the following applies:
   The general intra sample prediction process as specified in clause 8.4.5.2.5 is invoked with the location (xTbCmp, yTbCmp) set equal to (xCb/2, yCb/2), the intra prediction mode predModeIntra set equal to IntraPredModeY[xCb][yCb], the transform block width nTbW and height nTbH set equal to cbWidth/2 and cbHeight/2, the coding block width nCbW and height nCbH set equal to cbWidth/2 and cbHeight/2, and the variable cIdx as inputs, and the output is assigned to the (cbWidth/2)×(cbHeight/2) array predSamplesIntra$_{Cb}$.
   The weighted sample prediction process for combined merge and intra prediction as specified in clause 8.5.6.6 is invoked with the location (xTbCmp, yTbCmp) set equal to (xCb, yCb), the coding block width Cb Width/2, the coding block height cbHeight/2, the sample arrays predSamplesInter and predSamplesIntra set equal to predSamples$_{Cb}$ and predSamplesIntra$_{Cb}$, respectively, the intra prediction mode predModeIntra set equal to IntraPredModeY[xCb][yCb], and the colour component index cIdx as inputs, and the output is assigned to the (cbWidth/2)×(cbHeight/2) array predSamples.
Otherwise (cIdx is equal to 2), the following applies:
   The general intra sample prediction process as specified in clause 8.4.5.2.5 is invoked with the location (xTbCmp, yTbCmp) set equal to (xCb/2, yCb/2), the intra prediction mode predModeIntra set equal to IntraPredModeY[xCb][yCb], the transform block width nTbW and height nTbH set equal to cbWidth/2 and cbHeight/2, the coding block width nCbW and height nCbH set equal to cbWidth/2 and cbHeight/2, and the variable cIdx as inputs, and the output is assigned to the (cbWidth/2)×(cbHeight/2) array predSamplesIntra$_{Cr}$.
   The weighted sample prediction process for combined merge and intra prediction as specified in clause 8.5.6.6 is invoked with the location (xTbCmp, yTbCmp) set equal to (xCb, yCb), the coding block width cbWidth/2, the coding block height cbHeight/2, the sample arrays predSamplesInter and predSamplesIntra set equal to predSamples$_{Cr}$ and predSamplesIntra$_{Cr}$, respectively, the intra prediction mode predModeIntra set equal to IntraPredModeY[xCb][yCb], and the colour component index cIdx as inputs, and the output is assigned to the (cbWidth/2)×(cbHeight/2) array predSamples.

8.5.6.3 Fractional Sample Interpolation Process
8.5.6.3.1 General
Inputs to this process are:
   a luma location (xSb, ySb) specifying the top-left sample of the current coding subblock relative to the top-left luma sample of the current picture, a variable sbWidth specifying the width of the current coding subblock,
   a variable sbHeight specifying the height of the current coding subblock,
   a motion vector offset mvOffset,
   a refined motion vector refMvLX,
   the selected reference picture sample array refPicLX,
   the bidirectional optical flow flag bdofFlag,
   a variable cIdx specifying the colour component index of the current block.
Outputs of this process are:
   an (sbWidth+borderExtension [[bdofOffset]])×(sbHeight+borderExtension [[bdofOffset]]) array predSamplesLX of prediction sample values.
The prediction block border extension borderExtension [[bidirectional optical flow boundary offset bdofOffset]] is derived as follows:

borderExtension[[bdofOffset]]=
   (bdofFlag|inter_affine_flag[xSb][ySb])?2:0 (8-720)

If cIdx is equal to 0, the following applies:
   Let (xInt$_L$, yInt$_L$) be a luma location given in full-sample units and (xFrac$_L$, yFrac$_L$) be an offset given in 1/16-sample units. These variables are used only in this clause for specifying fractional-sample locations inside the reference sample arrays refPicLX.
   For each luma sample location (XL=0 . . . sbWidth−1+borderExtension [[bdofOffset]], y$_L$=0 . . . sbHeight−1+borderExtension [[bdofOffset]]) inside the prediction luma sample array predSamplesLX, the corresponding prediction luma sample value predSamplesLX[x$_L$][y$_L$] is derived as follows:
      The variables xInt$_L$, yIntL, xFrac$_L$ and yFrac$_L$ are derived as follows:

xInt$_L$=xSb+(refMvLX[0]>>4)+x$_L$ (8-721)

yInt$_L$=ySb+(refMvLX[1]>>4)+y$_L$ (8-722)

xFrac$_L$=refMvLX[0]&15 (8-723)

yFracL=refMvLX[1]&15 (8-724)

If bdofFlag is equal to TRUE and one or more of the following conditions are true, the prediction luma sample value predSamplesLX[x$_L$][y$_L$] is derived by invoking the luma integer sample fetching process as specified in clause 8.5.6.3.3 with (xInt$_L$, yInt$_L$) [[, (xFrac$_L$, yFrac$_L$)]] and refPicLX as inputs:

$x_L$ is equal to 0.
$x_L$ is equal to sbWidth+1.
$y_L$ is equal to 0.
$y_L$ is equal to sbHeight+1.
Otherwise, if inter_affine_flag[xSb][ySb] is equal to TRUE and one or more of the following conditions are true, the prediction luma sample value predSamplesLX[$x_L$][$y_L$] is derived by invoking the luma integer sample fetching process as specified in clause 8.5.6.3.3 with (xIntRounded$_L$, yIntRounded$_L$) and refPicLX as inputs.
$x_L$ is equal to 0.
$x_L$ is equal to sbWidth+1.
$y_L$ is equal to 0.
$y_L$ is equal to sbHeight+1.
xIntRounded$_L$ and yIntRounded$_L$ are derived as following:

$$xIntRoundedL = xInt_L + (xFracL \gg 3)$$

$$yIntRoundedL = yIntL + (yFracL \gg 3)$$

Otherwise, the following applies:
The motion vector mvLX is set equal to (refMvLX−mvOffset).
The list padVal[dir] is derived as follows for dir=0 . . . 1:
The variable disp is derived as follows:

$$disp = (refMvLX[dir] \gg 4) - (mvLX[dir] \gg 4) + (dir == 0 ? x_L : y_L) \quad (8\text{-}725)$$

If disp is less than 0, padVal[dir] is set equal to disp.
Otherwise, if disp is greater than (dir==0?sbWidth:sbHeight)−1, padVal[dir] is set equal to disp−((dir==0?sbWidth:sbHeight)−1).
Otherwise, padVal[dir] is set equal to 0.
The prediction luma sample value predSamplesLX[$x_L$][$y_L$] is derived by invoking the luma sample 8-tap interpolation filtering process as specified in clause 8.5.6.3.2 with (xInt$_L$, yInt$_L$), (xFrac$_L$, yFrac$_L$), refPicLX, sbWidth, sbHeight, (xSb, ySb) and padVal as inputs.
Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
The variables xIntC, yIntC, xFracC and yFracC are derived as follows:

$$xInt_C = (xSb/SubWidthC) + (mvLX[0] \gg 5) + x_C \quad (8\text{-}726)$$

$$yInt_C = (ySb/SubHeightC) + (mvLX[1] \gg 5) + y_C \quad (8\text{-}727)$$

$$xFrac_C = mvLX[0] \& 31 \quad (8\text{-}728)$$

$$yFrac_C = mvLX[1] \& 31 \quad (8\text{-}729)$$

The motion vector mvLX is set equal to (refMvLX−mvOffset).

The list padVal[dir] is derived as follows for dir=0 . . . 1:
The variable disp is derived as follows:

$$disp = (refMvLX[dir] \gg 4) - (mvLX[dir] \gg 4) + (dir == 0 ? x_C : y_C) \quad (8\text{-}730)$$

If disp is less than 0, padVal[dir] is set equal to disp.
Otherwise, if disp is greater than (dir==0?sbWidth/SubWidthC:sbHeight/SubWidthC)−1, padVal[dir] is set equal to disp−((dir==0?sbWidth/SubWidthC:sbHeight/SubWidthC)−1).
Otherwise, padVal[dir] is set equal to 0.
The prediction sample value predSamplesLX[xC][yC] is derived by invoking the process specified in clause 8.5.6.3.4 with (xIntC, yIntC), (xFracC, yFracC), refPicLX, and padVal as inputs.

8.5.6.x Padding Process for Optical Flow Process
Inputs to this Process are:
two variables sbWidth and sbHeight specifying the width and the height of the current subblock,
two variables bWidth and bHeight specifying the width and the height of the current subblock,
one (bWidth+2)×(bHeight+2) prediction sample arrays, paddedSamples 8.5.6.7 Prediction Refinement with Optical Flow Process
Inputs to this Process are:
two variables sbWidth and sbHeight specifying the width and the height of the current subblock.
two variables cbWidth and cbHeight specifying the width and the height of the current block, the luma location (xSb, ySb),
one (sbWidth+2)×(sbHeight+2) prediction sample arrays, paddedSamples
one cbWidth×cbHeight prediction sample array nopaddedSamples
one (sbWidth×sbHeight) motion vector difference array, diffMv
Output of this process is the (sbWidth)×(sbHeight) array pbSamples of prediction sample values.
Variables bitDepth and Shift1 are Derived as Follows:
The variable shift1 is set equal to Max (6, bitDepth−6).
The variable dILimit is set equal to 1<<(14−1).
The variable paddingW is derived as Min (16, cbWidth).
The variable paddingH is derived as Min (16, cbHeight).
A (sbWidth+2)×(sbHeight+2) sample array predSamples is derived as:
predSamples[x][y] is set equal to paddedSamples[x][y] with x=1 . . . sbWidth, y=1 . . . sbHeight.
If ySb % paddingH is equal to 0, predSamples[x][0] is set equal to paddedSamples[x][0] with x=1 . . . sbWidth. Otherwise, predSamples[x][0] is set equal to nopaddedSamples[x+xSb−1][ySb−1] with x=1 . . . sbWidth.
If (ySb+sbHeight) % paddingH is equal to 0, predSamples[x][sbHeight+1] is set equal to paddedSamples[x][sbHeight+1] with x=1 . . . sbWidth. Otherwise, predSamples[x][sbHeight+1] is set equal to nopaddedSamples[x+xSb−1][ySb+sbHeight] with x=1 . . . sbWidth.
If xSb % padding W is equal to 0, predSamples[0][y] is set equal to paddedSamples[0][y] with y=1 . . . sbHeight. Otherwise, predSamples[0][y] is set equal to nopaddedSamples[xSb−1][ySb+y−1] with y=1 . . . sbHeight.
If (xSb+sbWidth) % paddingW is equal to 0, predSamples[sbWidth+1][y] is set equal to paddedSamples[sbWidth+1][y] with y=1 . . . sbHeight. Otherwise, predSamples[sb- Width+1][y] is set equal to nopaddedSamples[xSb+sbWidth][ySb+y−1] with y=1 . . . sbHeight.

For x=0 . . . sbWidth−1, y=0 . . . sbHeight−1, the following ordered steps apply:
The variables gradientH [x][y] and gradient V [x][y] are derived as follows:

gradientH[x][y]=(predSamples[x+2][y]−predSamples[x][y])>>shift1 gradientV[x][y]=(predSamples[x][y+2]−predSamples[x][y])>>shift1

The variable dI is derived as follows:

dI=gradientH[x][y]*diffMv[x][y][0]+
   gradientV[x][y]*diffMv[x][y][1]

Prediction sample value at location (x, y) in the subblock is derived as follows:

pbSamples[x][y]=predSamples[x+1][y+1]+Clip3(−dILimit,dILimit−1,(dI+1)>>1))

5.2 Working Draft for Bullet 22.
The working draft is based on JVET-O2001.
The changes in JVET-O0070 is in underlines.
8.5.5.9 Derivation Process for Motion Vector Arrays from Affine Control Point Motion Vectors
The variable CbProfFlagLX is derived as follows:
If one or more of the following conditions are true, CbProfFlagLX is set equal to FALSE.
affine_prof_enabled_flag is equal to 0.
fallbackModeTriggered is equal to 1.
numCpMv is equal to 2 and cpMvLX[1][0] is equal to cpMvLX[0][0] and cpMvLX[1][1] is equal to cpMvLX[0][1].
numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].
Otherwise, CbProfFlagLX set equal to TRUE.
If CbProfFlagLX is 1, the Motion Vector Difference Array diffMv is Derived as Follows:
The variables sbWidth and sbHeight are derived as follows:

sbWidth=cbWidth/numSbX sbHeight=cbHeight/numSbY

The variable bitDepth is set equal to BitDepth$_Y$, and the variable shift1 is set to equal to Max (6, bitDepth−6).
The variable dmvLimit is set to equal to 1<<shift1.
The variable posOffsetX and posOffsetY is derrived as follows:

posOffsetX=6*dHorX+6*dVerX posOffsetY=6*dHorY+6*dVerY

For x=0 . . . sbWidth−1 and y=0 . . . sbHeight−1, the following applies:
The following applies:

diffMv[x][y][0]=x*(dHorX<<2)+y*(dVerX<<2)−posOffsetX diffMv[x][y][1]=x*(dHorY<<2)+y*(dVerY<<2)−posOffsetY For i=0 . . . 1, the following applies:
The rounding process for motion vectors as specified in clause 8.5.2.14 is invoked with mvX set equal to diffMv[x][y][i], rightShift set equal to 7, and leftShift set equal to 0 as inputs and the rounded diffMv[x][y][i] as output.
diffMv[x][y][i] is clipped as followings:

diffMv[x][y][i]=Clip3(−dmvLimit,dmvLimit−1,diffMv[x][y][i])

5.2 Working Draft for Bullet 23.
The working draft is based on JVET-O2001.
The changes in JVET-O0070 is in underlines.

| 7.3.2.3 Sequence parameter set RBSP syntax | |
|---|---|
| seq_parameter_set_rbsp( ) { | Descriptor |
| ... | |
| sps_bdof_enabled_flag | u(1) |
| ... | |
| sps_dmvr_enabled_flag | u(1) |
| ... | |
| sps_affine_prof_enabled_flag | u(1) |
| ... | |
| if( sps_bdof_enabled_flag \|\| sps_dmvr_enabled_ flag \|\| sps_affine_prof_enabled_flag) | |
| sps_bdof_prof_dmvr_slice_present_flag | u(1) |

| 7.3.6 Slice header syntax 7.3.6.1 General slice header syntax | |
|---|---|
| slice_header( ) { | Descriptor |
| slice_pic_parameter_set_id | ue(v) |
| ... | |
| if( sps_fpel_mmvd_enabled_flag ) | |
| slice_fpel_mmvd_enabled_flag | u(1) |
| if( sps_bdof_prof_dmvr_slice_present _flag ) | |
| slice_disable_bdof_prof_dmvr _flag | u(1) |
| ... | | sps_bdof_prof_dmvr_slice_present_flag equal to 1 specifies that slice_disable_bdof_prof_dmvr_flag is present in slice headers referring to the SPS.
sps_bdof_prof_dmvr_slice_present_flag equal to 0 specifies that slice_disable_bdof_prof_dmvr_flag is not present in slice headers referring to the SPS. sps_bdof_prof_dmvr_slice_present_flag is not present, the value of sps_bdof_prof_dmvr_slice_present_flag is inferred to be equal to 0.
slice_disable_bdof_prof_dmvr_flag equal to 1 specifies that none of bidirectional optical flow inter prediction, prediction refinement with optical flow and decoder motion vector refinement based inter bi-prediction is enabled in the current slice. slice_disable_bdof_prof_dmvr_flag equal to 0 specifies that bidirectional optical flow inter prediction, prediction refinement with optical flow or decoder motion vector refinement based inter bi-prediction may or may not be enabled in the current slice. When slice_disable_bdof_prof_dmvr_flag is not present, the value of slice_disable_prof_bdof_dmvr_flag is inferred to be 0.
8.5.1 General Decoding Process for Coding Units Coded in Inter Prediction Mode
When all of the following conditions are true, dmvrFlag is set equal to 1:
sps_dmvr_enabled_flag is equal to 1 and slice_disable_bdof_prof_dmvr_flag is equal to 0
general_merge_flag[xCb][yCb] is equal to 1
both predFlagL0[0][0] and predFlagL1[0][0] are equal to 1
mmvd_merge_flag[xCb][yCb] is equal to 0
ciip_flag[xCb][yCb] is equal to 0

DiffPicOrderCnt (currPic, RefPicList[0][refIdxL0]) is equal to DiffPicOrderCnt (RefPicList[1][refIdxL1], currPic)

BcwIdx[xCb][yCb] is equal to 0

Both luma_weight_l0_flag[refIdxL0] and luma_weight_l1_flag[refIdxL1] are equal to 0 cbWidth is greater than or equal to 8 cbHeight is greater than or equal to 8 cbHeight*cbWidth is greater than or equal to 128

For X being each of 0 and 1, the pic_width_in_luma_samples and pic_height_in_luma_samples of the reference picture refPicLX associated with the refIdxLX are equal to the pic_width_in_luma_samples and pic_height_in_luma_samples of the current picture, respectively.

8.5.6.1

If all of the following conditions are true, bdofFlag is set equal to TRUE.

sps_bdof_enabled_flag is equal to 1 and slice_disable_bdof_prof_dmvr_flag is equal to 0.

predFlagL0[xSbIdx][ySbIdx] and predFlagL1[xSbIdx][ySbIdx] are both equal to 1.

DiffPicOrderCnt (currPic, RefPicList[0][refIdxL0])*DiffPicOrderCnt (currPic, RefPicList[1][refIdxL1]) is less than 0.

MotionModelIdc[xCb][yCb] is equal to 0.

merge_subblock_flag[xCb][yCb] is equal to 0.

sym_mvd_flag[xCb][yCb] is equal to 0.

ciip_flag[xCb][yCb] is equal to 0.

BcwIdx[xCb][yCb] is equal to 0.

luma_weight_l0_flag[refIdxL0] and luma_weight_l1_flag[refIdxL1] are both equal to 0.

cbWidth is greater than or equal to 8.

cbHeight is greater than or equal to 8.

cbHeight*cbWidth is greater than or equal to 128.

For X being each of 0 and 1, the pic_width_in_luma_samples and pic_height_in_luma samples of the reference picture refPicLX associated with the refIdxLX are equal to the pic_width_in_luma_samples and pic_height_in_luma_samples of the current picture, respectively.

cIdx is equal to 0.

Otherwise, bdofFlag is set equal to FALSE.

. . .

8.5.5.9

. . .

The variable CbProfFlagLX is derived as follows:

If one or more of the following conditions are true, CbProfFlagLX is set equal to FALSE.

affine_prof_enabled_flag is equal to 0.

slice_disable_bdof_prof_dmvr_flag is equal to 1.

fallbackModeTriggered is equal to 1.

numCpMv is equal to 2 and cpMvLX[1][0] is equal to cpMvLX[0][0] and cpMvLX[1][1] is equal to cpMvLX[0][1].

numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].

Otherwise, CbProfFlagLX set equal to TRUE.

. . .

The examples described above may be incorporated in the context of the methods described below, e.g., methods 2910 to 2970, which may be implemented at a video decoder or a video encoder.

Figure 29A:
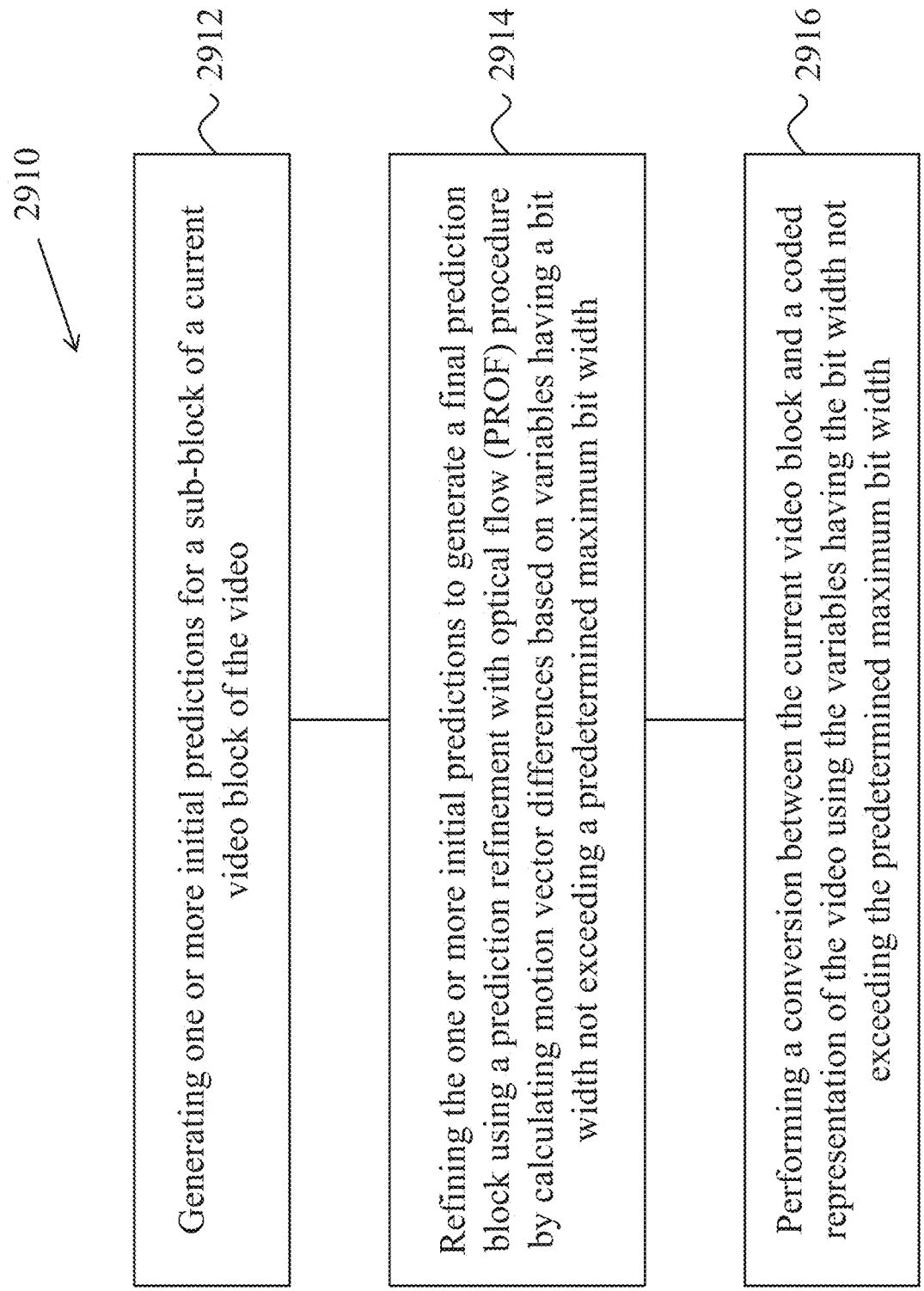
FIGS. 29A to 29G show flowcharts of an example method for video processing.

FIG. 29A shows a flowchart of an exemplary method for video processing. The method 2910 includes, at step 2912, generating one or more initial predictions for a sub-block of a current video block of the video. The method 2910 includes, at step 2914, refining the one or more initial predictions to generate a final prediction block using a prediction refinement with optical flow (PROF) procedure by calculating motion vector differences based on variables having a bit width not exceeding a predetermined maximum bit width. The method 2910 includes, at step 2916, performing a conversion between the current video block and a coded representation of the video using the variables having the bit width not exceeding the predetermined maximum bit width.

Figure 29B:
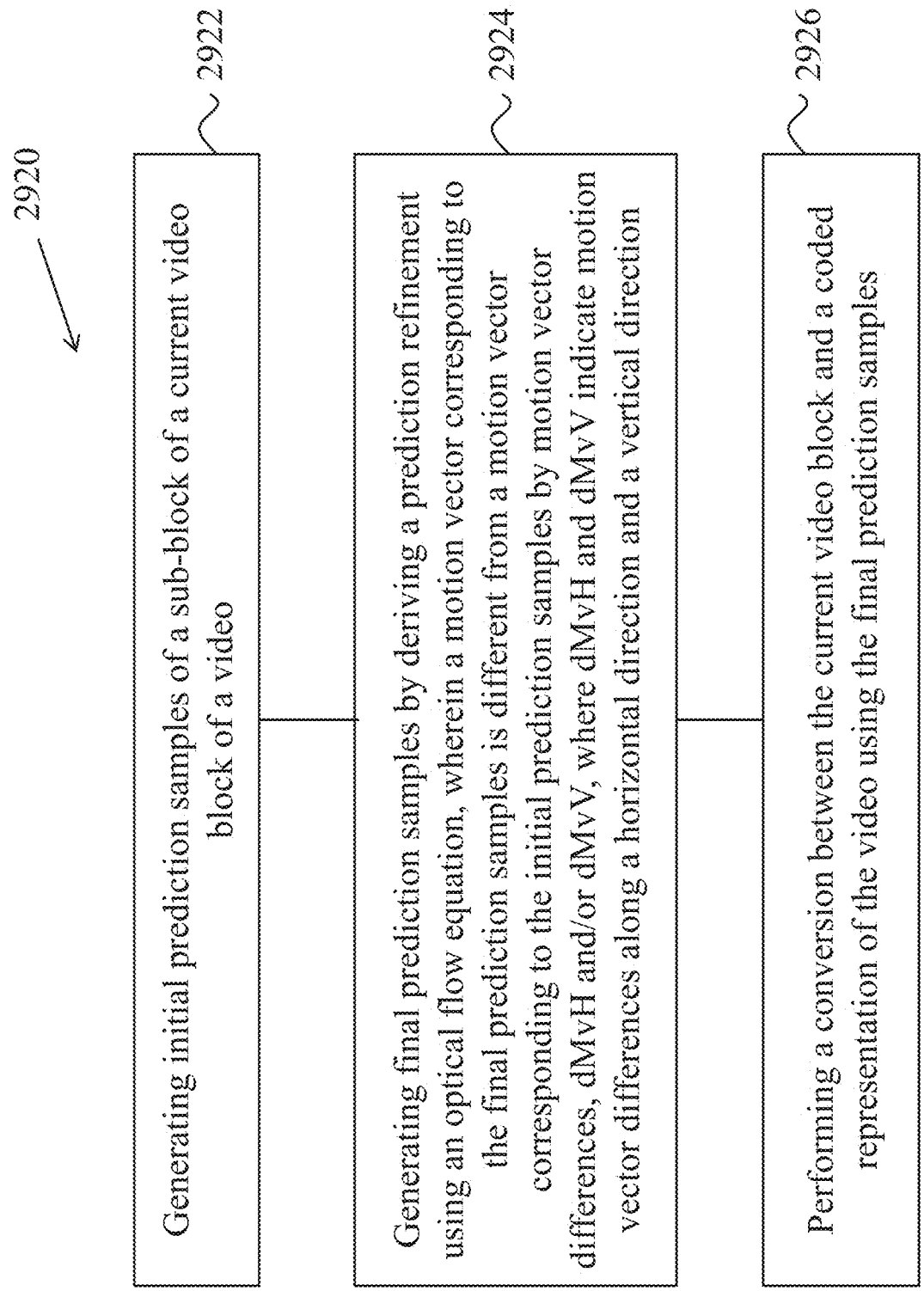

FIG. 29B shows a flowchart of an exemplary method for video processing. The method 2920 includes, at step 2922, generating initial prediction samples of a sub-block of a current video block of a video. The method 2920 includes, at step 2924, generating final prediction samples by deriving a prediction refinement using an optical flow equation, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction. The method 2920 includes, at step 2926, performing a conversion between the current video block and a coded representation of the video using the final prediction samples. In some implementations, a clipping operation is selectively performed on the dMvH and/or dMvV before the deriving of the prediction refinement according to a rule.

Figure 29C:
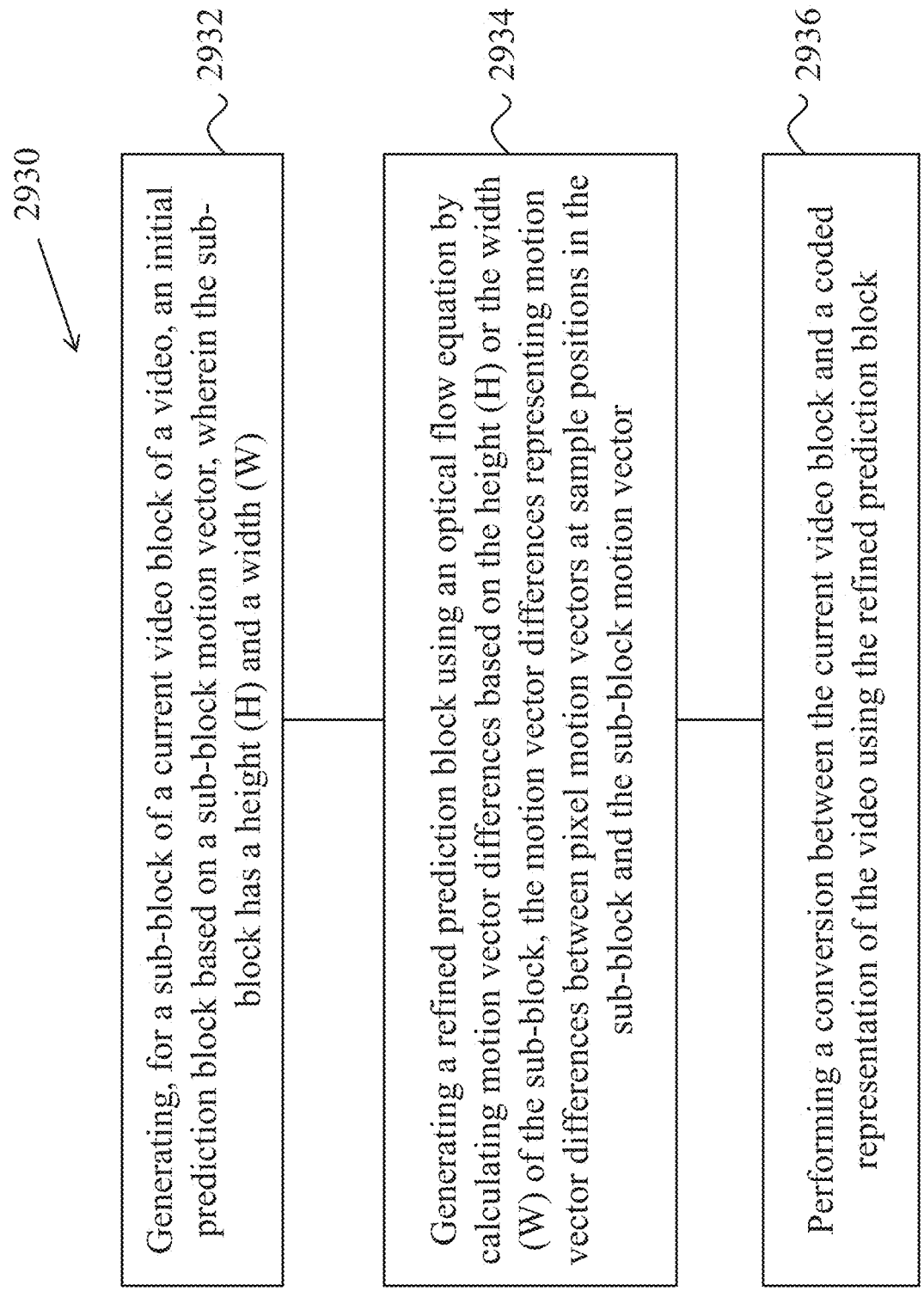

FIG. 29C shows a flowchart of an exemplary method for video processing. The method 2930 includes, at step 2932, generating, for a sub-block of a current video block of a video, an initial prediction block based on a sub-block motion vector, wherein the sub-block has a height (H) and a width (W). The method 2930 includes, at step 2934, generating a refined prediction block using an optical flow equation by calculating motion vector differences based on the height (H) or the width (W) of the sub-block, the motion vector differences representing motion vector differences between pixel motion vectors at sample positions in the sub-block and the sub-block motion vector. The method 2930 includes, at step 2936, performing a conversion between the current video block and a coded representation of the video using the refined prediction block.

Figure 29D:
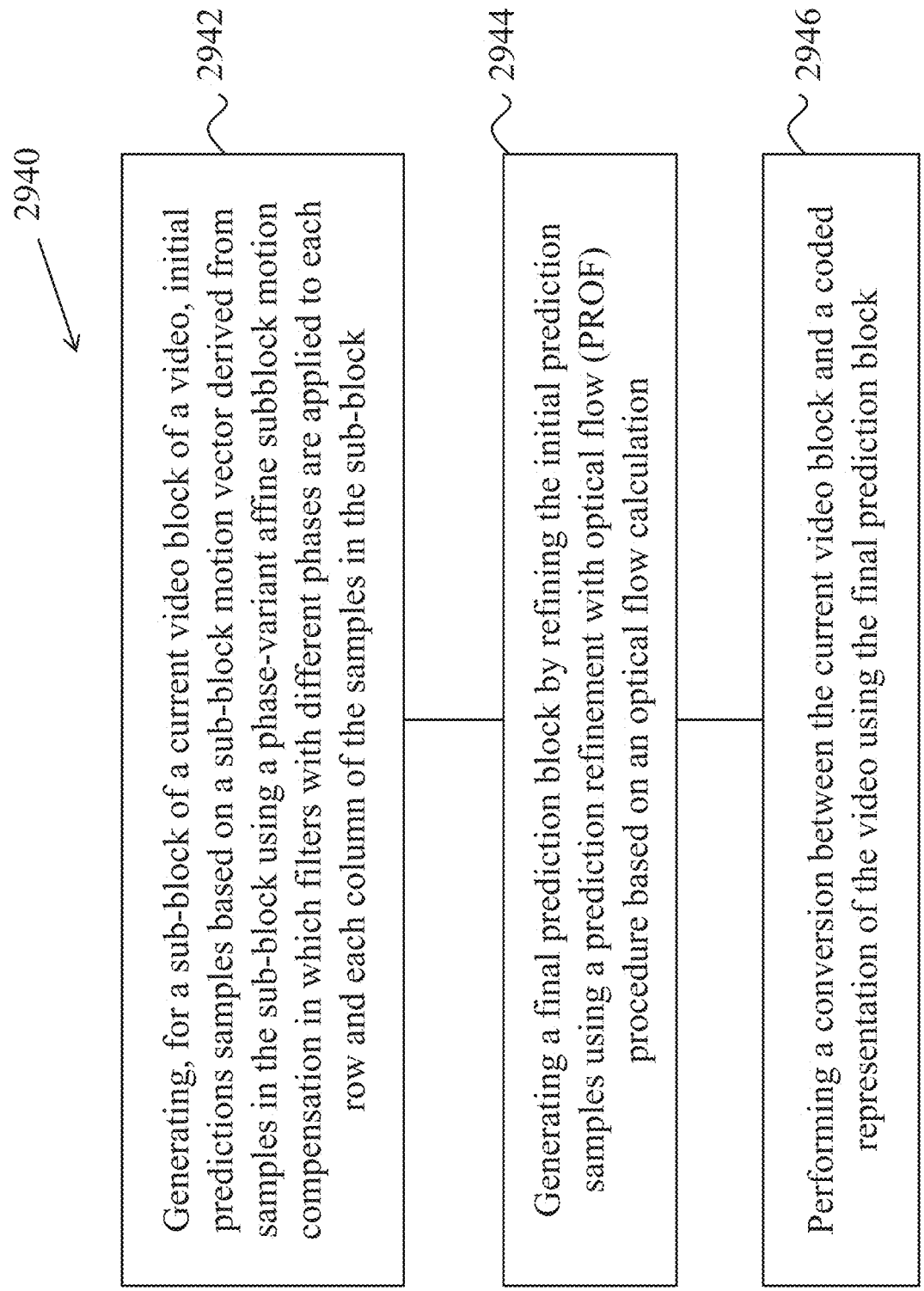

FIG. 29D shows a flowchart of an exemplary method for video processing. The method 2940 includes, at step 2942, generating, for a sub-block of a current video block of a video, initial predictions samples based on a sub-block motion vector derived from samples in the sub-block using a phase-variant affine subblock motion compensation in which filters with different phases are applied to each row and each column of the samples in the sub-block. The method 2940 includes, at step 2944, generating a final prediction block by refining the initial prediction samples using a prediction refinement with optical flow (PROF) procedure based on an optical flow calculation. The method 2940 includes, at step 2946, performing a conversion between the current video block and a coded representation of the video using the final prediction block.

Figure 29E:
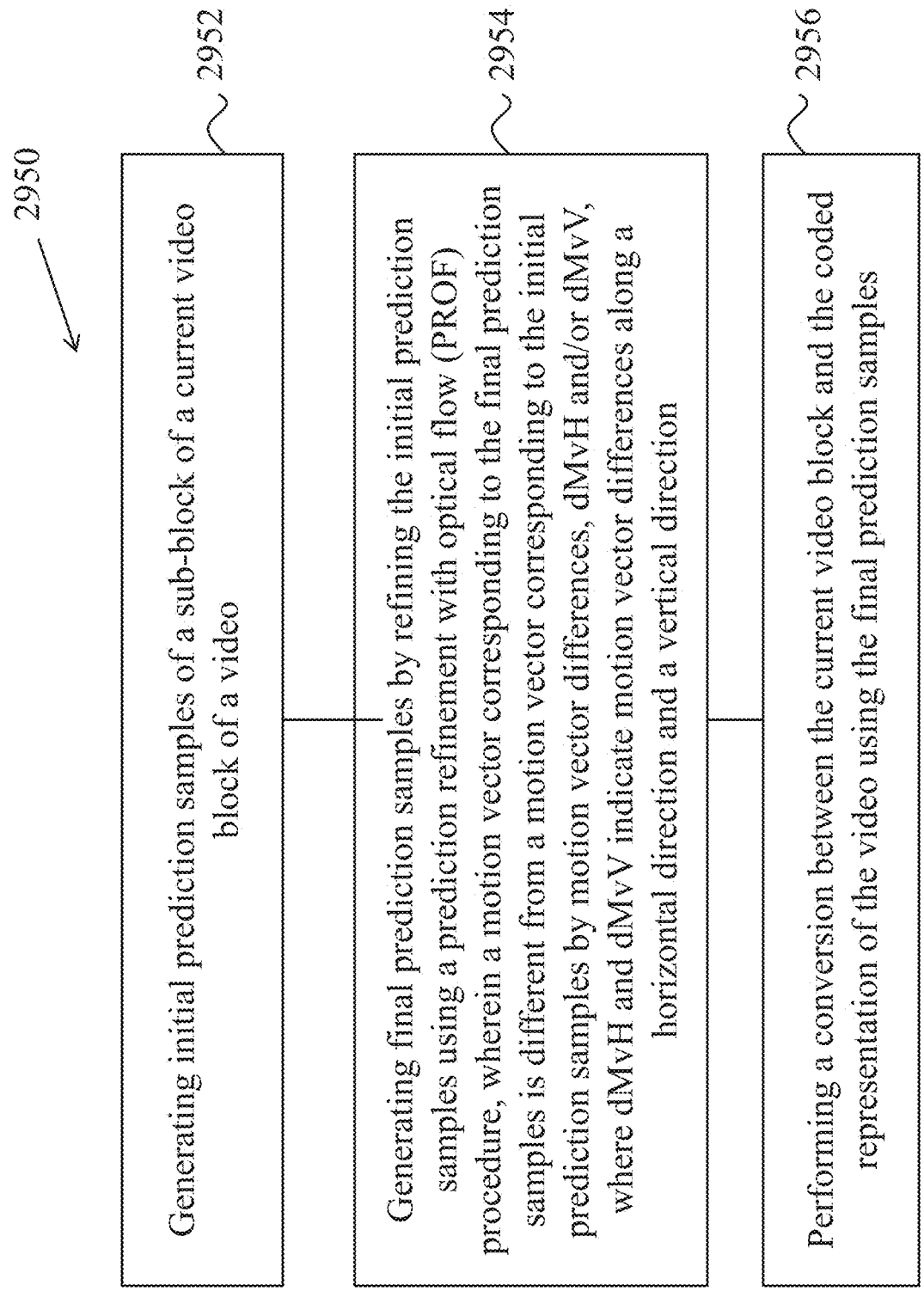

FIG. 29E shows a flowchart of an exemplary method for video processing. The method 2950 includes, at step 2952, generating initial prediction samples of a sub-block of a current video block of a video. The method 2950 includes, at step 2954, generating final prediction samples by refining the initial prediction samples using a prediction refinement with optical flow (PROF) procedure, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction. The method 2950 includes, at step 2956, performing a conversion between the current video block and the coded representation of the video using the final prediction samples. In some implementations, the motion vector differences, dMvH and/or the dMvV, has a same precision as that of the motion vector corresponding to the initial prediction samples or the final prediction samples.

Figure 29F:
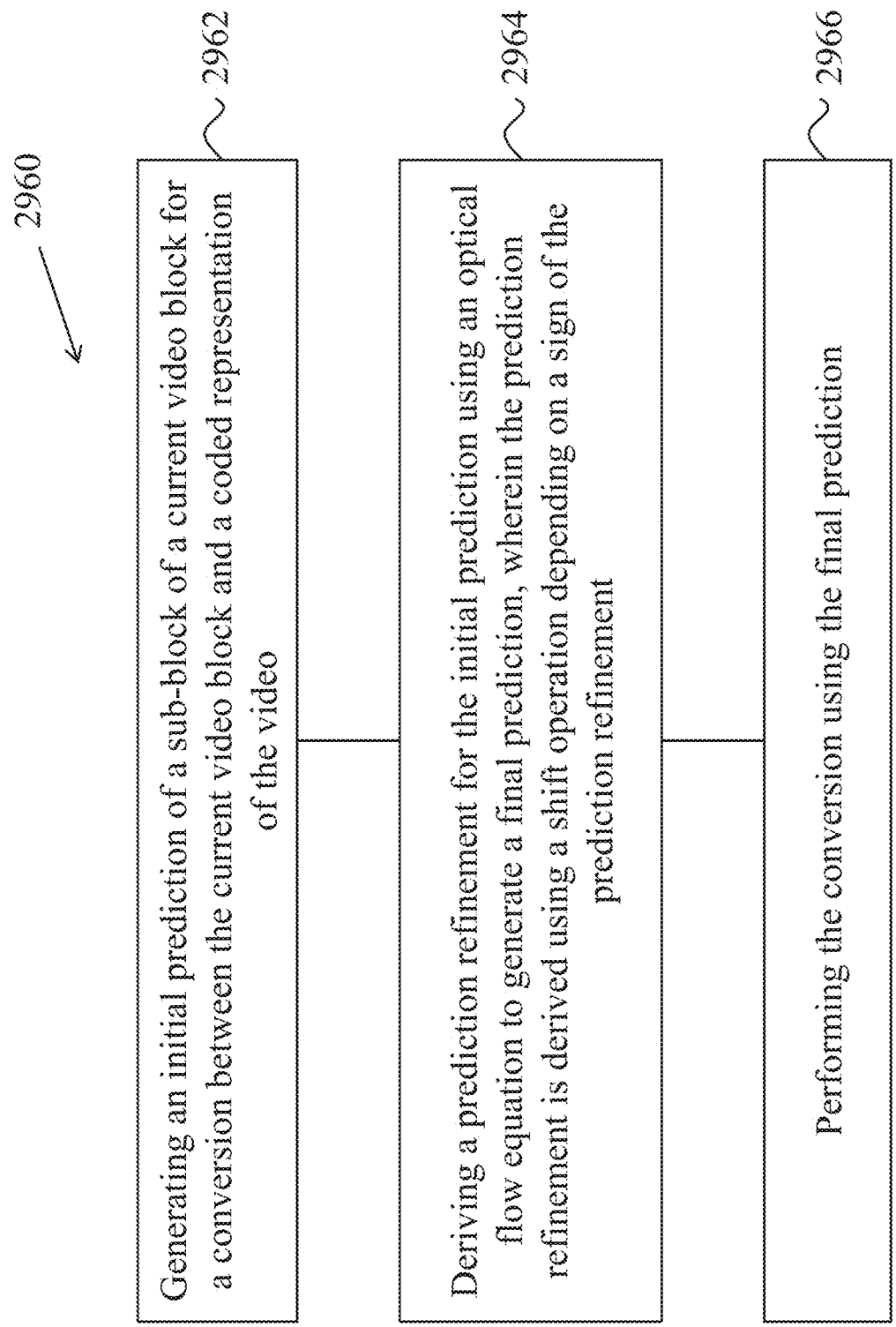

FIG. 29F shows a flowchart of an exemplary method for video processing. The method 2960 includes, at step 2962, generating an initial prediction of a sub-block of a current video block for a conversion between the current video block and a coded representation of the video. The method 2960 includes, at step 2964, deriving a prediction refinement for the initial prediction using an optical flow equation to generate a final prediction, wherein the prediction refinement is derived using a shift operation depending on a sign of the prediction refinement. The method 2960 includes, at step 2966, performing the conversion using the final prediction.

Figure 29G:
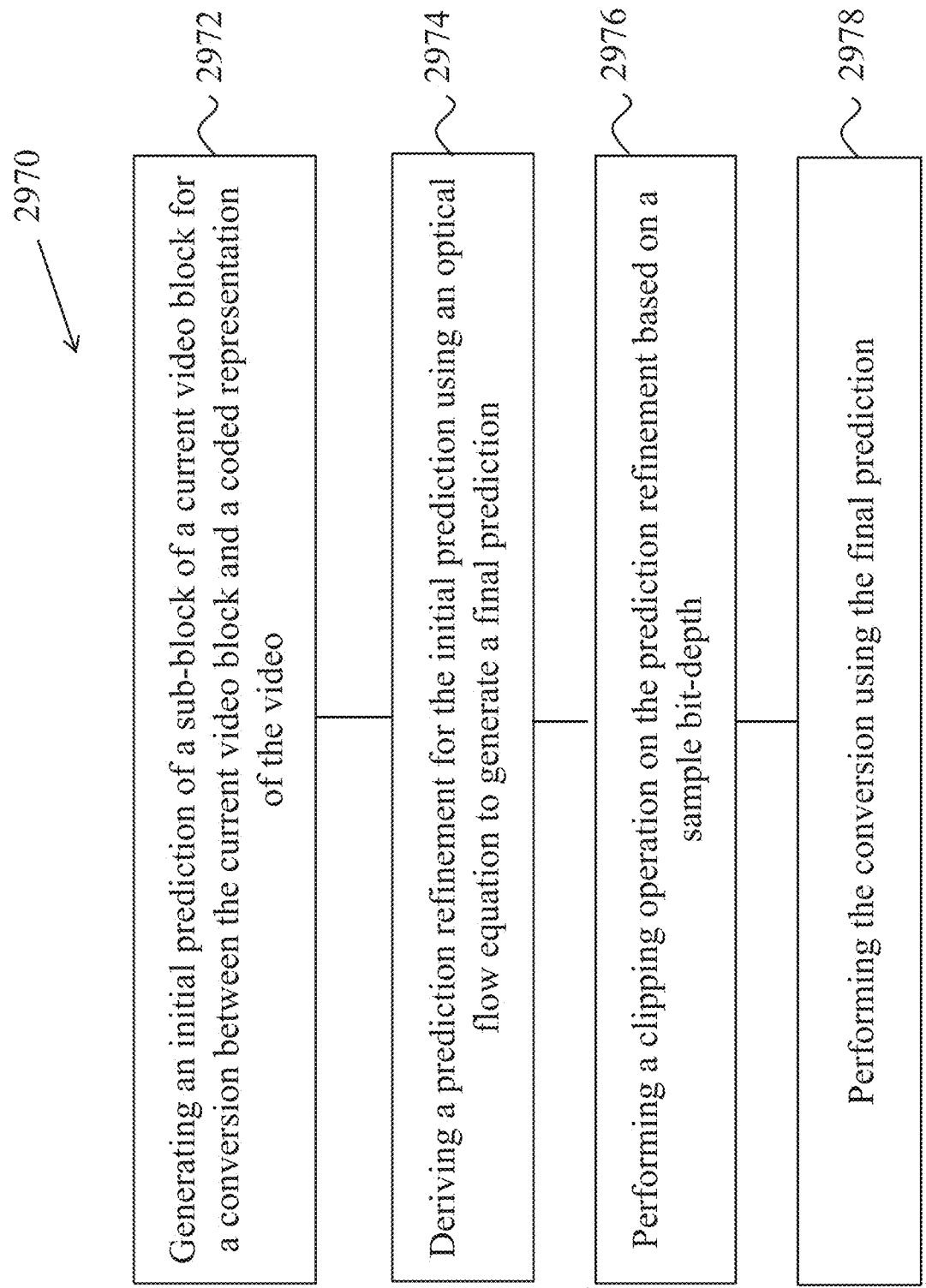

FIG. 29G shows a flowchart of an exemplary method for video processing. The method 2970 includes, at step 2972, generating an initial prediction of a sub-block of a current video block for a conversion between the current video block and a coded representation of the video. The method 2970 includes, at step 2974, deriving a prediction refinement for the initial prediction using an optical flow equation to generate a final prediction. The method 2970 includes, at step 2976, performing a clipping operation on the prediction refinement based on a sample bit-depth. The method 2970 includes, at step 2978, performing the conversion using the final prediction.

5. Example Implementations of the Disclosed Technology

FIG. 30A is a block diagram of a video processing apparatus 3000. The apparatus 3000 may be used to implement one or more of the methods described herein. The apparatus 3000 may be embodied in a smartphone, tablet, computer, Internet of Things (IoT) receiver, and so on. The apparatus 3000 may include one or more processors 3002, one or more memories 3004 and video processing hardware 3006. The processor(s) 3002 may be configured to implement one or more methods (including, but not limited to, method 2900) described in the present disclosure. The memory (memories) 3004 may be used for storing data and code used for implementing the methods and techniques described herein. The video processing hardware 3006 may be used to implement, in hardware circuitry, some techniques described in the present disclosure.

Figure 30B:
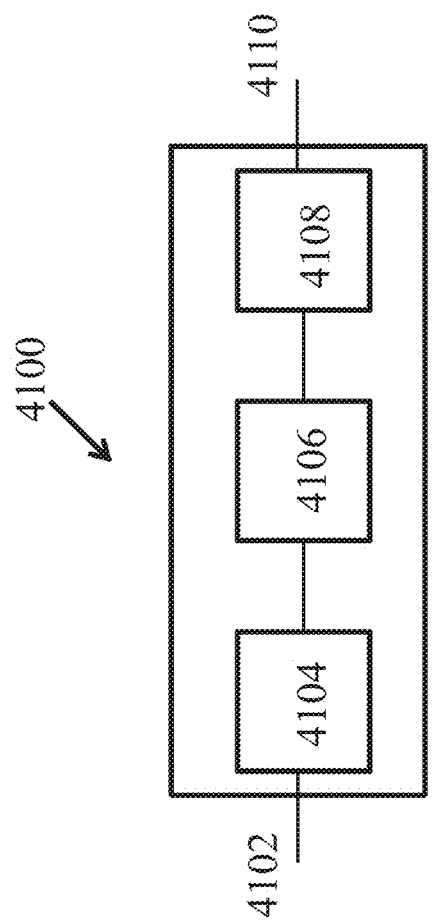

FIG. 30B is another example of a block diagram of a video processing system in which disclosed techniques may be implemented. FIG. 30B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4100 may include a coding component 4104 that may implement the various coding or encoding methods described in the present disclosure. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Some S embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present disclosure.

Various techniques and embodiments may be described using the following clause-based format.

The first set of clauses describe certain features and aspects of the disclosed techniques in the previous section.

1. A method for video processing, comprising: performing a gradient calculation in a first region of a current video block, wherein a size of the first region (M×N) is different from a size of a sub-block of the current video block that is used for motion compensation in an affine mode, and wherein M and N are positive integers; and performing, based on the gradient calculation, a conversion between the current video block and a bitstream representation of a video comprising the current video block.

2. The method of clause 1, wherein the size of the first region is larger than the size of the sub-block.

3. The method of clause 1 or 2, wherein M and N are predefined positive integers.

4. The method of clause 1 or 2, wherein the size of the first region is based on the size of the sub-block.

5. The method of clause 1, wherein M/N is adaptively changed.

6. The method of clause 1, wherein M and N are based on dimensions of the current video block.

7. The method of any of clauses 1 to 6, wherein M has a minimum value Mmin, and wherein N has a minimum value Nmin.

8. The method of clause 7, wherein Mmin=Nmin=8.

9. The method of any of clauses 1 to 6, wherein the first region is padded to generate a first padded region of size (M+dM)×(N+dN).

10. The method of clause 9, wherein samples in the first region or the first padded region are derived based on motion compensation with interpolation filtering.

11. The method of clause 1, wherein at least one sample in the first region is omitted when performing the gradient calculation.

12. The method of clause 1, wherein the gradient calculation is performed with a first precision in bi-directional optical flow (BDOF) and with a second precision in prediction refinement with optical flow (PROF), and wherein the first and second precisions are equal.

13. A method for video processing, comprising: making a decision, based on a selective application of a prediction refinement with optical flow (PROF) to a current video block, regarding a selective application of a coding tool to the current video block, wherein the coding tool is different from the PROF; and performing, based on the decision, a conversion between the current video block and a bitstream representation of a video comprising the current video block.

14. The method of clause 13, wherein the PROF is not applied and the coding tool is applied.

15. The method of clause 13, wherein the coding tool comprises generalized bi-prediction.

16. The method of clause 15, wherein the PROF is not applied, and wherein an index associated with the generalized bi-prediction is not zero.

17. The method of clause 13, wherein the coding tool is local illumination compensation.

18. The method of clause 13, wherein the coding tool is a multiple transform set (MTS).

19. The method of clause 18, wherein the PROF is applied, and only a default transform from the MTS is applied to the current video block.

20. The method of clause 13, wherein the coding tool is weighted prediction.

21. A method for video processing, comprising: making a decision, during conversion between a current video block and a bitstream representation of a video comprising the current video block, regarding a selective application of a prediction refinement with optical flow (PROF) operation, wherein the decision is based on a color information of a current video block.

22. The method of clause 21, wherein the PROF operation is not applied to one or more chroma components of the current video block, and wherein the color information comprises a 4:0:0 color format.

23. The method of clause 21, wherein the PROF operation is applied to one or more chroma components of the current video block, and wherein the color information comprises a 4:4:4 color format.

24. The method of clause 21, wherein the PROF operation is applied to one or more chroma components of the current video block, and wherein the color information comprises a 4:0:0 color format.

25. The method of clause 21, wherein the PROF operation is applied, and wherein the color information comprises a plurality of color components 26. The method of clause 25, wherein one or more gradients of the PROF operation are calculated independently for each of the plurality of color components.

27. The method of clause 25, wherein one or more gradients of the PROF operation are calculated for a first color component of the plurality of color components and re-used for a second color component of the plurality of color components.

28. The method of clause 26 or 27, wherein a precision of the gradients is based on at least one of the plurality of color components.

29. A method for video processing, comprising: making a decision, based on a height (H) or a width (W) of a current video block, regarding a selective application of a prediction refinement with optical flow (PROF) operation; and performing, based on the decision, a conversion between the current video block and a bitstream representation of a video comprising the current video block.

30. The method of clause 29, wherein the PROF operation is applied to a luma component of the current video block.

31. The method of clause 29, wherein the current video block is coded using an affine mode.

32. The method of clause 31, wherein the PROF operation is not applied, wherein W≤ T1 and/or H≤T2, and wherein T1=T2=16.

33. The method of clause 31, wherein the PROF operation is not applied, wherein W>T1 and/or H≥T2, and wherein T1=T2=64.

34. The method of clause 31, wherein the PROF operation is not applied, wherein W×H≤ T or max (W, H)≤T, and wherein T=16.

35. The method of clause 31, wherein the PROF operation is not applied, wherein W×H≥T or min (W, H)≥T, and wherein T=64.

36. The method of clause 1 or 2, wherein a size of the current video block is W×H, wherein M=min (K, W), and wherein K is an integer.

37. The method of clause 1 or 2, wherein a size of the current video block is W×H, wherein N=min (K, H), and wherein K is an integer.

38. The method of clause 36 or 37, wherein K=16.

39. The method of clause 1 or 2, further comprising:
performing, prior to performing the gradient calculation, a padding process in the first region of the current video block.

40. The method of clause 39, wherein performing the padding process comprises deriving one or more motion vectors.

41. The method of clause 40, wherein the one or more motion vectors comprises a motion vector derived from an affine model toward a specific position of the first region.

42. The method of clause 40, wherein the one or more motion vectors comprises a motion vector derived from at least one motion vector of at least one sub-block of the first region.

43. The method of clause 39, wherein performing the padding process is based on a height or a width of the current video block.

44. The method of clause 39, wherein performing the padding process is based on signaling in a video parameter set (VPS), a decoder parameter set (DPS), a sequence parameter set (SPS), a picture parameter set (PPS), an adaptation parameter set (APS), a slice header, a tile, a tile group header, a coding tree unit (CTU) or a coding unit (CU).

45. The method of clause 5 or 6, wherein M and N are signaled in a video parameter set (VPS), a decoder parameter set (DPS), a sequence parameter set (SPS), a picture parameter set (PPS), an adaptation parameter set (APS), a slice header, a tile, a tile group header, a coding tree unit (CTU) or a coding unit (CU).

46. The method of clause 5 or 6, wherein M and N are specified in a profile, a level or a tier of a video coding standard.

47. A method of video processing, comprising: determining, from a coded representation of a video comprising multiple video blocks, applicability of a coding mode based on a field in the coded representation at a video region level, wherein the video region level comprises one or more video blocks; and performing a conversion between the coded representation and the multiple video blocks using a result of the determining such that the coding mode is selectively used upon determining applicability to the video region.

48. The method of clause 47, wherein the video region comprises a video slice.

49. The method of any of clauses 47-48, wherein the coding mode comprises bidirectional optical flow mode or prediction refinement with optical flow mode or decoder side motion vector refinement mode.

50. The method of any of clauses 47-49 wherein the determining includes inferring that the coding mode is disabled based on detecting an absence of a value of the field or an absence of the field in the coded representation.

51. The method of any of clauses 47-50, wherein the determining further includes determining presence of another field at another video region level.

52. The method of any of clauses 47-49, wherein the determining includes inferring that the coding mode is enabled based on detecting a value of the field or a presence of the field in the coded representation.

53. The method of any of clauses 47 and 49-52, wherein the video region comprises a video picture.

54. The method of any of clauses 47-53, wherein the conversion includes encoding the video to generate the coded representation.

55. The method of any of clauses 47-53, wherein the conversion includes decoding the coded representation to generate the video.

56. An apparatus in a video system comprising a processor and a non-transitory memory with instructions thereon, wherein the instructions upon execution by the processor, cause the processor to implement the method in any one of clauses 1 to 55.

57. A video encoder comprising a processor or circuitry configured to implement a method recited in one or more of clauses 1 to 55.

58. A video decoder comprising a processor or circuitry configured to implement a method recited in one or more of clauses 1 to 55.

59. A computer program product stored on a non-transitory computer readable media, the computer program product including program code for carrying out the method in any one of clauses 1 to 55.

The second set of clauses describe certain features and aspects of the disclosed techniques in the previous section, including for example, Example Implementations 10, 12-17, and 22.

1. A video processing method, comprising: generating one or more initial predictions for a sub-block of a current video block of the video; refining the one or more initial predictions to generate a final prediction block using a prediction refinement with optical flow (PROF) procedure by calculating motion vector differences based on variables having a bit width not exceeding a predetermined maximum bit width; and performing a conversion between the current video block and a coded representation of the video using the variables having the bit width not exceeding the predetermined maximum bit width.

2. The method of clause 1, wherein the motion vector differences for a sample position (x, y), dMvH [x][y] and/or dMvV [x][y], are clipped before being used to derive other motion vector differences, dMvH [t][z] and/or dMvV [t][z], for a sample position (t, z), where dMvH and dMvV indicate motion vector differences along a horizontal direction and a vertical direction and the sample position (t, z) is not equal to the sample position (x, y).

3. The method of clause 1, wherein the motion vector differences for a sample position (x, y), dMvH [x][y] and/or dMvV [x][y], are shifted before being used to derive other motion vector differences, dMvH [t][z] and/or dMvV [t][z], for a sample position (t, z), where dMvH and dMvV indicate motion vector differences along a horizontal direction and a vertical direction and the sample position (t, z) is not equal to the sample position (x, y).

4. The method of any of clauses 1 to 3, wherein the performing of the conversion includes generating the coded representation from the current video block.

5. The method of any of clauses 1 to 3, wherein the performing of the conversion includes generating the current video block from the coded representation.

6. A video processing method, comprising: generating initial prediction samples of a sub-block of a current video block of a video; generating final prediction samples by deriving a prediction refinement using an optical flow equation, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction; and performing a conversion between the current video block and a coded representation of the video using the final prediction samples, wherein a clipping operation is selectively performed on the dMvH and/or dMvV before the deriving of the prediction refinement according to a rule.

7. The method of clause 6, wherein the rule specifies to perform the clipping operation before the deriving of the prediction refinement and wherein the clipping operation is performed based on a precision of the dMvH and/or dMvV.

8. The method of clause 7, wherein the dMvH and/or dMvV is clipped as follows:

$dMvH[posX][posY]=Clip3(-2^{K-1},2^{K-1}-1,dMvH[posX][posY])$;

$dMvV[posX][posY]=Clip3(-2^{K-1},2^{K-1}-1,dMvV[posX][posY])$, whereby $K=5$.

9. The method of clause 6, wherein the rule specifies not to perform the clipping operation before the deriving of the prediction refinement.

10. The method of any of clauses 6 to 9, wherein the performing of the conversion includes generating the coded representation from the current video block.

11. The method of any of clauses 6 to 9, wherein the performing of the conversion includes generating the current video block from the coded representation.

12. A video processing method, comprising: generating, for a sub-block of a current video block of a video, an initial prediction block based on a sub-block motion vector, wherein the sub-block has a height (H) and a width (W); generating a refined prediction block using an optical flow equation by calculating motion vector differences based on the height (H) or the width (W) of the sub-block, the motion vector differences representing motion vector differences between pixel motion vectors at sample positions in the sub-block and the sub-block motion vector; and performing a conversion between the current video block and a coded representation of the video using the refined prediction block.

13. The method of clause 12, wherein the motion vector differences, dMvH and dMvV, are calculated based on parameters used for a prediction.

14. The method of clause 12, wherein dMvH [0][0] and dMvV [0][0] representing the motion vector difference of a top-left sample position in the sub-block are calculated as:

$dMvH[0][0]=-6\times(dHorX+dHorY)$, $dMvV[0][0]=-6\times(dVerX+dVerY)$, wherein dHorX, dHorY, dVerX, and dVerY are affine parameters derived from control point motion vectors (CPMVs) as below:

$dHorX=(cpMvLX[1][0]-cpMvLX[0][0])<<(7-\log2(CbW))$ $dVerX=(cpMvLX[1][1]-cpMvLX[0][1])<<(7-\log2(CbW))$ $dHorY=(cpMvLX[2][0]cpMvLX[0][0])<<(7-\log2(CbH))$ $dVerY=(cpMvLX[2][1]-cpMvLX[0][1])<<(7-\log2(CbH))$, or $dHorY=-dVerX$ $dVerY=dHorX$, wherein (cpMvLX[0][0], cpMvLX[0][1]) represents a CPMV at a top-left corner of the current video block, (cpMvLX[1][0], cpMvLX[1][1]) represents a CPMV at a top-left corner of the current video block, (cpMvLX[2][0], cpMvLX[2][1]) represents a CPMV at the bottom-left corner of the current video block, CbW represents the width of the current video block and CbH represents the height of the current video block.

15. The method of any of clauses 12 to 14, wherein the performing of the conversion includes generating the coded representation from the current video block.

16. The method of any of clauses 12 to 14, wherein the performing of the conversion includes generating the current video block from the coded representation.

17. A video processing method, comprising: generating, for a sub-block of a current video block of a video, initial predictions samples based on a sub-block motion vector derived from samples in the sub-block using a phase-variant affine subblock motion compensation in which filters with different phases are applied to each row and each column of the samples in the sub-block; generating a final prediction block by refining the initial prediction samples using a prediction refinement with optical flow (PROF) procedure based on an optical flow calculation; and performing a conversion between the current video block and a coded representation of the video using the final prediction block.

18. The method clause 17, wherein the performing of the conversion includes generating the coded representation from the current video block.

19. The method of clause 17, wherein the performing of the conversion includes generating the current video block from the coded representation.

20. A video processing method, comprising: generating initial prediction samples of a sub-block of a current video block of a video; generating final prediction samples by refining the initial prediction samples using a prediction refinement with optical flow (PROF) procedure, wherein a motion vector corresponding to the final prediction samples is different from a motion vector corresponding to the initial prediction samples by motion vector differences, dMvH and/or dMvV, where dMvH and dMvV indicate motion vector differences along a horizontal direction and a vertical direction; and performing a conversion between the current video block and the coded representation of the video using the final prediction samples, wherein the motion vector differences, dMvH and/or the dMvV, has a same precision as that of the motion vector corresponding to the initial prediction samples or the final prediction samples.

21. The method of clause 20, the motion vector difference for a sample position (x, y), dMvH [x][y] and/or dMvV [x][y], are obtained as follows:

$dMvH[xPos][yPos]=SatShift(dMvH[xPos][yPos],7+M)$;

$dMvV[xPos][yPos]=SatShift(dMvV[xPos][yPos],7+M)$;

whereby M is a positive integer.

22. The method of clause 20 or 21, wherein the performing of the conversion includes generating the coded representation from the current video block.

23. The method of clause 20 or 21, wherein the performing of the conversion includes generating the current video block from the coded representation.

24. A video processing method, comprising: generating an initial prediction of a sub-block of a current video block for a conversion between the current video block and a coded representation of the video; deriving a prediction refinement for the initial prediction using an optical flow equation to generate a final prediction, wherein the prediction refinement is derived using a shift operation depending on a sign of the prediction refinement; and performing the conversion using the final prediction.

25. The method of clause 24, wherein the prediction refinement, ΔI(posX, posY), is calculated by an equation, ΔI(posX, posY)=SatShift (ΔI(posX, posY), N), where N is an integer and Satshift(x, n) is defined as follows:

$$SatShift(x, n) = \begin{cases} (x + \text{offsset0}) >> n & \text{if } x \geq 0 \\ -((-x + \text{offset1}) >> n) & \text{if } x < 0 \end{cases}.$$

Various possible values of offset0 and offset1 are described earlier in the present disclosure.

26. The method of clause 24 or 25, wherein the performing of the conversion includes generating the coded representation from the current video block.

27. The method of clause 24 or 25, wherein the performing of the conversion includes generating the current video block from the coded representation.

28. A video processing method, comprising: generating an initial prediction of a sub-block of a current video block for a conversion between the current video block and a coded representation of the video; deriving a prediction refinement for the initial prediction using an optical flow equation to generate a final prediction; performing a clipping operation on the prediction refinement based on a sample bit-depth; and performing the conversion using the final prediction.

29. The method of clause 28, wherein the prediction refinement (ΔI) for a position (posX, posY) is obtained as follows:

ΔI(posX,posY)=Clip3(−(2$^{1+BitDepth−1}$),2$^{1+BitDpeth−1}$,ΔI (posX,posY)), where BitDepth represents the sample bit-depth.

30. The method of clause 28 or 29, wherein the performing of the conversion includes generating the coded representation from the current video block.

31. The method of clause 28 or 29, wherein the performing of the conversion includes generating the current video block from the coded representation.

32. A video processing method, comprising: partitioning a current video block of a video into sub-blocks including a first sub-block and a second sub-block; generating, for the first sub-block of the current video block to which a prediction refinement with optical flow (PROF) procedure is applied, final prediction samples by calculating motion vector differences based on motion vectors in the first sub-block; generating, for the second sub-block of the current video block to which the PROF procedure is not applied, final prediction samples by skipping a calculation of motion vector differences; and performing a conversion between the current video block and a coded representation of the video using the final prediction samples.

33. The method of clause 32, wherein the performing of the conversion includes generating the coded representation from the current video block.

34. The method of clause 32, wherein the performing of the conversion includes generating the current video block from the coded representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A video processing method, comprising:
   determining, for a current video block, an applicability of an optical flow operation with an affine mode according to a first rule that specifies a condition for applying the optical flow operation;
   generating initial prediction samples of a sub-block of the current video block coded with the affine mode;
   applying the optical flow operation to generate final prediction samples for the sub-block by deriving a prediction refinement based on motion vector differences dMvH and/or dMvV, wherein dMvH and dMvV indicate motion vector differences along a horizontal direction and a vertical direction; and
   performing a conversion between the current video block and a bitstream of a video based on the final prediction samples,
   wherein a clipping operation is performed on the dMvH and/or dMvV before the deriving of the prediction refinement according to a second rule,
   wherein the second rule specifies to perform the clipping operation before the prediction refinement being acquired and wherein the clipping operation is performed based on a precision of the dMvH and/or dMvV, and
   wherein the dMvH and/or dMvV is clipped as follows:

$dMvH[posX][posY]=\text{Clip3}(-2^{K-1},2^{K-1}-1,dMvH[posX][posY])$;

$dMvV[posX][posY]=\text{Clip3}(-2^{K-1},2^{K-1}-1,dMvV[posX][posY])$.

2. The method of claim 1, wherein K=6.

3. The method of claim 1, wherein the initial prediction samples are derived based on an initial motion vector, and wherein the initial motion vector is derived based on a dimension of the current video block and a position of the sub-block.

4. The method of claim 1, wherein the motion vector differences are calculated based on variables having a bit width not exceeding a predetermined maximum bit width.

5. The method of claim 1, wherein the prediction refinement is derived based on the motion vector differences and gradient values.

6. The method of claim 5, wherein the gradient values are calculated based on a difference between multiple initial prediction samples along the horizontal direction and the vertical direction.

7. The method of claim 1, wherein the performing of the conversion includes decoding the current video block from the bitstream.

8. The method of claim 1, wherein the performing of the conversion includes encoding the current video block into the bitstream.

9. An apparatus for processing video data comprising a processor and a non-transitory memory with instructions thereon, wherein the instructions upon execution by the processor, cause the processor to:
   determine, for a current video block, an applicability of an optical flow operation with an affine mode according to a first rule that specifies a condition for applying the optical flow operation;
   generate initial prediction samples of a sub-block of the current video block coded with the affine mode;
   apply the optical flow operation to generate final prediction samples for the sub-block by deriving a prediction refinement based on motion vector differences dMvH and/or dMvV, wherein dMvH and dMvV indicate motion vector differences along a horizontal direction and a vertical direction; and
   perform a conversion between the current video block and a bitstream of a video based on the final prediction samples,
   wherein a clipping operation is performed on the dMvH and/or dMvV before the deriving of the prediction refinement according to a second rule,
   wherein the second rule specifies to perform the clipping operation before the prediction refinement being acquired and wherein the clipping operation is performed based on a precision of the dMvH and/or dMvV, and wherein the dMvH and/or dMvV is clipped as follows:

$$dMvH[posX][posY]=\text{Clip3}(-2^{K-1},2^{K-1}-1,dMvH[posX][posY]);$$

$$dMvV[posX][posY]=\text{Clip3}(-2^{K-1},2^{K-1}-1,dMvV[posX][posY]).$$

10. The apparatus of claim 9, wherein K=6.

11. The apparatus of claim 9, wherein the initial prediction samples are derived based on an initial motion vector, and wherein the initial motion vector is derived based on a dimension of the current video block and a position of the sub-block.

12. The apparatus of claim 9, wherein the motion vector differences are calculated based on variables having a bit width not exceeding a predetermined maximum bit width.

13. The apparatus of claim 9, wherein the prediction refinement is derived based on the motion vector differences and gradient values.

14. The apparatus of claim 13, wherein the gradient values are calculated based on a difference between multiple initial prediction samples along the horizontal direction and the vertical direction.

15. A non-transitory computer-readable storage medium storing instructions that cause a processor to:
   determine, for a current video block, an applicability of an optical flow operation with an affine mode according to a first rule that specifies a condition for applying the optical flow operation;
   generate initial prediction samples of a sub-block of the current video block coded with the affine mode;
   apply the optical flow operation to generate final prediction samples for the sub-block by deriving a prediction refinement based on motion vector differences dMvH and/or dMvV, wherein dMvH and dMvV indicate motion vector differences along a horizontal direction and a vertical direction; and
   perform a conversion between the current video block and a bitstream of a video based on the final prediction samples,
   wherein a clipping operation is performed on the dMvH and/or dMvV before the deriving of the prediction refinement according to a second rule,
   wherein the second rule specifies to perform the clipping operation before the prediction refinement being acquired and wherein the clipping operation is performed based on a precision of the dMvH and/or dMvV, and
   wherein the dMvH and/or dMvV is clipped as follows:

$$dMvH[posX][posY]=\text{Clip3}(-2^{K-1},2^{K-1}-1,dMvH[posX][posY]);$$

$$dMvV[posX][posY]=\text{Clip3}(-2^{K-1},2^{K-1}-1,dMvV[posX][posY]).$$

16. A non-transitory computer-readable recording medium storing a bitstream of a video which is generated by a method performed by a video processing apparatus, wherein the method comprises:
   determining, for a current video block, an applicability of an optical flow operation with an affine mode according to a first rule that specifies a condition for applying the optical flow operation;
   generating initial prediction samples of a sub-block of the current video block coded with the affine mode;
   applying the optical flow operation to generate final prediction samples for the sub-block by deriving a prediction refinement based on motion vector differences dMvH and/or dMvV, wherein dMvH and dMvV indicate motion vector differences along a horizontal direction and a vertical direction; and
   generating the bitstream of the video based on the final prediction samples,
   wherein a clipping operation is performed on the dMvH and/or dMvV before the deriving of the prediction refinement according to a second rule,
   wherein the second rule specifies to perform the clipping operation before the prediction refinement being acquired and wherein the clipping operation is performed based on a precision of the dMvH and/or dMvV, and
   wherein the dMvH and/or dMvV is clipped as follows:

$$dMvH[posX][posY]=\text{Clip3}(-2^{K-1},2^{K-1}-1,dMvH[posX][posY]);$$

$$dMvV[posX][posY]=\text{Clip3}(-2^{K-1},2^{K-1}-1,dMvV[posX][posY]).$$

* * * * *